US008554794B2

(12) United States Patent
Brydon et al.

(10) Patent No.: US 8,554,794 B2
(45) Date of Patent: Oct. 8, 2013

(54) SYSTEM AND METHOD FOR ENFORCING PRIVACY IN SOCIAL NETWORKS

(75) Inventors: Antony Brydon, New York, NY (US); Jeff Patterson, New York, NY (US)

(73) Assignee: Hoover's Inc., Short Hills, NJ (US)

( * ) Notice: Subject to any disclaimer, the term of this patent is extended or adjusted under 35 U.S.C. 154(b) by 1483 days.

(21) Appl. No.: 11/132,159

(22) Filed: May 17, 2005

(65) Prior Publication Data
US 2006/0136419 A1    Jun. 22, 2006

Related U.S. Application Data

(60) Provisional application No. 60/571,946, filed on May 17, 2004.

(51) Int. Cl.
G06F 7/00       (2006.01)
G06F 17/30      (2006.01)

(52) U.S. Cl.
USPC ............................................. 707/785

(58) Field of Classification Search
USPC ............................................. 707/785
See application file for complete search history.

(56) References Cited

U.S. PATENT DOCUMENTS

| | | |
|---|---|---|
| 5,034,898 A | 7/1991 | Lu et al. |
| 5,129,082 A | 7/1992 | Tirfing et al. |
| 5,465,319 A | 11/1995 | Ahamed |
| 5,628,011 A | 5/1997 | Ahamed et al. |
| 5,715,371 A | 2/1998 | Ahamed et al. |
| 5,715,443 A | 2/1998 | Yanagihara et al. |
| 5,727,201 A | 3/1998 | Burke |
| 5,761,662 A | 6/1998 | Dasan |
| 5,802,515 A | 9/1998 | Adar et al. |
| 5,826,269 A | 10/1998 | Hussey |
| 5,890,162 A | 3/1999 | Huckins |
| 5,895,471 A | 4/1999 | King et al. |
| 5,903,890 A | 5/1999 | Shoji et al. |
| 5,905,862 A | 5/1999 | Hoekstra |
| 5,931,908 A | 8/1999 | Gerba et al. |
| 5,950,200 A | 9/1999 | Sudai et al. |
| 5,963,951 A | 10/1999 | Collins |

(Continued)

OTHER PUBLICATIONS

"PlanetAll plans to make a world of difference in busy lives; New interactive service keeps people connected, coordinated and clued-in," *Business Wire*, 1996, p. 11130173.

(Continued)

*Primary Examiner* — Hosain Alam
*Assistant Examiner* — Van Oberly
(74) *Attorney, Agent, or Firm* — Ohlandt, Greely, Ruggiero & Perle, LLP.

(57) ABSTRACT

The present application describes systems and methods for Relationship Capital Management ("RCM"). An RCM system mines relationship capital, which it correlates to eliminate redundancies, that is made available for searching. An initial result set of the search may be narrowed to a single individual, e.g., the target. Weighted paths are identified that connect the user to the target, which may comprise one or more intermediaries between the two. Weighted paths are presented as maps, which may be embedded in other applications to improve business processes such as selling, marketing, hiring, etc. Selection of a path to the target initiates processing of requests for access to relationship capital and responses between the user and the one or more intermediaries. The processing of requests ultimately leads to the approval, conditional approval or denial of access to the relationship capital to which the user wishes to obtain access.

14 Claims, 35 Drawing Sheets

(56) References Cited

U.S. PATENT DOCUMENTS

| | | |
|---|---|---|
| 5,983,022 A | 11/1999 | Watkins et al. |
| 6,038,566 A | 3/2000 | Tsai |
| 6,052,122 A | 4/2000 | Sutcliffe et al. |
| 6,061,680 A | 5/2000 | Scherf et al. |
| 6,073,105 A | 6/2000 | Sutcliffe et al. |
| 6,073,138 A | 6/2000 | de l'Etraz et al. |
| 6,088,699 A | 7/2000 | Gampper et al. |
| 6,115,709 A | 9/2000 | Gilmour et al. |
| 6,122,637 A | 9/2000 | Yohe et al. |
| 6,151,643 A | 11/2000 | Cheng et al. |
| 6,154,783 A | 11/2000 | Gilmour et al. |
| 6,167,435 A | 12/2000 | Druckenmiller et al. |
| 6,175,831 B1 | 1/2001 | Weinreich et al. |
| 6,182,067 B1 | 1/2001 | Presnell et al. |
| 6,182,118 B1 | 1/2001 | Finney et al. |
| 6,189,101 B1 | 2/2001 | Dusenbury, Jr. |
| 6,192,362 B1 | 2/2001 | Schneck et al. |
| 6,195,654 B1 | 2/2001 | Wachtel |
| 6,205,472 B1 | 3/2001 | Gilmour |
| 6,216,122 B1 | 4/2001 | Elson |
| 6,226,649 B1 | 5/2001 | Bodamer et al. |
| 6,230,156 B1 | 5/2001 | Hussey |
| 6,249,282 B1 | 6/2001 | Sutcliffe et al. |
| 6,249,805 B1 | 6/2001 | Fleming, III |
| 6,253,023 B1 | 6/2001 | Fukushima et al. |
| 6,253,202 B1 | 6/2001 | Gilmour |
| 6,260,039 B1 | 7/2001 | Schneck et al. |
| 6,263,340 B1 | 7/2001 | Green |
| 6,266,659 B1 | 7/2001 | Nadkarni |
| 6,266,661 B1 | 7/2001 | Lewish et al. |
| 6,269,369 B1 * | 7/2001 | Robertson ............................ 1/1 |
| 6,279,001 B1 | 8/2001 | DeBettencourt et al. |
| 6,292,904 B1 | 9/2001 | Broomhall et al. |
| 6,308,176 B1 | 10/2001 | Bagshaw |
| 6,317,748 B1 | 11/2001 | Menzies et al. |
| 6,324,535 B1 | 11/2001 | Bair et al. |
| 6,324,541 B1 | 11/2001 | de l'Etraz et al. |
| 6,345,268 B1 | 2/2002 | de la Huerga |
| 6,349,307 B1 | 2/2002 | Chen |
| 6,351,747 B1 | 2/2002 | Urazov et al. |
| 6,356,893 B1 | 3/2002 | Itakura et al. |
| 6,363,415 B1 | 3/2002 | Finney et al. |
| 6,366,907 B1 | 4/2002 | Fanning et al. |
| 6,366,962 B1 * | 4/2002 | Teibel ........................ 709/245 |
| 6,370,541 B1 | 4/2002 | Chou et al. |
| 6,370,542 B1 | 4/2002 | Kenyon |
| 6,370,575 B1 | 4/2002 | Dougherty et al. |
| 6,374,237 B1 | 4/2002 | Reese |
| 6,377,948 B2 | 4/2002 | Kikuchi et al. |
| 6,377,949 B1 | 4/2002 | Gilmour |
| 6,377,961 B1 | 4/2002 | Ryu |
| 6,381,593 B1 | 4/2002 | Yano et al. |
| 6,381,640 B1 | 4/2002 | Beck et al. |
| 6,385,604 B1 | 5/2002 | Bakalash et al. |
| 6,385,644 B1 | 5/2002 | Devine et al. |
| 6,389,422 B1 | 5/2002 | Doi et al. |
| 6,392,669 B1 | 5/2002 | Matoba et al. |
| 6,393,417 B1 | 5/2002 | De Le fevre |
| 6,401,101 B1 | 6/2002 | Britton et al. |
| 6,401,122 B1 | 6/2002 | Matsui et al. |
| 6,405,197 B2 | 6/2002 | Gilmour |
| 6,418,445 B1 | 7/2002 | Moerbeek |
| 6,421,669 B1 | 7/2002 | Gilmour et al. |
| 6,421,725 B1 | 7/2002 | Vermilyea et al. |
| 6,424,870 B1 | 7/2002 | Maeda et al. |
| 6,424,968 B1 | 7/2002 | Broster et al. |
| 6,425,002 B1 | 7/2002 | Zurcher et al. |
| 6,430,574 B1 | 8/2002 | Stead |
| 6,434,603 B1 | 8/2002 | Tsuji et al. |
| 6,434,605 B1 | 8/2002 | Faulkner et al. |
| 6,438,579 B1 | 8/2002 | Hosken |
| 6,442,438 B1 | 8/2002 | Naillon |
| 6,457,076 B1 | 9/2002 | Cheng et al. |
| 6,460,050 B1 | 10/2002 | Pace et al. |
| 6,460,073 B1 | 10/2002 | Asakura |
| 6,463,455 B1 | 10/2002 | Turner et al. |
| 6,470,269 B1 | 10/2002 | Adar et al. |
| 6,477,575 B1 | 11/2002 | Koeppel et al. |
| 6,480,881 B1 | 11/2002 | Kubota et al. |
| 6,487,548 B1 | 11/2002 | Leymann et al. |
| 6,487,585 B1 | 11/2002 | Yurkovic |
| 6,493,702 B1 | 12/2002 | Adar et al. |
| 6,493,719 B1 | 12/2002 | Booth et al. |
| 6,493,742 B1 | 12/2002 | Holland et al. |
| 6,502,134 B1 | 12/2002 | Makarios et al. |
| 6,505,211 B1 | 1/2003 | Dessloch et al. |
| 6,510,454 B1 | 1/2003 | Walukiewicz |
| 6,519,606 B2 | 2/2003 | Burton et al. |
| 6,529,908 B1 | 3/2003 | Piett et al. |
| 6,529,914 B1 | 3/2003 | Doan et al. |
| 6,532,473 B2 | 3/2003 | Niazi et al. |
| 6,535,887 B1 | 3/2003 | Komine et al. |
| 6,535,916 B1 | 3/2003 | Nguyen |
| 6,539,232 B2 | 3/2003 | Hendrey et al. |
| 6,539,396 B1 | 3/2003 | Bowman-Amuah |
| 6,539,420 B1 | 3/2003 | Fields et al. |
| 6,542,749 B2 | 4/2003 | Tanaka et al. |
| 6,542,900 B1 | 4/2003 | Xia |
| 6,546,398 B1 | 4/2003 | Simon |
| 6,549,933 B1 | 4/2003 | Barrett et al. |
| 6,549,939 B1 | 4/2003 | Ford et al. |
| 6,549,941 B1 | 4/2003 | Jaquith et al. |
| 6,553,368 B2 | 4/2003 | Martin et al. |
| 6,557,004 B1 | 4/2003 | Ben-Shachar et al. |
| 6,557,036 B1 | 4/2003 | Kavacheri et al. |
| 6,578,028 B2 | 6/2003 | Egilsson et al. |
| 6,581,092 B1 | 6/2003 | Motoyama et al. |
| 6,587,124 B1 | 7/2003 | Slaby |
| 6,591,293 B1 | 7/2003 | Poetzschke et al. |
| 6,591,295 B1 | 7/2003 | Diamond et al. |
| 6,593,949 B1 | 7/2003 | Chew et al. |
| 6,629,100 B2 | 9/2003 | Morris et al. |
| 6,629,132 B1 | 9/2003 | Ganguly et al. |
| 6,631,410 B1 | 10/2003 | Kowalski et al. |
| 6,633,911 B1 | 10/2003 | Matsuzaki et al. |
| 6,640,229 B1 | 10/2003 | Gilmour et al. |
| 6,643,669 B1 | 11/2003 | Novak et al. |
| 6,647,384 B2 | 11/2003 | Gilmour |
| 6,662,191 B1 | 12/2003 | Cherniavsky et al. |
| 6,665,658 B1 | 12/2003 | DaCosta et al. |
| 6,668,251 B1 | 12/2003 | Goldberg |
| 6,697,807 B2 | 2/2004 | McGeachie |
| 6,697,865 B1 * | 2/2004 | Howard et al. ............... 709/229 |
| 2001/0013029 A1 | 8/2001 | Gilmour |
| 2001/0025280 A1 | 9/2001 | Mandato et al. |
| 2001/0032208 A1 | 10/2001 | Duxbury |
| 2001/0032209 A1 | 10/2001 | Duxbury |
| 2001/0042103 A1 | 11/2001 | Tomari et al. |
| 2001/0047408 A1 | 11/2001 | Jacobs et al. |
| 2001/0049686 A1 | 12/2001 | Nelson et al. |
| 2001/0049687 A1 | 12/2001 | Russell |
| 2001/0052080 A1 | 12/2001 | Dusenbury, Jr. |
| 2001/0054032 A1 | 12/2001 | Goldman et al. |
| 2001/0056484 A1 | 12/2001 | Blumenstock |
| 2002/0010747 A1 | 1/2002 | Jaehyuk-Hwang |
| 2002/0023230 A1 | 2/2002 | Bolnick et al. |
| 2002/0035634 A1 | 3/2002 | Smolarski-Koff et al. |
| 2002/0035643 A1 | 3/2002 | Morita |
| 2002/0052858 A1 | 5/2002 | Goldman et al. |
| 2002/0059201 A1 | 5/2002 | Work |
| 2002/0059387 A1 | 5/2002 | Wolfe |
| 2002/0059418 A1 | 5/2002 | Bird et al. |
| 2002/0062368 A1 | 5/2002 | Holtzman et al. |
| 2002/0078050 A1 | 6/2002 | Gilmour |
| 2002/0080387 A1 | 6/2002 | Grasso et al. |
| 2002/0083151 A1 | 6/2002 | Adams et al. |
| 2002/0091667 A1 | 7/2002 | Jaipuria |
| 2002/0107957 A1 | 8/2002 | Zargham et al. |
| 2002/0111852 A1 | 8/2002 | Levine |
| 2002/0112013 A1 | 8/2002 | Walsh |
| 2002/0116466 A1 | 8/2002 | Trevithick et al. |
| 2002/0120699 A1 | 8/2002 | Wakabayashi |
| 2002/0124053 A1 | 9/2002 | Adams et al. |
| 2002/0129141 A1 | 9/2002 | Sogabe et al. |

(56) References Cited

U.S. PATENT DOCUMENTS

| | | |
|---|---|---|
| 2002/0138496 A1 | 9/2002 | Schambach et al. |
| 2002/0165861 A1 | 11/2002 | Gilmour |
| 2002/0169737 A1 | 11/2002 | Armstrong et al. |
| 2002/0194112 A1 | 12/2002 | dePinto et al. |
| 2002/0194178 A1 | 12/2002 | Gilmour et al. |
| 2002/0194256 A1 | 12/2002 | Needham et al. |
| 2003/0014491 A1 | 1/2003 | Horvitz et al. |
| 2003/0018726 A1 | 1/2003 | Low et al. |
| 2003/0041042 A1 | 2/2003 | Cohen et al. |
| 2003/0041071 A1 | 2/2003 | Wakai et al. |
| 2003/0046097 A1 | 3/2003 | LaSalle et al. |
| 2003/0050924 A1 | 3/2003 | Faybishenko et al. |
| 2003/0050977 A1 | 3/2003 | Puthenkulam et al. |
| 2003/0050983 A1 | 3/2003 | Johnson |
| 2003/0063072 A1 | 4/2003 | Brandenberg et al. |
| 2003/0069892 A1 | 4/2003 | Hind et al. |
| 2003/0074409 A1 | 4/2003 | Bentley |
| 2003/0088458 A1 | 5/2003 | Afeyan et al. |
| 2003/0088627 A1 | 5/2003 | Rothwell et al. |
| 2003/0093420 A1 | 5/2003 | Ramme |
| 2003/0093478 A1 | 5/2003 | Hughes |
| 2003/0093483 A1 | 5/2003 | Allen et al. |
| 2003/0101024 A1 | 5/2003 | Adar et al. |
| 2003/0115370 A1 | 6/2003 | Jacquin et al. |
| 2003/0149733 A1 | 8/2003 | Capiel |
| 2003/0154213 A1 | 8/2003 | Ahn |
| 2003/0158855 A1 | 8/2003 | Farnham et al. |
| 2003/0167324 A1 | 9/2003 | Farnham et al. |
| 2003/0167326 A1 | 9/2003 | de Bonet |
| 2003/0172067 A1 | 9/2003 | Adar et al. |
| 2003/0177190 A1 | 9/2003 | Moody et al. |
| 2003/0182307 A1 | 9/2003 | Chen et al. |
| 2003/0187813 A1 | 10/2003 | Goldman et al. |
| 2003/0191835 A1 | 10/2003 | Hauck et al. |
| 2003/0200190 A1 | 10/2003 | Adar et al. |
| 2003/0204581 A1 | 10/2003 | Adar et al. |
| 2003/0204604 A1 | 10/2003 | Adar et al. |
| 2003/0217106 A1 | 11/2003 | Adar et al. |
| 2003/0220976 A1 | 11/2003 | Malik |
| 2003/0225834 A1 | 12/2003 | Lee et al. |
| 2003/0233408 A1 | 12/2003 | Goodman |
| 2004/0128322 A1 | 7/2004 | Nagy |
| 2004/0148275 A1* | 7/2004 | Achlioptas ............ 707/3 |
| 2006/0004869 A1 | 1/2006 | Yuster et al. |

OTHER PUBLICATIONS

"PlanetAll Validates Six Degrees of Separation Theory," *PR Newswire*, 1997, p. 224.

"Sage Enterprises, Inc. (announces PlanetAll Web site," *Computerworld*, 1997, v31, n1, p. 56.

Bjorner, Susanne, "Day tripping to Internet World. (Fall 1996 trade show)," *Gale Group Magazine*, v5, n2, p. 50.

Cardwell, Annette, "Cyberscene; PlanetAll keeps you in touch", *Boston Herald*, First Ed., 1996, p. s28.

"USA Company: Six Degrees of Networking", *EIU Views Wire*, 1997.

"Three degrees of trial separation", *Economist*, 1997, v343n8015, p. 59.

Stern, Gary M., "Sixdegrees . . . a networking service", *Link-Up*, v14n4, 1997, p. 25.

"Six Degrees of Separation", *ADWeek Eastern Edition*, 1997, p. 9.

"Novel Services Use Matchmaking Model", *NetGuide Magazine*, 1997, v4, n7, pp. 59-60.

"Online—Connect", *Newsweek*, 1997, vol. 129, iss. 18, p. 11.

Snider Mike, "Easing new users onto the Internet", *USA Today*, Final Ed., 1997, Section Life, p. 6D.

Weisul, Kimberly, "Bankers Trust execs pitch in with unusual Web site", *Investment Dealers Digest*, 1997, v63n5, p. 14.

Vivacqua, Adriana S., Software Agents Group, MIT Media Lab, "Agents for Expertise Location", *American Association for Artificial Intelligence*.

Yu, Bin, et al., Department of Computer Science, North Carolina State University, "A Multiagent Referral System for Expertise Location".

Burt, Ronald S., University of Chicago and Institute Européen d'Administration d'Affaires (INSEAD), "The Network Structure of Social Capital", pp. 1-83.

Boardwalk, Ltd., "boardwalk, Where Decision-Makers Meet", (8 pages).

Kautz, Henry, et al., "Creating Models of Real-World Communities with ReferralWeb", pp. 1-38.

Kautz, Henry, et al., "The Hidden Web", *The American Association for Artificial Intelligence*, 1997, pp. 27-36.

Kautz, Henry, et al., "ReferralWeb: Combining Social Networks and Collaborative Filtering", *Communications of the ACM*, 1997, vol. 40, No. 3, pp. 1-4.

Kautz, Henry, et al., "Agent Amplified Communication", *Thirteenth National Conference on Artificial Intelligence (AAAI-96)*, Portland, OR, 1996, (7 pages).

Foner, Leonard N., MIT Media Lab, "A Multi-Agent Referral System for Matchmaking", (8 pages).

Kautz, Henry, et al., "Creating Models of Real-World Communities with ReferralWeb", (2 pages).

International Search Report corresponding to International Application No. PCT/US05/17243.

\* cited by examiner

Your Other Email Addresses

1804 — We've located other contacts listed in the database at one or more of the email addresses you listed.

— If you believe any of these are in fact you, please check the appropriate boxes:

john@doe.com

1806 {
☐ John Doe, VP Product Management
☐ John Doe
} john1@doe.com

1808 {
☐ John M. Doe, Acme Corp.
☐ John Doe, SNA, Inc.
}

[submit]

Manage Your Company

Enter registration code for new company: [____1904____] [submit]

| Current Companies 1906 | Administrator 1908 | Your User Status 1910 what's this | Outgoing Restrictions 1912 what's this | Incoming Restrictions 1914 what's this | |
|---|---|---|---|---|---|
| Acme Corp. | Arnold Potts | Power | world | world | [Remove me] |
| Lipps, Inc. | Barry White | Regular | company | extranet | [Remove me] |
| ALPHA Corp. | Tom Jones | Regular | world | company | [Remove me] |

1916 brackets left side; 1918 brackets right side

FIG. 17

Gather Contacts

Please specify which contacts you want to import into your Visible Path networking database. You can edit any individual connection rating by sliding the power meter higher or lower:

Contacts Gathered From Your Contact Manager(s):

| | First | Last | Title | Company | Relationship Strength |
|---|---|---|---|---|---|
| ☑ | Tom | Nolan | | | |
| ☑ | Mike | Back | President | OnTime, In.. | |
| ☑ | Harry | Lewis | CTO | MiteBright, .. | |
| ☑ | Sam | Berry | VP Produ... | Total Clean.. | |
| ☑ | Adam | White | | | |
| ☑ | Maid | Service | | | |
| ☑ | Spam | Admin | | | | clear all　　check all next

FIG. 23

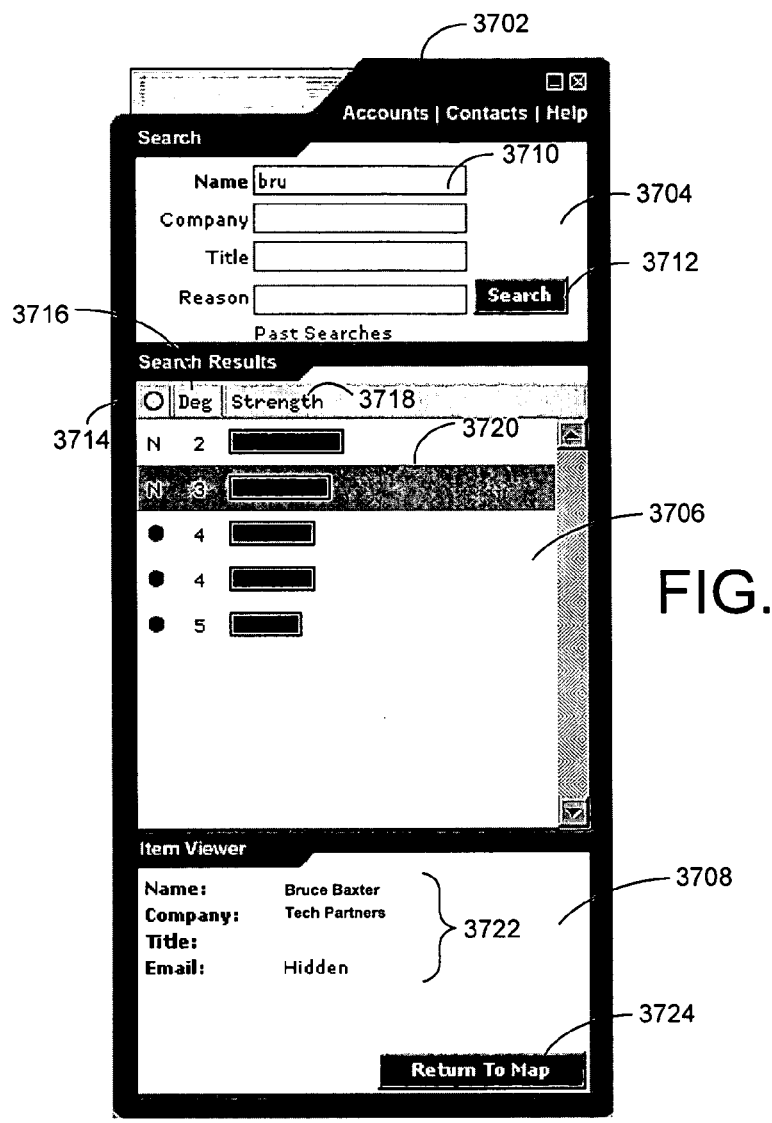

Usage Statistics — Summary | By User | By Month (4902, 4910)

Activity — Summary: All Users (4904)
Chart | Graphs (4906)

| | Logins | Searches | Outbound | | | Inbound | | |
|---|---|---|---|---|---|---|---|---|
| | | | Requests Made | Intros Received | Success Rate | Requests Received | Intros Made | Helpfulness Rate |
| Jan-02 | 23 | 76 | 33 | 11 | 33% | 43 | 18 | 42% |
| Feb-02 | 28 | 93 | 41 | 14 | 33% | 53 | 22 | 42% |
| Mar-02 | 35 | 115 | 50 | 17 | 33% | 65 | 27 | 42% |
| Apr-02 | 43 | 141 | 61 | 20 | 33% | 80 | 33 | 42% |
| May-02 | 53 | 174 | 76 | 25 | 33% | 98 | 41 | 42% |
| Jun-02 | 65 | 214 | 93 | 31 | 33% | 121 | 51 | 42% |
| Jul-02 | 80 | 263 | 114 | 43 | 38% | 149 | 71 | 48% |
| Aug-02 | 98 | 324 | 141 | 61 | 43% | 183 | 99 | 54% |
| Sep-02 | 120 | 398 | 173 | 85 | 49% | 225 | 139 | 62% |
| Oct-02 | 148 | 490 | 213 | 119 | 56% | 277 | 195 | 70% |
| Nov-02 | 182 | 602 | 262 | 155 | 59% | 341 | 253 | 74% |
| Dec-02 | 224 | 741 | 322 | 201 | 62% | 419 | 329 | 78% |
| Jan-03 | 276 | 911 | 396 | 261 | 66% | 516 | 428 | 83% | close

FIG. 47

Usage Statistics — Summary | By Month | By User (5002)

Activity — By User (5008)
Adam Lee (5010)

| | Logins | Searches | Outbound | | | Inbound | | |
|---|---|---|---|---|---|---|---|---|
| | | | Requests Made | Intros Received | Success Rate | Requests Received | Intros Made | Helpfulness Rate |
| Jan-02 | 23 | 76 | 33 | 11 | 33% | 43 | 18 | 42% |
| Feb-02 | 28 | 93 | 41 | 14 | 33% | 53 | 22 | 42% |
| Mar-02 | 35 | 115 | 50 | 17 | 33% | 65 | 27 | 42% |
| Apr-02 | 43 | 141 | 61 | 20 | 33% | 80 | 33 | 42% |
| May-02 | 53 | 174 | 76 | 25 | 33% | 98 | 41 | 42% |
| Jun-02 | 65 | 214 | 93 | 31 | 33% | 121 | 51 | 42% |
| Jul-02 | 80 | 263 | 114 | 43 | 38% | 149 | 71 | 48% |
| Aug-02 | 98 | 324 | 141 | 61 | 43% | 183 | 99 | 54% |
| Sep-02 | 120 | 398 | 173 | 85 | 49% | 225 | 139 | 62% |
| Oct-02 | 148 | 490 | 213 | 119 | 56% | 277 | 195 | 70% |
| Nov-02 | 182 | 602 | 262 | 155 | 59% | 341 | 253 | 74% |
| Dec-02 | 224 | 741 | 322 | 201 | 62% | 419 | 329 | 78% |
| Jan-03 | 276 | 911 | 396 | 261 | 66% | 516 | 428 | 83% | close

FIG. 48

| Usage Statistics | | | | | | Summary | By Month | By User | | |
|---|---|---|---|---|---|---|---|---|---|---|
| Activity – By Month | | | | | | | | | | |
| January 2003 ▼ | | | | | 5108 | | | | | |
| | | | | Outbound | | | Inbound | | | |
| | Logins | Contacts | Searches | Requests Made | Intros Received | Success Rate | Requests Received | Intros Made | Helpfulness Rate | |
| Bell, Antony | 23 | 444 | 76 | 23 | 11 | 48% | 33 | 12 | 36% | |
| Peterson, Ken | 34 | 765 | 2 | 6 | 4 | 67% | 111 | 2 | 2% | |
| Rosen, Lisa | 78 | 2332 | 44 | 115 | 78 | 68% | 45 | 13 | 29% | |
| Smith, Adam | 1 | 2 | 3 | 0 | 0 | NA | 74 | 66 | 89% | |
| TOTAL | 134 | 3543 | 234 | 222 | 98 | 64% | 123 | 87 | 32% | |

FIG. 49

SYSTEM AND METHOD FOR ENFORCING PRIVACY IN SOCIAL NETWORKS

Applicant(s) hereby claim the benefit of Provisional Patent Application Ser. No. 60/571,946, entitled "ENTERPRISE RELATIONSHIP MANAGEMENT SYSTEMS AND METHODS," filed on May 17, 2004, which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The present invention relates generally to data processing methods and systems. More specifically, the invention relates to systems and methods for Relationship Capital Management ("RCM").

BACKGROUND OF THE INVENTION

Relationships and relationship networks, the web of personal and professional relationships that connect individuals, are important drivers of business processes such as selling, marketing and hiring. For example, sales executives rely heavily on their relationship networks to gain access to prospects and buyers, and hiring managers and corporate recruiters depend on their relationship networks to find qualified candidates.

An enterprise typically uses one or more Enterprise Relationship Management ("ERM") software applications to allow employees to manage personal and professional relationships and information. Messaging software applications ("messaging") typically provide comprehensive automation packages for contact management, note and information sharing, calendaring, email, instant messaging, to-do lists, etc. One example of a messaging application is Outlook sold by MICROSOFT CORPORATION® as part of its Office suite of applications. Other communications systems and software ("Communications") found in the enterprise include instant messaging applications, as well as telephone and Voice over IP ("VoIP") applications.

In addition to ERM, Messaging and Communications applications, enterprises typically employ other software applications to manage relationships both inside and outside the enterprise. For example, Customer Relationship Management ("CRM") software helps a company manage existing and developing customer relationships in an efficient and organized manner, Sales Force Automation ("SFA") software increases a sales team's efficiency and effectiveness by automating, organizing and tracking the sales process, Partner Relationship Management ("PRM") software facilitates and automates the sales processes across distributors and external sales channels, and Employee Relationship Management ("eRM") improves the management of internal employees. Other applications to assist the enterprise in organizing and managing the workflow of different business processes and automating the presentation of information to users are well know to those of skill in the art.

For clarity, the above-described applications are collectively referred to herein as "enterprise applications." Enterprise applications store information that may be used to deduce the existence of a relationship or the strength of a relationship. This information, and the relationships and relationship networks that this information describes, is generally referred to herein as "relationship capital".

The relationships and relationship networks in enterprise software, however, can be difficult to access in an efficient manner. These relationships are often documented, but the relationship capital that identifies these relationships is often distributed across many disparate enterprise applications, with data that is often redundant, outdated or incomplete. Furthermore, the relationships and relationship capital are often not weighted, fail to indicate the strength of a given relationship or piece of relationship capital and do not dynamically adjust weights in response to changing data and events. Some employees, such as sales persons and other executives may also be reluctant to share relationship capital that they own, such as information regarding their personal relationships, with other employees or outside parties without retaining any control with regard to how these parties use the relationship capital. Finally, the relationship capital and relationships identified thereby are rarely aggregated, analyzed, and integrated into a relationship network that describes the full breadth of interconnections between individuals and enterprises.

These issues and concerns generally limit the amount of relationship capital that is made available and accessible through enterprise software, which negatively impacts the efficiency and productivity of an organization. Thus, business processes that the organization conducts using enterprise software, such as selling, marketing, hiring, etc., can be ineffective, uncoordinated or inefficient.

Accordingly, there is a need for systems and methods that provide integrated, correlated, current, complete and dynamic information regarding the relationship networks of employees and companies. There is a further need to extend and enhance enterprise software to encourage users to share relationship capital that they own, as well as provide users with control over the particular relationship capital that they make available to other members of the enterprise. In order to overcome shortcomings and problems associated with enterprise software, the present invention provides systems and methods for Relationship Capital Management ("RCM") to facilitate and leverage relationship capital throughout and between enterprises.

SUMMARY OF THE INVENTION

The present invention generally provides methods and systems to build, map and analyze relationship networks. Systems and methods are also provided that allow users to share relationship capital that they own with other users both inside and outside an enterprise in a controlled manner, as well as extend existing enterprise applications such as SFA, CRM, HCM, etc.

According to one aspect of the invention, methods and systems are provided that allow a given user to selectively provide other entities, which may be individuals (e.g., users) or organizations (e.g., companies), with access to their relationship capital. In one embodiment, the system allows a company and/or a user to control the sources from which relationship capital is mined and the extent to which the information is made available to others. For example, a user may specify one or more enterprise applications, such as Microsoft Exchange/Outlook, Lotus Domino/Notes, Novell, Palm, Siebel, Salesforce.com, Oracle, Peoplesoft, SAP, etc., and the type of data, such as contact data, task data, calendar data, telephone or VoIP call logs, etc., that the system mines for relationship capital.

The system mines enterprise applications for a user's relationship capital and may display the information that it collects and allow the user to approve which information is made available to others. For example, the user may remove one or more pieces of information regarding a contact, or remove the contact in its entirety from the set of relationship capital that the system makes available to others. The user may also control how his or her relationship capital is made available subsequent to approval, e.g., requiring additional approval before the user's relationship capital is disseminated to others.

It is anticipated that a number of users may share the same or similar information. In this instance, the system may attempt to correlate relationship capital previously made available, e.g., by other users through automated collection processes or otherwise, with newer relationship capital. Embodiments of the invention therefore avoid multiplicity with regard to the relationship capital made available through the system. It is also anticipated that relationship capital information may be incomplete or outdated. In these instances, the system may attempt to improve the quality and currency of the relationship capital through automated processes that may include, but are not limited to, verifying the data against third party data providers and checking the validity of email addresses.

The system generally provides access to a network of users based on the collective relationship capital of an enterprise, which may be connected to each other by varying degrees of "relatedness". In one embodiment, with respect to information regarding the users' contacts, the system allows a user to rate the strength of their relationship with particular contacts, which may be used when computing path strengths connecting a user and given individual. Additionally, a path connecting two users may include one or more intermediaries and there may be a plurality of paths connecting a source and a target. In this respect, where multiple paths or intermediaries exist connecting a user and a target, the overall strength will provide a measure for comparing the paths.

In one embodiment, the system provides a search interface for a user to search for other users and/or their relationship capital. Relationship capital is matched against one or more search criteria, which identify a path or paths connecting the user to the matching target. The system may also limit the scope of any result set based on one or more scope constraints. For example, the system may limit a given result set to targets within a 3rd or 4th degree of connectivity from the user. Additionally, a user may save a search of a particular individual or company and instruct the system to periodically run the search. On the basis of the periodically run saved search, the system may notify a user when additional items are added or removed from the search's result set, thereby offering a mechanism for tracking people or companies.

The system returns the result set of the individuals falling within the scope of the search query. The user may select a given target from the result set to find the paths connecting the user with the result. The system provides information with regard to the path or path(s) connecting the user with the target, such as the degree of relatedness or connectivity, the strength of the path, status of the path, etc. Similarly, the system may identify a maximum number of paths, such as the ten best paths, connecting the user and target based on the overall strength of all paths identified.

The system may further provide various graphical representations of the paths connecting the user with the target. Nodes in a graph of given relationship network that are the result of a search (which includes the source and target of the search, in addition to any intermediaries) are depicted as a number of icons, with each icon representing an individual in the depicted network. The representation may present the graph according to degrees of relatedness, e.g., first degree, second degree, etc., with graphical indications representing the same. Additionally, the graphical representation depicts the nodes and interconnections between the nodes according to privacy rules and permissions the source of a target has to relationship capital owned by others. For example, where a single intermediary connects the source and target and the source does not have permission to access the relationship capital identifying the intermediary (e.g., the intermediaries name and title), the graphical representation hides the identity of the intermediary and the relationship capital.

The graphical representation may depict responses to requests for access to relationship capital of others, such as depicting a refused request for access to relationship capital with a red connection, an approval with a green connection and a conditional approval with a yellow connection. The user may also interact with the graphical representation to expose additional information, e.g., path and relationship capital information, and execute commands, e.g., double clicking a given path to issue request for access to relationship capital.

According to embodiments of the invention, an owner of a piece of relationship capital, e.g., contact information that a user owns, provides approval before others may access the relationship capital. If one or more intermediaries in a path require approval before sharing some or all of the relationship capital that they own with others, the system allows the user to submit a request for an introduction with one or more targets to the intermediaries requiring such approval. The requests may be provided in a variety of forms, such as in the form of an electronic mail message, SMS text message, proprietary message format, etc. Upon receipt of a request, the intermediary owner may release some or all of the relationship capital that the user is requesting. In this respect, relationship capital owners, e.g., owners of contact information, retain control over use of relationship capital that they own subsequent to making the information available to other users through the system.

Additional aspects of the present invention will be apparent in view of the description that follows.

BRIEF DESCRIPTION OF THE FIGURES

The invention is illustrated in the figures of the accompanying drawings which are meant to be exemplary and not limiting, in which like references are intended to refer to like or corresponding parts, and in which:

FIGS. 11 through 17 are window displays illustrating graphical interfaces for inputting and managing user account information according to one embodiment of the present invention;

FIG. 23 is a window display illustrating an interface for setting relationship strength for user contacts according to one embodiment of the present invention;

FIG. 35 is a window display illustrating an interface for presenting information regarding individuals falling within a result set of a search;

FIG. 36 is a window displays illustrating an interface for identifying intermediates along a path to a given target according to one embodiment of the present invention;

FIGS. 47 through 49 are window displays illustrating interfaces for presenting usage statistics according to one embodiment of the present invention.

DETAILED DESCRIPTION OF THE INVENTION

The present invention generally relates to systems and methods for management of an enterprise's relationship capital. Embodiments of the invention may be generally implemented in software and hardware computer systems, using combinations of both server-side and client-side hardware and software components, to provide a system and method for relationship capital management. The system may be embodied in a variety of different types of software as is readily understood to those skilled in the art. The system may, for example, provide an application program interface ("API") for use by developers to access and collect the relationship data and relationship capital management methods that the present system provides.

Each API may be a "web service" insofar as the functions that the API exposes are capable of dynamically interacting with other web applications using web services technologies, such as SOAP, XML, HTTP, etc., for implementing the services. The system may also make its services available to Java and Component Object Model ("COM") enabled clients through the use of client-side Web service wrappers for those clients that do not have native Web service transaction capability. Although the present systems and methods may be described in relation to certain computing environments certain technologies, such as the Internet and Enterprise Java-Beans ("EJB"), it is understood that the systems and methods described herein are generally applicable to provide the RCM services irrespective of the computing environment and is thus not limited to any specific computing environment.

Figure 1:
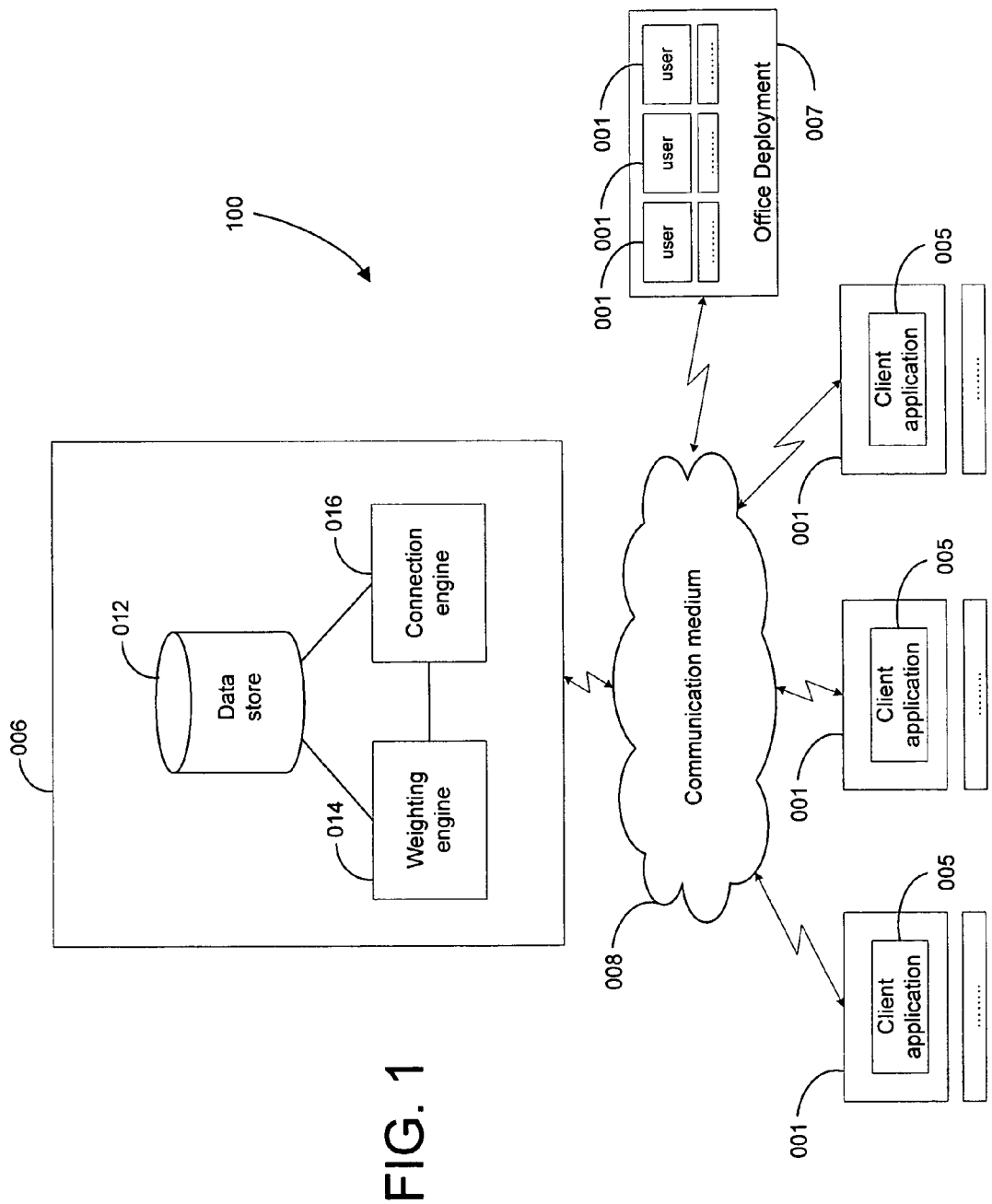
FIG. 1 is a block diagram illustrating a system for relationship capital management according to one embodiment of the present invention.

With reference to FIGS. 1 through 51, embodiments of methods and systems according to the present invention are presented. Referring to FIG. 1, an example of a relationship capital management system 100 generally consists of an analysis system 006 and one or more clients 001. The analysis system 006 may be a server computer comprising a number of components, including: a data store 012, a weighting engine 014 and a connection engine 016. These components may be embodied in various combinations of hardware and software. The data store 012 is operative to provide structured storage of persistent information, for example, storage of information the system 006 collects from clients 001 or generates through use of the weighting and connection engines, 014 and 016, respectively. The weighting engine 014 may analyze the relationship capital, e.g., all email, calendar information and instant messages that a user generates as well as receives, to deduce relationships between the user and other individuals. As is described in greater detail herein, the weighting engine 014 analyzes the relationship capital for a given user and determines the strength of relationships between the user and one or more individuals. According to one embodiment, the weighting engine 014 bases the strength of a relationship between two individuals on the basis of the volume of communications, which may include categories of communication, between the two individuals. As is described in greater detail herein, the connection engine 016 is operative to traverse the relationships deduced by the weighting engine 014, which may be stored in the data store 012, to determine a connection between the user and an individual for whom the user is searching.

The relationship capital management system illustrated in FIG. 1 also comprises one or more remote client systems 001 operative to cause the execution of one or more client applications 005. The client applications 005 provide interfaces and/or business logic for interacting with the analysis system 006 and its constituent components over a communication medium 008 according to one or more communication protocols. Embodiments of the invention further contemplate enterprise deployments 007. A number of client systems 001, each comprising one or more client applications and connected to the analysis server 006 over communication medium 008, collectively provide for enterprise-wide relationship capital management. It should be noted that, as those of skill in the art should recognize, the client applications 005 may be run locally in relation to the analysis system 006.

According to the embodiment of FIG. 1, both the clients 001 and the analysis system 006 comprise processors, memories, transient and persistent memories, and input/output devices (not pictured) necessary or useful in exchanging communications and otherwise processing data as described herein. As those of skill in the art should appreciate, a wide variety of suitable hardware that are already known, from stand-alone PCs or workstations to large, complex networks, may embody the systems and methods described herein. As will be further understood by those of skill in the art, implementing the invention using an architecture such as that shown in FIG. 1 enable both centralized and/or distributed analysis, storage, processing, control and use of individual and enterprise relationship capital by one or more local or remote users. Communication mediums 008, such as local or wide area networks, public networks such as the Internet, etc., as well as alternative communications systems such as wireless telephones and wired or wireless facsimile systems may link any number of analysis systems 006 and/or clients 001. Analysis and/or other data processing functions may be concentrated in one analysis system 006 or distributed among many, with input/output functions being distributed in any suitable manner. Other permutations should be apparent to those of skill in the art.

Figure 2:
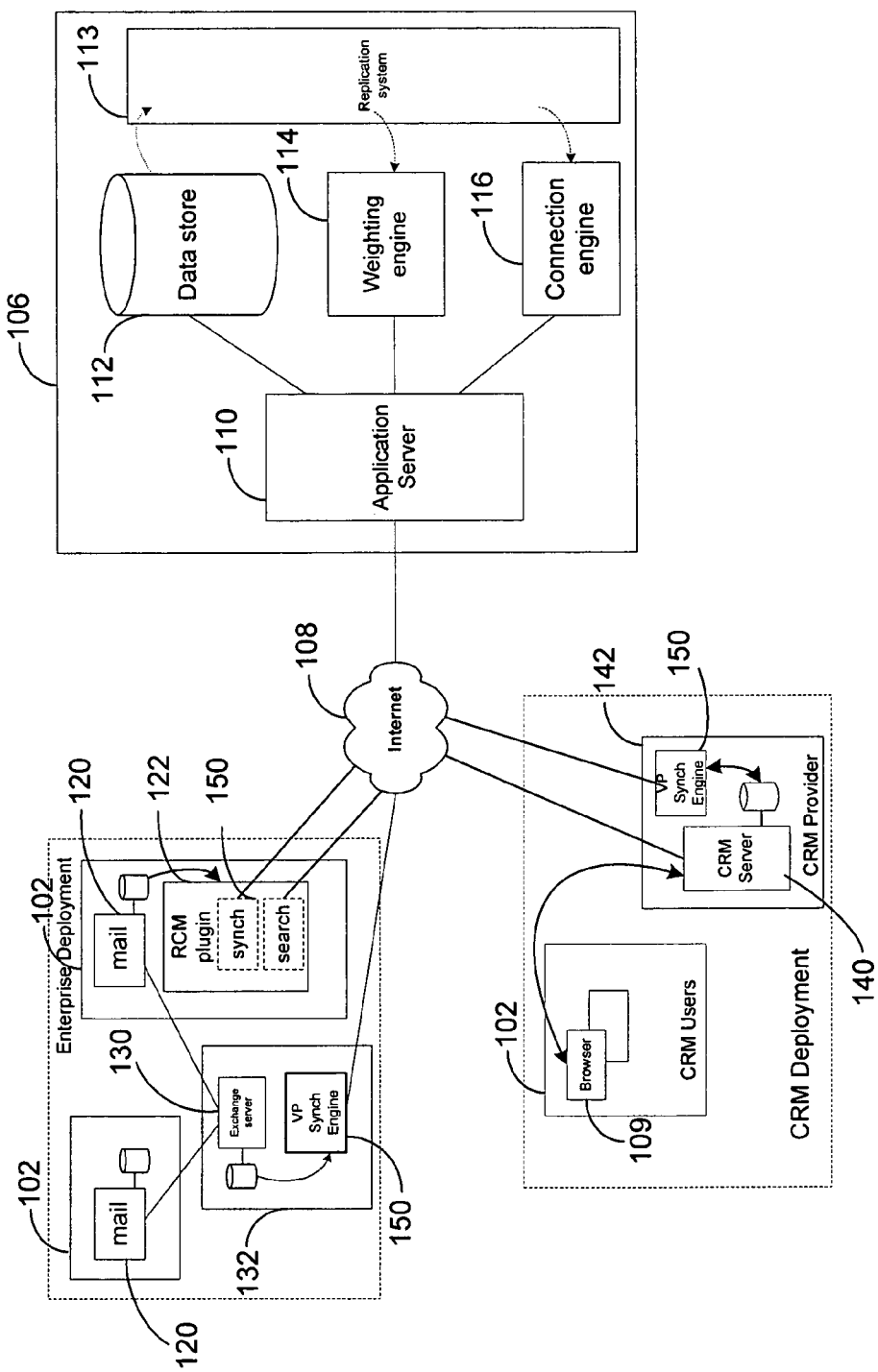
FIG. 2 is a block diagram illustrating a system for relationship capital management according to one embodiment of the present invention.

FIG. 2 presents one embodiment of a more detailed illustration of the relationship capital management systems introduced in FIG. 1. According to the embodiment of FIG. 2, the analysis system 106 is operative to make relationship capital management available as one or more web services, which may be accessed from a variety of enterprise applications 120, 130 and 140 running on computing devices 102, 132 and 142, which may be both servers as well as client computers.

Enterprise applications may comprise a mail application 120 running on a user's computer 102, a mail server 130, such as EXCHANGE from MICROSOFT CORPORATION™, a CRM installation 140 providing customer relationship management, which may be accessed by user's computer 102 through the use of a browser 109. The analysis system 106 collects the relationship capital contained within these and other enterprise applications. According to one embodiment, the analysis system 106 uses an application server 110 that communicates with one or more sync engines 150 to synchronize relationship capital between the enterprise applications and the analysis server 106, although it is not required that the relationship capital in the enterprise applications and analysis server 106 mirror each other. The sync engine 150 may be a separate application or a software component 150, such as part of a plug-in 122 to another application 120. According to the illustration of FIG. 2, a sync engine 150 is in communication with an Exchange server 130 and transmits relationship capital over the Internet 108 to the analysis system's application engine 110 for storage in the data store 112. Similarly, another sync engine 150 is in communication with a CRM server 140 and transmits relationship capital over the Internet 108 to the analysis system's application engine 110 for storage in the data store 112.

Figure 3:
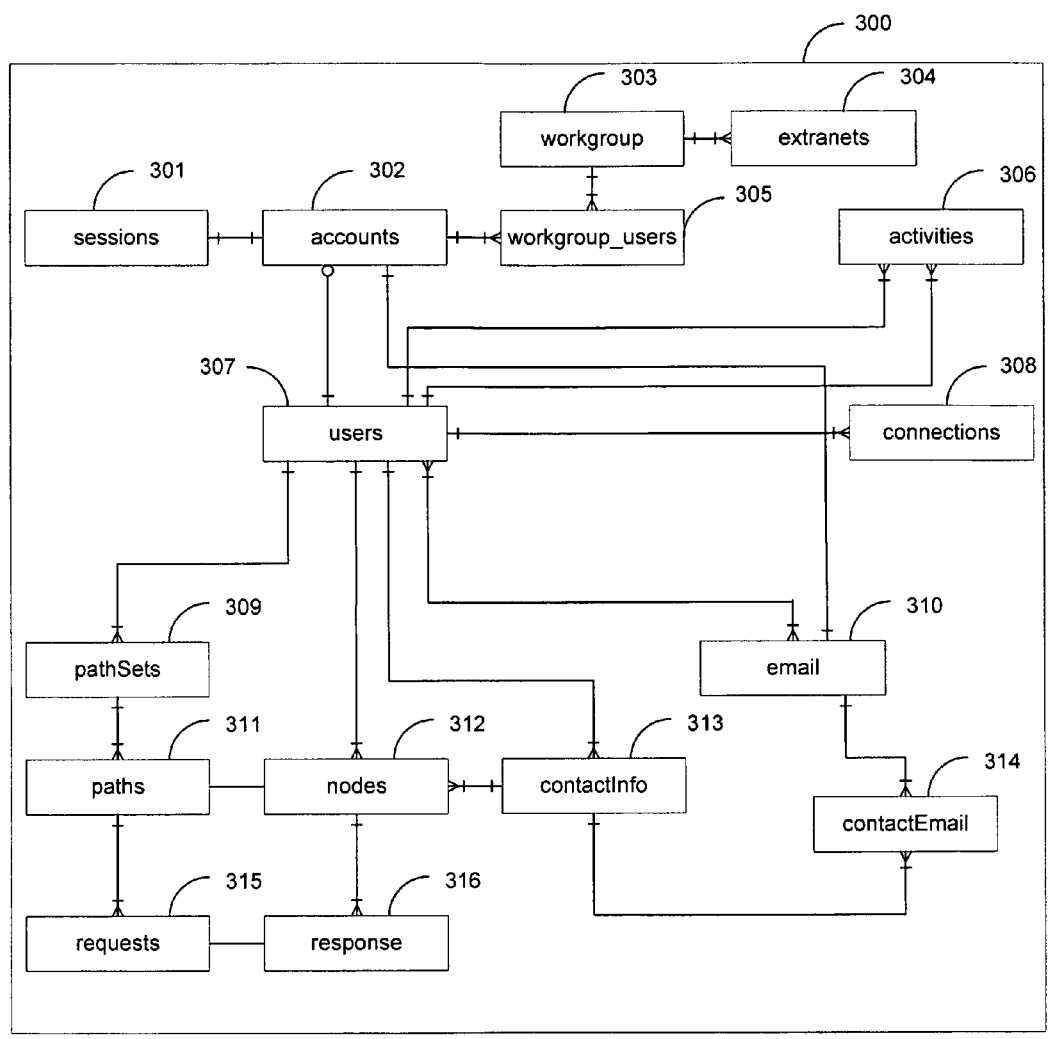
FIG. 3 is an entity relationship diagram illustrating the relationship of tables in a data store for maintaining relationship capital according to one embodiment of the present invention.
Figure 4:
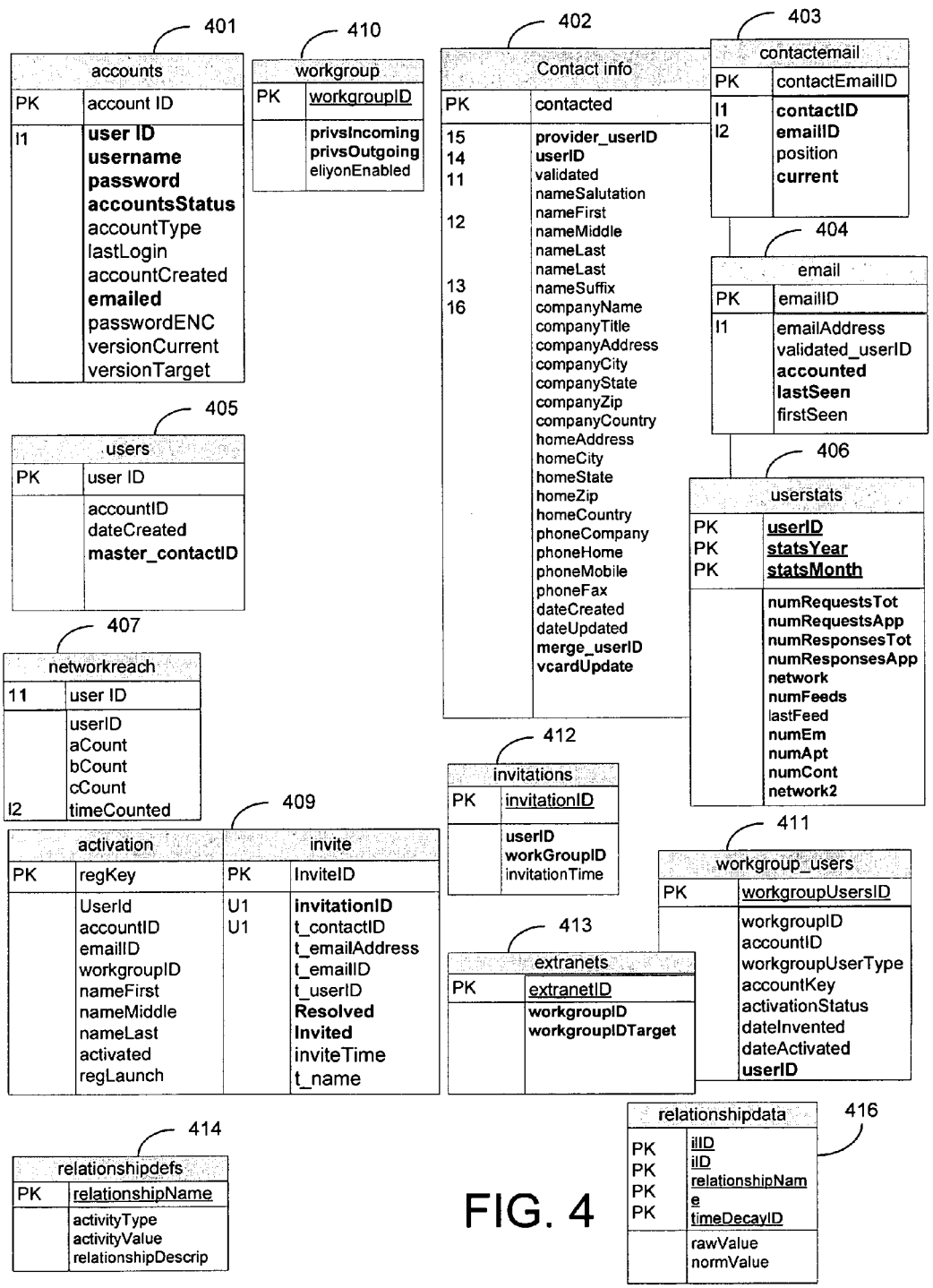
FIGS. 4 and 5 are data tables illustrating the structure and organization of a data store for maintaining relationship capital according to one embodiment of the present invention.
Figure 5:
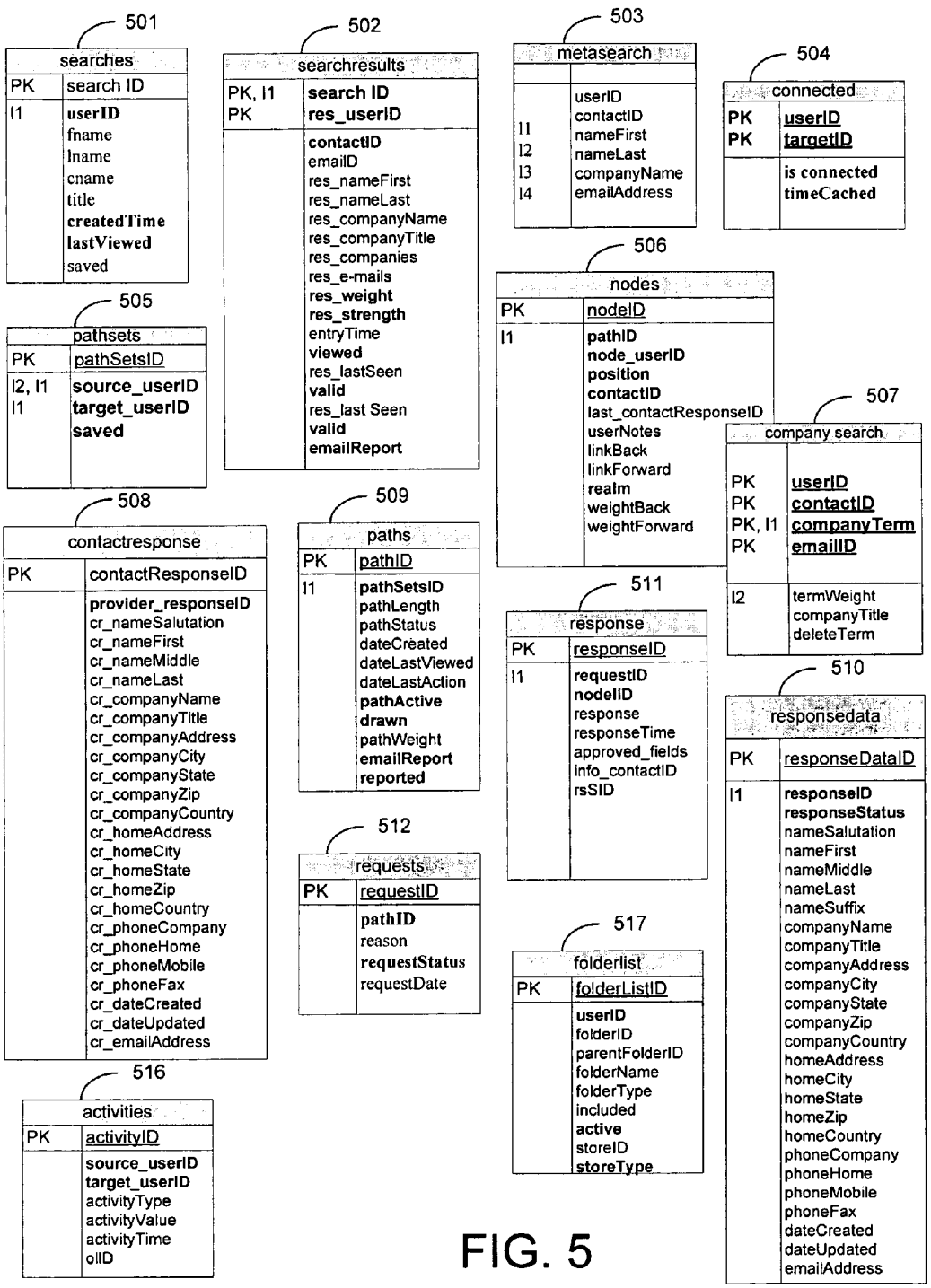

The data store 112 is generally the source of data for the analysis system 106, including relationship capital of users and the enterprise. The data store provides access to the data in a structured manner, e.g., to provide a network of the relationships between users and their contacts. One embodiment of the structured storage of relationship capital and related information in the data store is illustrated in the exemplary entity relationship diagram ("ERD") of FIG. 3. It should be noted that FIGS. 4 and 5 present detailed information regarding the manner in which each table in the data store structures the relationship capital and other information; the description of the ERD of FIG. 3 is accompanied, where applicable, by parenthetical cross reference to the detailed information of FIGS. 4 and 5. Within a data store 300, a user table 307 (405) generally includes a record for every person represented in the system including a unique numeric ID assigned to each user. It should be noted that the users table contains records for both users of the system as well as individuals represented by relationship capital of those users, without requiring the individuals represented by the relationship capital to "opt in" to the system. The data store may also maintain contact information for each user, e.g., email addresses 310 (404) and user statistics (406). Information about relationships may also be stored 407, 414, 416, as well as invitations (409 and 412).

As users join the system and sync their relationship capital, an entry is created in a contactInfo and contactemail tables 313 and 314 (402 and 403) for each contact that a user uploads. The contactInfo table 313 (402) includes relationship capital regarding each contact as well as information associating the contact with the user that uploaded the particular contact. If a contact being uploaded matches a person already in the system, the new contact record is correlated with the existing person. If there is no match, a new user ID is created representing a new person being introduced to the system. Due to user error and the intricacies of correlating new contact information with existing users in the system, the system must allow for the reversal of these associations. Therefore, a contact ID created by a previous user for the user in question may also be stored along with the other contact information, which allows the system to re-associate the contact with a previous user when a contact is disassociated with a current user. In certain instances, email addresses may be associated with multiple users. User-to-email relationships must therefore be stored in the system according to a many-to-many relationship. If a user validates an email address, however, the user's userID is stored along with the email record to indicate which user has authoritative access to the email address.

In certain instances, access to the system or particular relationship capital may be limited to persons in a workgroup, which comprises one or more users that have an implicit trust relationship based on one or more workgroup rules. A workgroup administrator may therefore control access for users in the workgroup. In this instance, a workgroup table 303 (410) may be used, which contains high-level information about the users 305 (411) in a given workgroup. The users assigned to a workgroup may be captured in a workgroup_users table 305 (411) that contains information on each user in a workgroup, including the type of workgroup user each user is (admin, power user, standard user, etc.), an activation key for activation of the user account, and the status of their membership in a workgroup. One or more extranets 304 (413) are associated with each workgroup 303. An accounts table 302 (401) may be used, which contains all the actual account information on a user, allowing for users with accounts to belong to any number of workgroups. It may be related with a sessions table 301.

The system may also store path 311 (509), request 315 (512) and response 316 (511) information. A path refers to a sequence of relationships that describes a particular connection between two individuals, which may be via one or more intermediaries. A request refers to a communication from a user to the owner of a piece of relationship capital for an access, e.g., to communicate with another user or contact. There are likely many possible relationship paths that connect two individuals in the system. For each of the paths, the data store may include one or more tables that store and structure data regarding the users that make up the path 309 (505) along with the users' position in the path 312 (506).

The system may further accommodate introduction requests, e.g., requests by a user to access relationship capital of a user or contact in the system. In this instance, the introduction requests generated for a path, as well as responses to the introduction requests from each user in the path, may also be stored by the system, e.g., in activities 306 (516) and connections 308 (504) tables, such as requests 315 (512), response 316 (511), contactresponse 508, and response data 510 tables. In this instance, a requests table may be generated when a user submits a request for an introduction that includes data regarding the request, such as the reason for the request. One or more response tables may also be used to track data regarding the response and, if a positive response is received allowing the system to share some or all of the relationship capital that the intermediary owns, a response-data table 510 may be created that includes the data therein that the intermediary is allowing the user to access. The system may also be structured to store searches 501, search results 502, metasearches 503, company searches 507, paths between individuals 509, folder lists 517.

The workgroup structure in the data store 112, each of which comprises one or more account holders, provides for trust and privacy in the system. An account holder may be a user that is invited to join one or more workgroups, providing the account holder with a list of users with which he or she is connected and the weight of each connection. The list may be empty for users who have not uploaded any contact information. It should be noted that a user is not necessarily an account holder, and according to certain embodiments, users who are not account holders are not returned as intermediaries in response to a search. According to embodiments that implement second order relationships, connections may cause non-account holders to appear as non-participating intermediaries; although the relationship may appear as a path, the intermediary is not included in a request/response chain, as is described in greater detail herein. Account holders in the same workgroup, however, are allowed to use each other as intermediaries in a search.

A given workgroup may have an extranet relationship with one or more other workgroups. Furthermore, an account holder in one workgroup may be an intermediary for an account holder in another workgroup where the two workgroups have an extranet relationship with each other. Similarly, a workgroup may have one or more account holders as part of its extranet. As such, the data model that the data store 112 maintains allows for searching across workgroups and account holders where the workgroup and account holders share an extranet relationship. For example, account holders in a first workgroup may be intermediaries for users that have an extranet relationship with the workgroup and vice versa.

As described above, the data store 112 stores path information connecting users and/or account holders. There are nodes for individuals in the path, including the source and target, whereby the first node identifies the user, the last node identifies the target and intermediate nodes identify intermediaries in the path. Each node in the data store 112 may have one or more attributes describing the node including, but not limited to, a link forward and backward flags (set to true where there is a connection from a given node to a subsequent node and a connection to a preceding node, respectively), weight forward and backward attributes (specifies the weight of a connection forwards or backwards, respectively, which is set to zero if no connection exists), and a realm attribute (the realm to which the node belongs, e.g., none, workgroup, extranet, world, etc.). Paths may also be identified by degree. For example, a path with no intermediaries is a one degree path, a path with one intermediary is a two degree path, a path with two intermediaries is a three degree path, etc.

The data store 112 may also maintain data to enable second order relationship mining. The data store supports a connection representing a relationship between two individuals that is mediated by a third party, e.g., a first user has a connection to a second user only by virtue of knowing a third party that knows the second user. To better understand second order relationship mining, the following example is helpful. Assume that A is a user of the system and individuals B and C are unknown to the system. A provides relationship capital in the form of an email from A to B and from B to A, thereby creating a record in the data store 112 for B, who is now known, and a connection from A to B. A then loads an email from B on which C appears, e.g., in the "to" or "cc" fields. A record is generated in the data store 112 for C, as well as a connection from A to C. In this case, however, the relationship between A and C is a second order relationship. Therefore, when email data is upload into the data store 112, a second order connection may be created from the uploading user to the aggregate of the "to" and "cc" addresses.

Returning to the illustration of FIG. 2, in addition to the data store, the analysis system 106 also comprises a weighting engine 114, a connection engine 116 and a replication system 113, in addition to an application server 110. At regular intervals, the replication system 113 may synchronize information between the weighting engine 114 and the connection engine 116, providing the weighting and connection engines, 114 and 116, respectively, with information on each existing relationship between any two individuals contained in an enterprise's relationship capital along with any corresponding relationship strength value(s). After the connection engine 116 has found a set of paths connecting two individuals, the weighting engine 114 ranks these paths (e.g., according to the combined weight of each relationship comprising a given path) and determines which ones represent the strongest connections.

The connection engine 116 interfaces with the data store 112 via the application server 110 to deduce connections between individuals on the basis of the relationship capital in the data store. Put another way, the connection engine 116 exposes paths that connect two users and/or individuals in the data store 112. In one embodiment, the connection engine 116, as well as other components of the system, may be implemented as one or more software components using a number of programming and scripting languages, which are known to those of skill in the art, and may expose its services through sockets-based RPC mechanisms, such as COM, CORBA, RMI, web services, etc.

From the perspective of code organization, the data structures and search functions of the connection engine 116, as well as other system components, may be implemented in a manner that completely encapsulates the connection engine's inner workings. In this embodiment, the only awareness that other applications have concerning the data structures and algorithms of the connection engine 116 are provided through two interfaces: one for the accessing search algorithms and one for data management.

When invoked by a user to search for a path between two individuals, the connection engine 116 executes logic that interrogates the relationship data structures in the data store 112, returning one or more paths between the individuals. The primary search algorithm accepts the identification of a user and target, finds all existing paths connecting the user and the target within a threshold degree of separation, e.g., four nodes, if defined, and returns a path result set. The algorithm is engineered in conjunction with the data structure design so as to minimize the amount of data processing, e.g., data retrieval, comparison, and writing, required to find this solution. Specific search algorithms for identifying paths between two individuals based on relationship capital are described herein.

According to embodiments of the invention, the connection engine 116 may operate according to workgroup rules when processing searches and returning paths whereby workgroup and extranet relationships control which account holders can be used as intermediaries in a search and resultant paths. The search rule provides that for a search to find a path between intermediaries, the relationships of the account holders must intersect in certain ways. Either the intersection of the workgroups of all the account holders must not be empty or the intersection of the extranets of all the account holders must not be empty.

The rule may be presented more formally. Assume that $M_i$ is the set of workgroups of which account holder i is a member. Assume further that $E_i$ is the set of workgroups in the extranets unioned with the set of workgroups of which i is an extranet user. From these assumptions we derive:

$$M_i \cap M_j = M_{ij}$$

$$(M_i \cap E_j) U (E_i \cap M_j) = E_{mij}$$

$$M_{ij} \cap M_j = M_{ijk}$$

$$(M_{ij} \cap E_j) U (E_{mij} \cap M_j) = EM_{ijk}$$

Therefore, the path is allowed if either of the sets $M_{ijk}$ or $EM_{ij}$ is not empty. Generally speaking, the workgroup rules may be expressed as: a) the searcher and the intermediaries must all be in the same workgroup, except that at most one of these may be an extranet user of that workgroup, or b) the searcher and the intermediaries must all be non-extranet members of either of two workgroups in an extranet relationship.

Connection rules to determine direct paths according to one embodiment consist of:
  A. for two users to be linked in a path, either a first user must be directionally connected to a second, or the second be directionally connected to the first; and
  B. for the last link in a given path, an intermediary must be directionally connected to the search target.

The connection engine 116 may additionally infer connections between account holders that are members of the same workgroup. Therefore, the connection engine 116 may find paths from a source to a target, with an intermediary that may be connected to the target and has an inferred connection to the source. Where second order relationships are included within the system, the above-described algorithm may be modified as follows:
  A'. If the connection to or from is a second order connection, the target of the connection is a leaf node; and
  A". If a path can be found without using a second order connection, the path using the second order connection may be ignored.

Figure 6A:
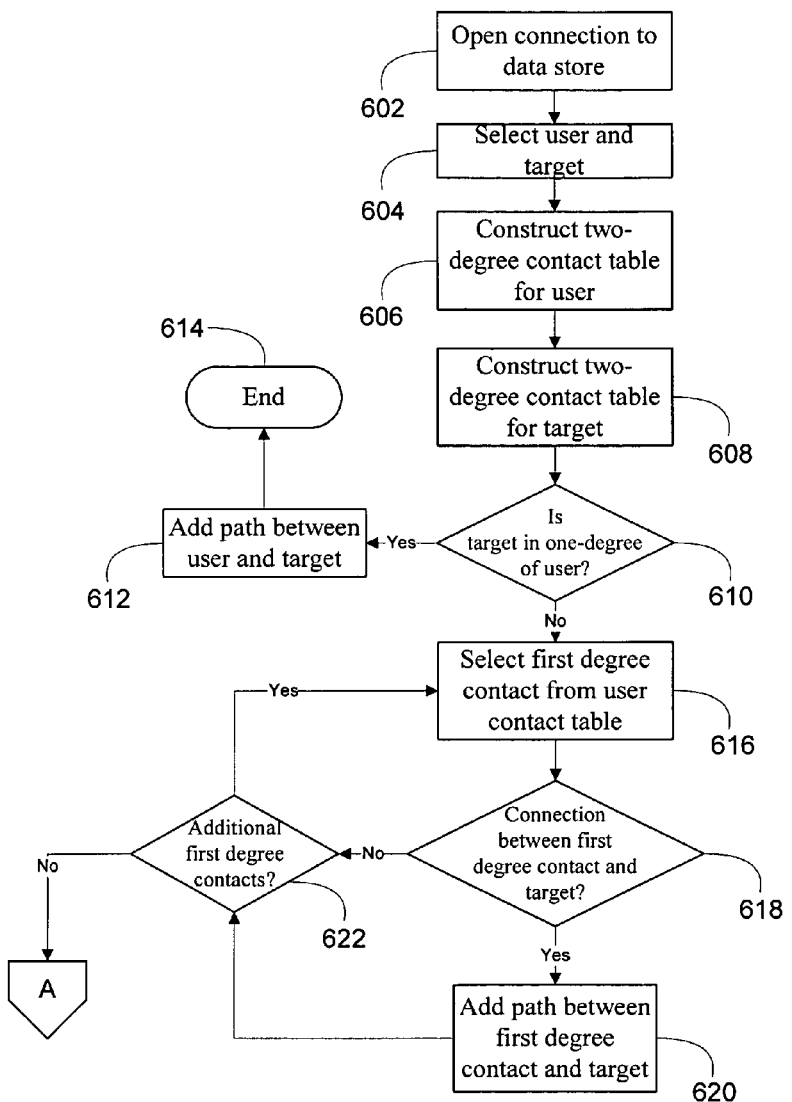
FIGS. 6A and 6B are flow diagrams illustrating a method for determining paths between individuals on the basis of relationship capital according to one embodiment of the present invention.
Figure 6B:
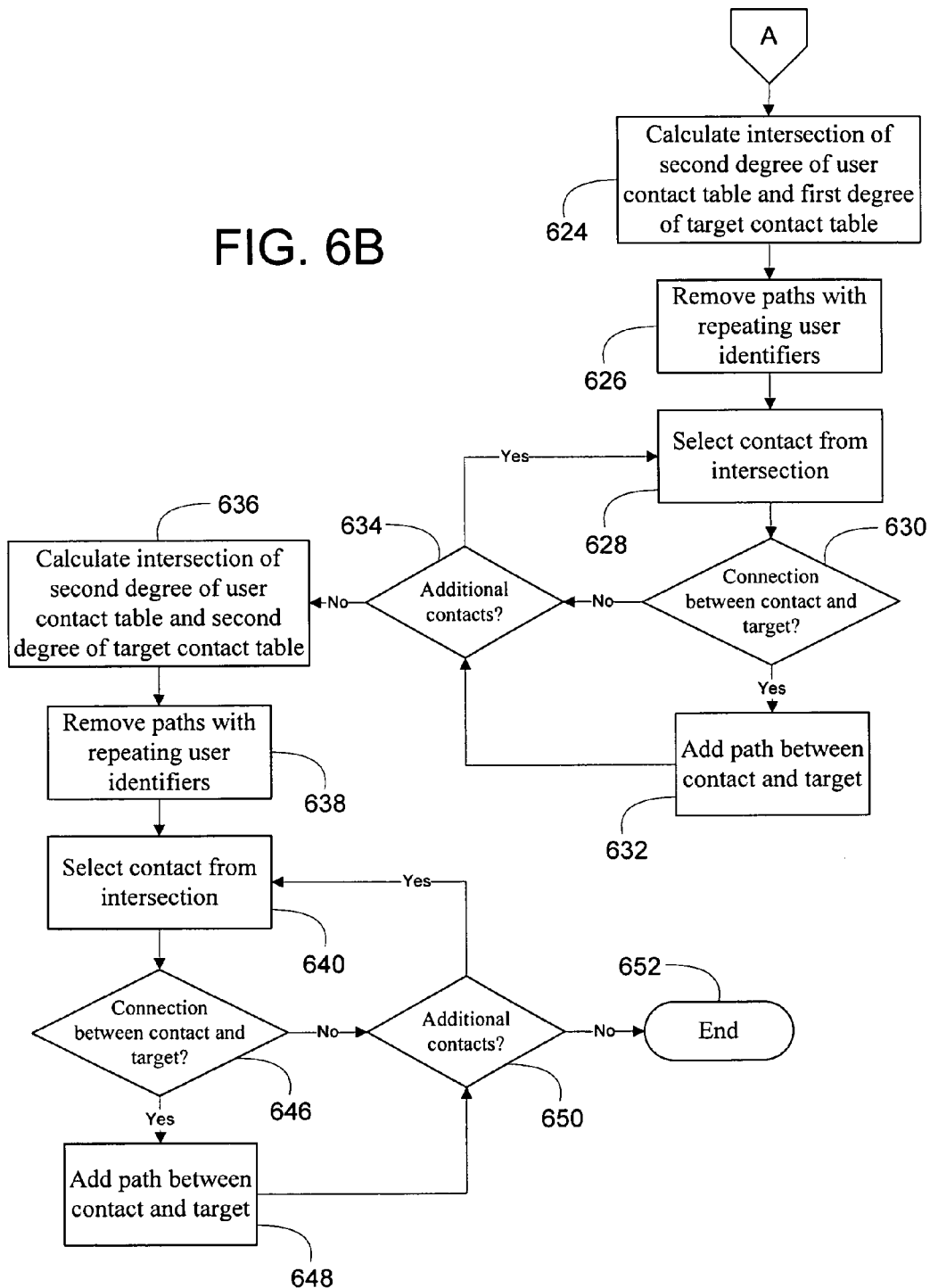

FIGS. 6A and 6B are flow diagrams illustrating a method for determining paths between individuals on the basis of relationship capital according to one embodiment of the present invention. The algorithm illustrated in FIGS. 6A and 6B is also illustrated by the following pseudo code and accompany comments of Table 1:

TABLE 1

```
function findPaths(userid, targetid)
    'get second degree results for user and target
    userCircle = getSecondDegree(userid)
    targetCircle = getSecondDegree(targetid)
    'check for one degree connection
    if inFirstCircle(target)
        addPath(userid|targetid)
    end if
    'check for two degree connections
    while (pathResult = inSecondCircle(target))
        addPath(pathResult)
    end while
    'check for three degree connections
    thirdCircle = makeThirdCircle(userCircle, targetCircle)
    while (pathResult = inThirdCircle(target))
        addPath(pathResult)
    end while
    'check for four degree connections
    fourthCircle = makeFourthCircle(userCircle, targetCircle)
    while (pathResult = inFourthCircle(target))
        addPath(pathResult)
    end while
end function
```

The method begins with step 602 in FIG. 6A, wherein a connection is opened to the data store, which may comprise a bi-directional read/write connection to thereby allow user information and connection information to be read and written to and from the data store. A given user and target are selected from the data store for which connection information is to be calculated, step 604. A two degree contact table is constructed for the user, step 606, as well as the target, step 608. An exemplary two degree table is illustrated in Table 2:

TABLE 2

| first user identifier | second user identifier |
|---|---|
| 11 | — |
| 18 | — |
| 27 | — |
| 11 | 9 |
| 11 | 27 |
| 18 | 5 |
| 18 | 12 |
| 18 | 32 |
| 27 | 35 |

According to the exemplary two degree table, the first degree relationships of the user comprise the set of users {11, 18, 27}, whereas the second degree relationships comprise the set of users {[11,9], [11, 27], [18,5], [18,12], [18,32], [27,35]}. Based on the two degree check is performed to determine if the target is within one degree of the user, step 610. If the target and user comprise a one degree relationship, a path is added between the two and written to the data store for storage and use, step 612, e.g., for weighting operations or searching, and the process ends for the current user/target pair, step 614.

Where the user and target are not related by one degree of separation, step 610, a given first degree contact is selected from the user's two degree contact table, step 616. A check is performed to determine the existence of a connection between the given first degree contact of the user and the target, step 618. Where a connection is present, a path is added between the two and written to the data store, step 620, and a check is performed to determine whether additional first degree contacts are present in the user's two degree contact table, step 622. If the check evaluates to true, processing returns to step 616, and a subsequent contact is selected.

Where there are no additional contacts in the user's two degree contact table, step 622, processing continues with FIG. 6B. A calculation is performed to determine the intersection of the second degree of the user's two degree contact table and first degree of the targets two degree contact table, step 624. The paths with duplicate identifiers may be removed from the intersection of the two tables, step 626. A given contact is selected (by identifier) from the intersection, step 628, and a check is performed to determine whether a connection exists between the contact and the target, step 630. Where a connection exists, a path is added between the two and written to the data store, step 632. A check is performed to determine whether additional contacts are present in the intersection, step 634. If the check evaluates to true, processing returns to step 628, and a subsequent contact is selected.

Where there are no additional contacts in the intersection, step 634, a calculation is performed to determine the intersection of the second degree of the user's two degree contact table and the second degree of the target's two degree contact table, step 636. The paths with duplicate identifiers may be removed from the intersection, step 638. A given contact is selected from the intersection, step 640, and a check is performed to determine whether a connection exists between the contact and the target, step 646. Where a connection exits, a path is added between the two and written to the data store, step 648. A check is performed to determine whether additional contacts are present in the intersection, step 650. Where the check evaluates to true, processing returns to step 640 with the selection of a subsequent contact, otherwise the process terminates, step 652. It should be noted that the method described may be expanded to encompass greater degrees of separation.

In another embodiment, the connection algorithm searches outward from both the user and the target, as follows:
1. Find all users known by user;
2. Find all users known by target;
3. If count from step 1 is lesser than the count from step 2, then explore next user degree, else explore next target degree In this embodiment, the algorithm proceeds to expand outward from the smaller of the user and target contact sets, until the maximum path length has been explored. This technique exploits the limiting effect that the target's own social connections have on finding path solutions, which may reduce the number of computations required to find a path solution.

The scope of a search through a given relationship network may be reduced by pruning paths that would result in a privacy violation, e.g., a path that goes through an intermediary whose inclusion would violate the privacy setting for the workgroups of any of the users preceding a given intermediary in the path. For example, assume that user one is a member of workgroup A, and user two is a member of workgroup B. Assume further that user two is a contact of user one, but workgroup B and workgroup A do not have an extranet connection. The connection engine may prune the remainder of the graph of the network that is rooted at user two.

Figure 7:
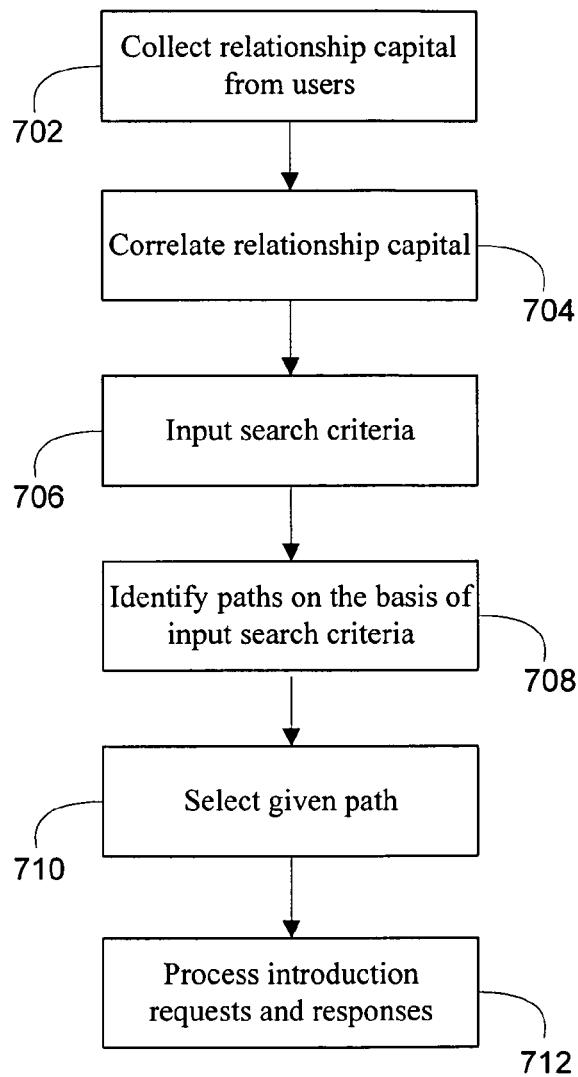
FIG. 7 is a flow diagram illustrating a process of identifying paths within the context collecting relationship capital and processing introduction requests.

FIG. 7 is a flow diagram illustrating a process of identifying paths within the context collecting relationship capital and processing introduction requests. The process begins with the collection of relationship capital from one or more users using the RCM system, step 702. According to certain embodiments, the collection of relationship capital is conducted manually, with each user supplying their relationship capital to the RCM system. Alternatively, the RCM system may auto-discover the user's relationship capital using techniques described herein and those generally known to those of skill in the art.

The RCM system correlates the relationship capital to eliminate redundancies, step 704. The correlation of relationship capital, both relationship capital that is being collected from a user as well as correlation with relationship capital previously collected by the system, advantageously limits intermediary fatigue by limiting the total amount of relationship capital in the RCM system to that for actual contacts and eliminating duplicate or redundant relationship capital. For example, if a user enters supplies relationship capital such as a name or an email address that is similar to relationship capital already in the RCM system, the system may ask the user to correlate and/or verify the information, or do so automatically.

Relationship capital is collected and correlated, steps 702 and 704, respectively, and made available to user for searching. Relationship capital may be searched according to search criteria that the user supplies, step 706, such as a name, address, title, etc. According to certain embodiments, the user may be presented with an initial result set of the search, which he or she may narrow to a single individual, e.g., the target. Paths are identified that connect the user to the target, which may comprise one or more intermediaries between the two, step 708. The user selects a given path from the one or more paths to the target, step 710, and may initiate the processing of introduction requests and responses between the user and the one or more intermediaries, step 712. The processing of introduction requests ultimately leads to the approval, conditional approval or denial of access to the relationship capital to which the user wishes to obtain access.

Figure 8:
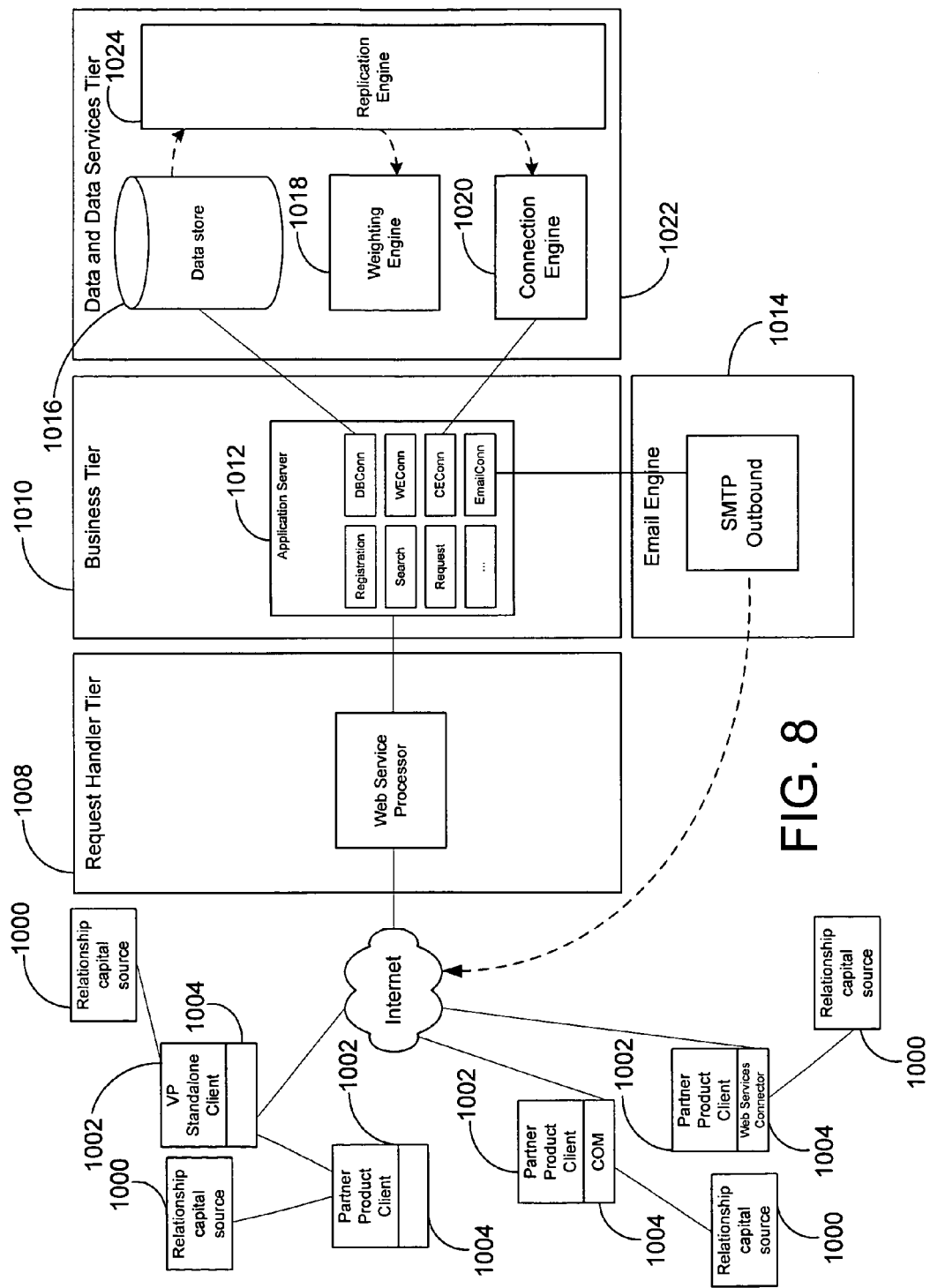
FIG. 8 is a block diagram illustrating a system for relationship capital management according to another alternative embodiment of the present invention.

Referring to FIG. 8, in further embodiments of a system for relationship capital management, a variety of client devices 1002 may invoke web services over the Internet to access the relationship capital management functions of the analysis system 1022, e.g., searching for the strongest path between two individuals. A client device 1002 may be any type of a computing device that is capable of providing the relevant functionality described herein, such as a personal computer, a workstation, a notebook computer, a tablet PC, a wireless device such as a cell phone, smartphone or personal data assistant ("PDA"), etc.

In one embodiment, a request handler tier 1008 receives web service calls from client devices 1002. The request handler tier 1008 may be a web service wrapper that maps each Web service call to a matching business function or transaction exposed via a business tier 1010. Both the request handler and business tiers, 1008 and 1010, respectively, may be implemented using Java or other programming and scripting languages, e.g., C#, python, PERL, ruby, Visual Basic, etc. The functionality of the analysis system 1022 may be exposed to clients 1002 through a set of Web services. A set of exemplary services that the system may implement is shown in Appendix A.

The program logic in the business tier 1010 may be implemented and exposed using Enterprise JavaBeans ("EJBs") hosted by an application server 1012, such as Tomcat (http://jakarta.apache.org/tomcat/). Transactions implemented in the Business Tier 1010 are enabled primarily through the use of three back-end data services available from the data and data services tier 1022: the RDMBS 1016, the connection engine 1020 and the weighting engine 1018. EJBs access back-end data services through the use of "connector objects", which expose such services through interfaces that shield any complexity associated with the underlying communication protocols, mechanisms, etc. Although the request handler 1008 is shown as a layer between the application server 1012 and the clients 1002, it should be understood that the application server 1012 may be exposed to the clients 1002 directly. Advantageously, the request handler 1008 may address considerations and implications outlined below in Table 3.

TABLE 3

| Consideration | Implications |
| --- | --- |
| Decoupling of business logic from Remote Procedure Call ("RPC") mechanisms | extensibility, compatibility, manageability |
| Shielding of processes which touch sensitive resources from uncontrollable client requests | security, reliability |
| Distinct processing, reliability, availability and swapability characteristics between processes that field client requests and processes that implement business logic | cost effectiveness, manageability |
| Minimizing connections held to back-end resources | Scalability |
| Isolation of development expertise | manageability, reliability |

Users may interact with the analysis system 1022 through the use of RCM client applications 1004. An RCM client application 1004 may be a standalone application, or an existing application that utilizes an RCM "plug-in" to provide access to the RCM functionality of the analysis system 1022. Typically, a user has a pre-established relationship capital from an existing relationship capital sources 1000 including, but not limited to, appointments, tasks and any other record involving multiple individuals, as well as collections of outbound and inbound message headers from prior email communications, in addition to other relationship capital. This relationship capital is synchronized with the data store 1016 for analysis by the weighting and connection engines, 1018 and 1020, respectively. For enterprise deployments, such synchronization must occur for as many enterprise users as possible. In addition, the synchronization function must take into account the complex enterprise messaging architectures, contact lists and directories. Techniques for relationship capital auto-discovery and mining are described in greater detail herein.

According to the embodiment of FIG. 8, interaction between clients 1002 and the analysis system 1022 occurs via electronic mail messages. For example, whenever introduction requests are made or responded to, emails may be generated to notify the users that the analysis system 1022 is initiating an action. The analysis system 1022 may also use email 1014 to validate a user's email address upon registration with the analysis system 1022. It should be understood by those of skill in the art that the analysis system 1022 may employ various other methods to notify users in this respect. Emails may be generated upon request and monitored for failed delivery attempts and erroneous responses. The system 1022 also provides processes for monitoring mail spools for "bounce backs," which it may log them accordingly in the data store 1016.

Figure 9:
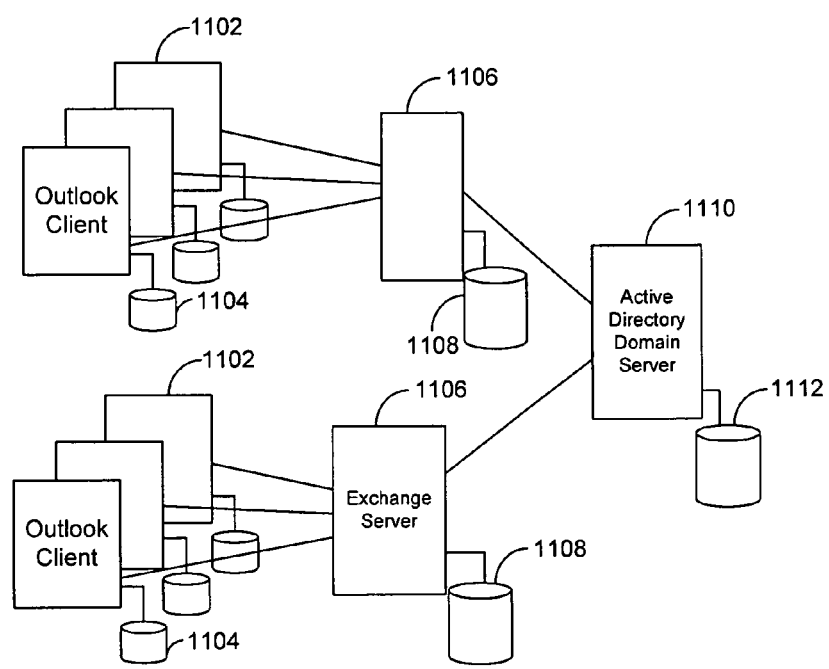
FIG. 9 is a block diagram illustrating a configuration of enterprise applications that are a source of relationship capital according to one embodiment of the present invention.

Clients 1002 and other devices within the enterprise may run one or more enterprise applications that integrate with the analysis system 1022. An exemplary integration as discussed herein relates to Microsoft Outlook and Exchange. It should be noted, however, that this discussion should not be construed as limiting. A typical deployment of Outlook/Exchange is shown in FIG. 9, which illustrates multiple Exchange Servers 1106 each provide email throughput to multiple Outlook clients 1102 and being served by a central Active Directory server 1110, which provides directory services for the Exchange servers. A given Outlook client 1102 can operate in one of two modes: Internet or Corporate/Workgroup. In one embodiment suitable for an enterprise deployment, Outlook may be configured for Corporate/Workgroup mode. It is understood that various techniques may be used to integrate the present invention into the relevant enterprise platform.

With respect to Outlook 1102, contact, directory and message data may be stored in various locations. The various Outlook clients 1102 may store both personal contact and message data locally, residing in a local database file named outlook.pst 1104. Outlook 1102 may also store personal contact and message data centrally 1108, on a designated Exchange server 1106, depending on the Exchange deployment configuration. Older versions of Outlook 1102 may store contacts in what is known as PAB's, or personal address books. The various Exchange servers 1106 may be stored public or private contact folders, message folders and distribution lists. The Active Directory domain server 1110 may store global address lists in a data store 1112, which include listings for all members of an enterprise, as well as certain "off system forwards."

Thus, in the embodiment in FIG. 9, contact, directory, and messaging data exists in three distinct locations: locally on the Outlook client 1102, centrally in an Exchange server 1106, (though potentially distributed in an enterprise amongst numerous servers) and centrally in the Active Directory domain server 1110. For each data store 1104, 1108, 1112, there are number of technologies that can be used to mine the relationship capital contained therein. For example, it is possible to use MAPI on a Microsoft Outlook Client, along with the Outlook object model, to traverse all data within view of a given client, regardless of the client's location. Additionally, it is possible to employ server-side script agents, which read directly from the Exchange server data stores. Finally, APIs exist for communicating with Active Directory.

In some embodiments, there may be two distinct aspects related to synchronization of data between an enterprise installation of Outlook/Exchange and the analysis system: 1) initial upload of all data at "a moment in time," and 2) ongoing updates to keep the relationship capital at the analysis system in synch with the live enterprise data. It should be understood from the prior discussion that synchronization of relationship capital may be accomplished in a variety of ways. For example, upload and synchronization of personal contact and message information being stored locally in Outlook may be accomplished by installing a client-side "MAPI walker" application on client machines, which retrieves message and contact information from Outlook. Since MAPI abstracts the actual data storage areas and provides a common interface to all contact and message folders, whether local or server-based, the MAPI walker is agnostic regarding whether the relationship capital resides on the local client or across a network.

In addition to the foregoing, synchronization may be accomplished with a MAPI interface that allows a user to specify the location of contacts and message data. Another technique employs the installation of a COM Plug-in that is installed on each appropriate application program. The plug-in is operative to trap all events, e.g., where a contact is added or edited, or where a message is sent or received. For each event, the relationship capital may be written to a local database, which is uploaded to the analysis system at pre-configured time intervals. In this way, the analysis system obtains an initial load of relationship capital, in addition to batch updates of all incremental changes.

According to embodiments of the invention, the RCM client application 1004 discussed in FIG. 8 is operative to mine raw relationship capital, which it uploads to an analysis system for storage. The RCM client application 1004 leverages the client's native data repositories and messaging technology interfaces. Such interfaces include Outlook (e.g., MAPI), Lotus Notes, ACT, Goldmine and salesforce.com, etc.

The RCM client application 1004 supports two modes of operation: user initiated and system initiated. User-initiated scanning involves an explicit instruction from the user to scan one or more relationship capital source at a specific moment in time. User-initiated scanning addresses the need to mine pre-existing data. System-initiated scanning, by contrast, occurs in one of two sub-modes: interval-based and event-based. The event-based sub-mode actively monitors the user's relationship capital sources for only new messaging activities that carry social networking implications. Interval-based scanning occurs at set intervals, e.g., daily or weekly. Irrespective of the mode, all scanning is preferably incremental; that is to say, the desktop shall have knowledge (a memory) of what has been scanned to date to minimize CPU utilization.

The RCM client application 1004 provides a number of user controls, including, but not limited to, determining the sources from which relationship capital is retrieved, specific items for scanning, determining the scanning mode (user-initiated versus system initiated), the scanning interval (continuous, daily, weekly, monthly, etc.) and a scanning rate. The RCM client application 1004 also provides for persistent retention of user settings, including, but not limited to scanning mode, interval-based scanning timers, and previously scanned relationship capital sources. The RCM client application 1004 provides the user with controls to disable the application, as well as launch an options menu to control the above-described processes. A description of the interfaces that embodiments of the RCM client application 1004 provide, along with the functionality of the interfaces, is discussed in detail herein. Appendix B further presents a number of exemplary functions for mining sources of relationship capital.

Figure 10:
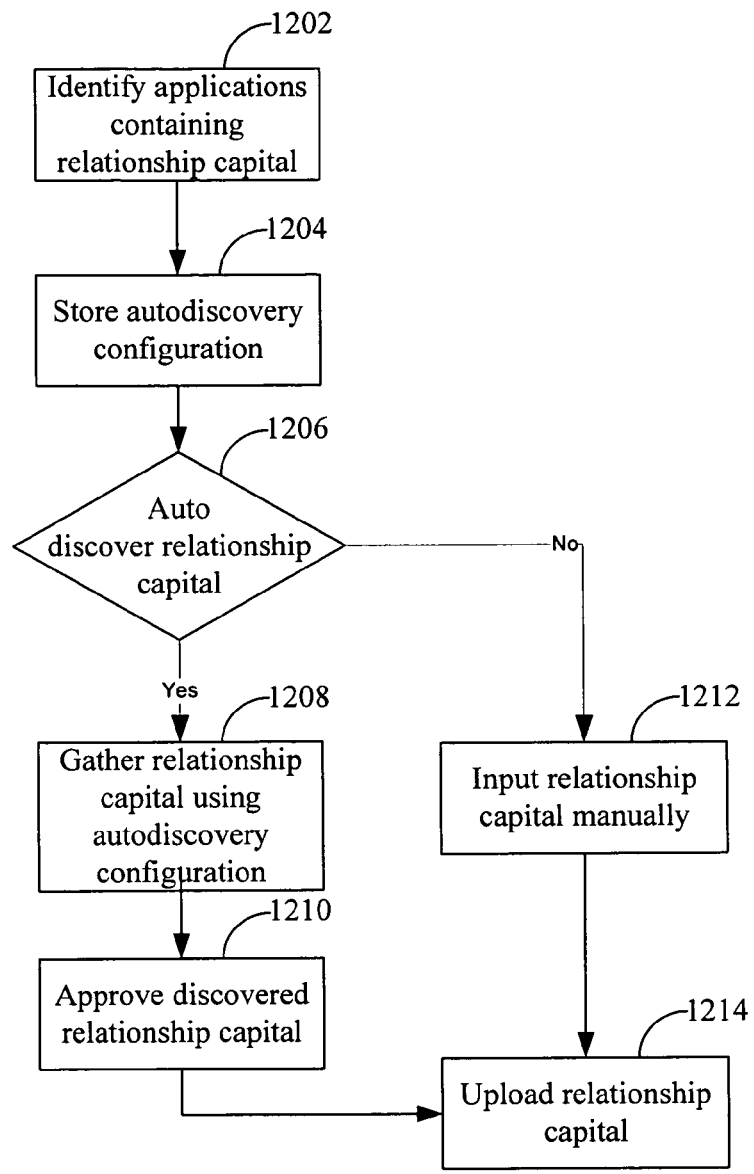
FIG. 10 is a flow diagram illustrating a process for identifying sources and auto-discovery of relationship capital according to one embodiment of the present invention.
Figure 14:
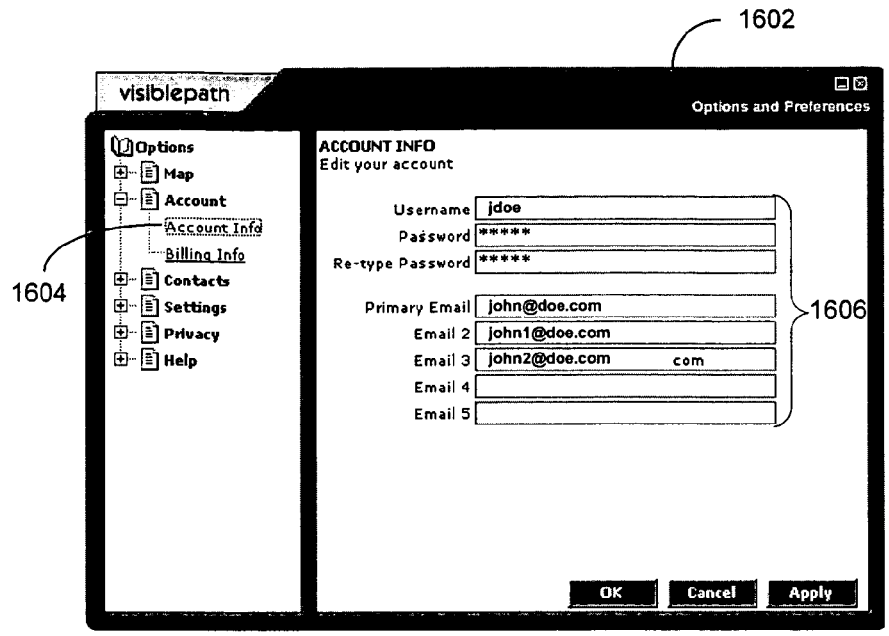
Figure 15:
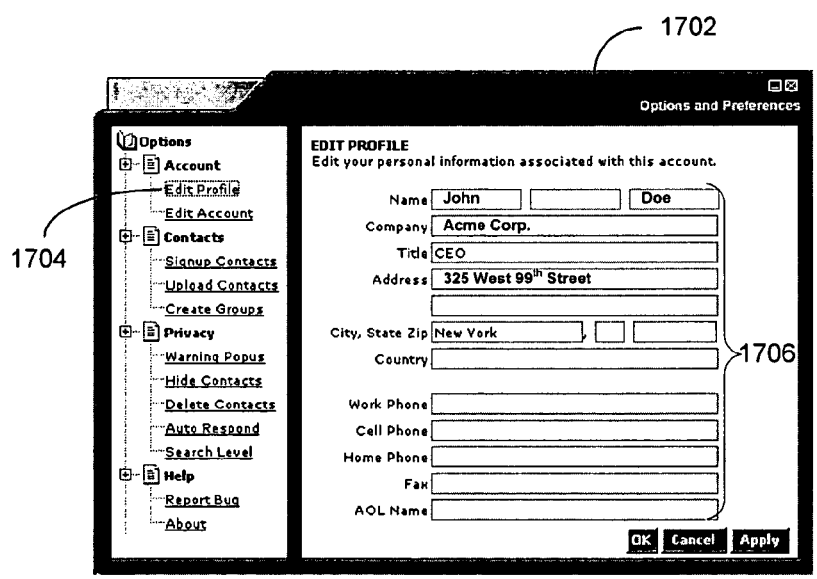
Figure 18:
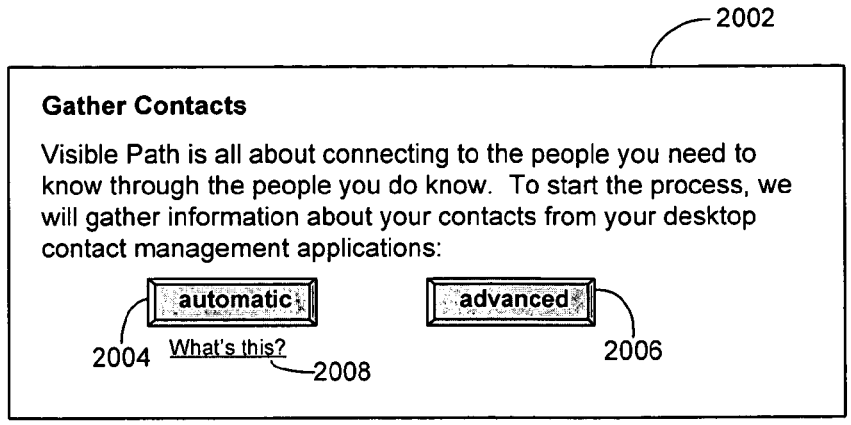
FIGS. 18 through 21 are window displays illustrating interfaces for auto-discovery and mining of user information according to one embodiment of the present invention.
Figure 19:
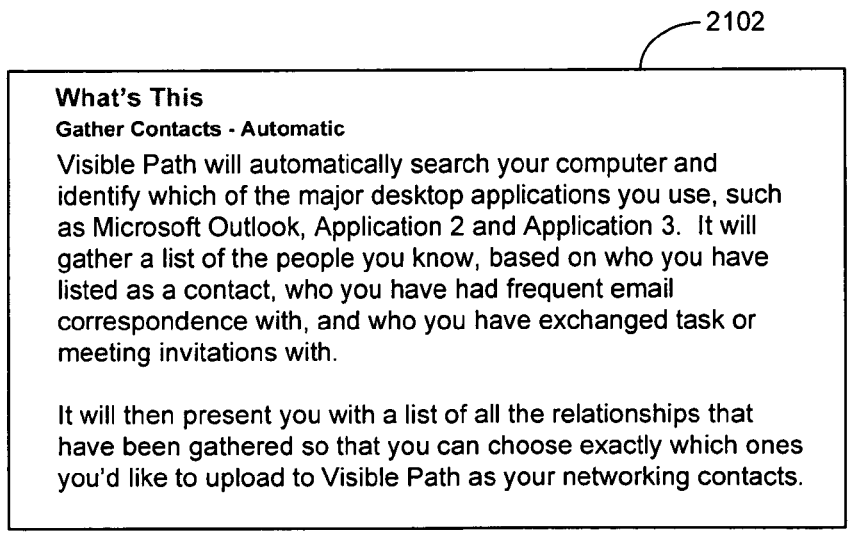

The RCM client application 1004 provides functionality for auto-discovery and collection of relationship capital from a user's relation capital sources, e.g., enterprise applications. FIG. 10 illustrates a flow diagram presenting one embodiment of a method for providing such functionality. The method comprises identifying applications containing relationship capital, step 1202. Identifying application containing relationship capital may comprise specific applications that contain relationship capital, and may also comprise identifying specific types of relationship capital from a specific application. For example, where the user identifies Microsoft Outlook as an application containing relationship capital, the user may further identify only email as the identified relationship capital within the application. The application that the user identifies and, optionally, the specific types of relationship capital, are stored in a configuration file, step 1204.

Relationship capital is auto-discovered according to a number of triggers, step 1206. According to one embodiment, the RCM system uses the information contained within the configuration file to periodically discover and retrieve a user's relationship capital, e.g., according to a frequency, or a schedule. Alternatively, the RCM client application may discover and retrieve a user's relationship capital for transmission to the RCM system. Upon occurrence of the trigger when auto-discovery is set, step 1206, the relationship capital is collected according to the configuration file, step 1208. The user may be provided with an opportunity to approve the discovered relationship capital, allowing the user to select specific pieces of relationship capital for exclusion from collection, step 1210. Alternatively, relationship capital may be uploaded and subsequently removed by the user.

There are situations where the user decides to refrain from auto-discovery and collection of relationship capital, step 1206. Where the user has not indicated auto-discovery of relationship capital, the user is provided with an opportunity to manually upload relationship capital to the RCM system, step 1212. Relationship capital is collected and approved and uploaded to the RCM system, step 1214.

Returning to FIG. 8, the RCM client application 1004, in conjunction with functionality that the analysis system 1022 provides, allows users to register with the system 1022. Advantageously, the registration employs correlation and currency techniques to reduce the amount of information that a user provides. Thus, various combinations of the RCM client application 1004 and the analysis system 1022 attempt to correlate information presently in the system with information that the user provides. For example, if a user enters a name or an email address during registration that is similar to information already in the data store, the system may display an intermediate screen that asks the user to correlate and/or verify the information. 101

Alternatively, or in conjunction, the system 1022 may also automatically correlate the existing data. For example, there may be times when multiple instances of the same user exist in the database, e.g., Antony may list John Doe at JD@yahoo.com, while Jeff may list John at john.doe@aol.com. Additionally, John may register to use the system as john.doe@yahoo.com. Different instances of the same user should therefore be tied together or correlated, when appropriate. It should be noted by those of skill in the art that correlation and currency are not necessarily tied to the registration process and may be implemented at other times, e.g., when the analysis system 1022 receives new relationship capital from a user for managing.

As noted above, correlation may be performed manually (explicit correlation), automatically (implicit correlation), or according to combinations thereof. The system may correlate instances of the same individual in order to reduce intermediary fatigue. For example, the contact Adam Ross may appear in the data store multiple times due to a particular user having several different "v-cards" for him in his contact manager. If there were no correlation, and a user were to initiate a search for Adam Ross, the system 1022 returns a result set that contains several matches for the same individual. If the user chooses to generate introduction requests (explained in greater detail herein) for each of the "versions" of Adam Ross based on the result set, the intermediaries connecting the user with the target receive multiple introduction requests for the same connection path to the same target, which is an exemplary cause of intermediary fatigue.

Multiple references to the same person may be implicitly correlated. For example, the system 1022 may use implicit correlation by treating email addresses as unique and as belonging to unique individuals. Thus, where multiple contacts in the data store each contain the same email address, an assumption is made that the email addresses belong to the same individual and the relationship capital should be correlated. Table 4 illustrates one embodiment of a decision matrix for determining correlation when email addresses are entered into the system. Table 5, presented subsequent to Table 4, illustrates one embodiment of a decision matrix for determining how two email addresses may be merged. The system may further ask users to verify implied correlations to ensure accuracy.

TABLE 4

|  | Registration (Users) | Synchronization (Contacts) |
|---|---|---|
| Email doesn't exist | Assign email to user | Assign email to contact |
| Email already exists for a contact | Re-assign email to user | Associate contact with NVPC |
| Email already exists for a user | Don't allow | Associate contact with VPC |

TABLE 5

|  |  | Email #1 | | |
|---|---|---|---|---|
|  |  | Email not in DB | contact | user |
| Email 2 | Email not in DB | Create 1 user id Associate both emails with user id | Associate email 2 w/ user id Potential to verify w/ contact owner | Associate email 2 w/ user id Potential to verify w/ contact owner |
|  | contact |  | Merge user id 2 w/ user id 1 Associate email 2 with user id 1 Lowest user id takes precedence | Merge both w/ user id of VPC |
|  | user |  |  | Don't allow |

In some embodiments, implicit correlation advantageously limits data entry when registering, as well as intermediary fatigue. Implicit correlation alone, however, may lead to errors. Explicit correlation combined with implicit correlation, where users are asked to approve or reject correlations that the analysis system 1022 intuits as being valid, results in fewer mistakes and adds a level of privacy protection to the system. Correlation according to one embodiment is discussed further in Appendix C.

According to embodiments that support second order relationship mining, correlation of second order relationships may be implemented. For example, assume that A is a user of the system and B, C and D are individuals known to the system whereby a first order connection exists from A to B and a second order connection exists from A to C. Continuing with the example, after additional relationship capital is uploaded into the system, B and D are correlated and all instances of B in the relationship network are replaced with D. Accordingly, A now has a first order connection to D and a second order connection to C, since B and D have been correlated and merged. If instead of the above example, B is correlated with C, the second order connection from A to C can be safely ignored or removed from the system since A already has a first order connection to B.

Figures 11, 12, 13:
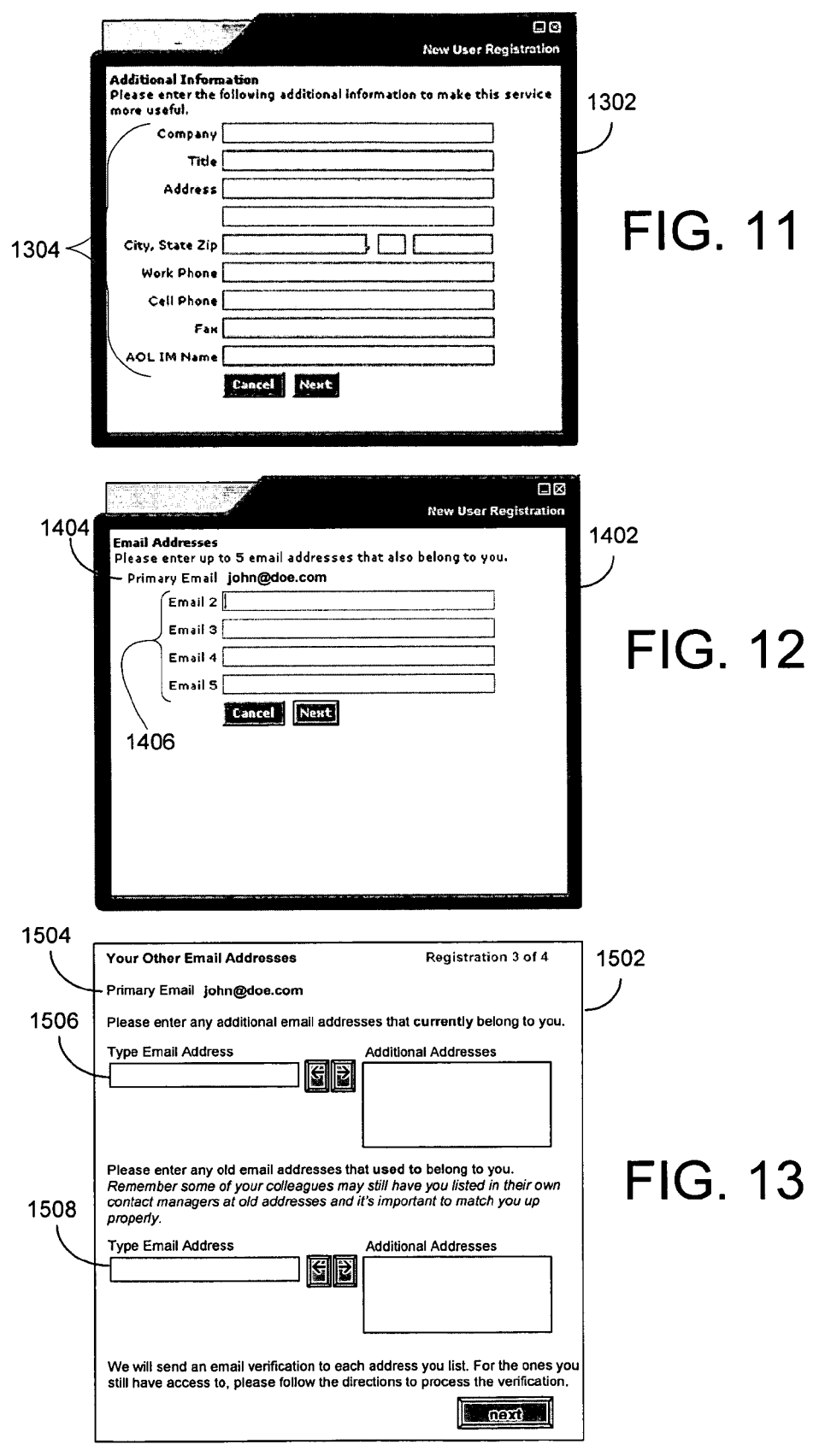

The RCM client application provides a number of interfaces for allowing a new user to set-up an account with the RCM system of the present invention. As shown in FIG. 11, a registration interface screen 1302 in some embodiments may include form elements 1304 for users to enter account information, such as a username, name, email address, password, etc. When a new user is responding to an invitation to join the RCM system, the new user's email addresses, name, etc., may be pre-populated in the form fields 1304 of the interface 1302 when they register. In this instance, the email address may be pre-validated since the email address is either entered by an administrator and/or is where access to registration originates.

The RCM client application may also use interfaces to obtain extended email information for a user. As shown in the interface of FIG. 12, the interface 1402 allows a user to supplement his or her primary email address 1404 with a number of secondary email addresses 1406 for inclusion in the user's profile that the system maintains. An alternative embodiment of an interface for allowing the user to enter a plurality of email addresses is illustrated in FIG. 13. The interface 1502 provides controls that allow the user to supply email addresses 1506 in addition to the user's primary email address 1504. Advantageously, the interface 1502 also allows the user to indicate old email addresses 1508 that are no longer in use, but were previously associated with the user. In this manner, the user may be properly associated with other users in the system who identify the registering user by an outdated email address, but that nonetheless have a relationship with the registering user.

The interface of the RCM client application may provide controls to a user that allows for review and editing of the user's account and profile information. According to the embodiment illustrated at FIG. 14, the interface 1602 provides a control 1604, the selection of which invokes the display of the user's account information. Using techniques well known to those of skill in the art, the user may edit the text boxes presenting account information 1606 through the interface 1602 to provide updated account information. Similarly, according to FIG. 15, an interface 1702 provides a control 1704, the selection of which invokes the display of the user's profile information. Again, using techniques well known to those of skill in the art, the user may edit the text boxes presenting profile information 1706 through the interface 1702 to provide updated profile information.

Where the system determines that the user's relationship capital, e.g., the name and/or email address of the user, matches that of another user or contact in the system, the system may display a registration screen asking the user to correlate the data with information already resident in the system. According to the embodiment of an interface illustrated at FIG. 16, the interface 1802 provides controls that allow the user to correlate information that exists in the system with his or her profile 1804. Only individuals whose title and company information are available is shown 1806 and 1808; if only the name is shown, there may not be enough information for the user to decide if information is indeed identifying him or her. According to one embodiment, the system makes matches based on a name value where there is other matching relationship capital, such as a phone number.

The system may also keep relationship capital that may be used to contact an individual hidden from the user.

The feature exposed by the interface of FIG. 16 increases the likelihood of the system properly correlating multiple instances of the same user. The following rules may be applied with regard to email addresses. If a user enters an email address that's already in system as another user's contact, the system may allow the user to correlate the contact information. If an email address matches that of another user, the user may receive an error with explanation. For each email address that the user adds, a verification email may be sent to that address. For old email addresses, where the email bounces or there is no rejection within a predetermined amount of days, the address may become part of the user's account. If a user lists another user's email address as a primary current address (and can validate the address), the user may claim it from the user that listed the address.

The system also provides a user with the ability to manage all companies to which the user belongs. The graphical interface 1902 illustrated at FIG. 17 presents one or more companies to which the user belongs 1916 and related information regarding each company, 1906, 1908, 1910, 1912 and 1914. Information regarding a company 1916 includes, but is not limited to, the company name 1906, a company administrator 1908, the user's status with regard to the company 1910, and any outgoing or incoming restrictions, 1912 and 1914, respectively. The interface 1902 also provides control for removing a company to which the user belongs 1918.

In addition to account setup and maintenance, embodiments of the relationship capital RCM client application give users control through graphical interfaces over various aspects of the process for gathering relationship capital in order for the user to retain control over their relationship capital. Advantageously, the system provides information through its graphical interfaces sufficient for the user to understand how their relationship capital is being used by the system, thereby allowing the user to make better-informed decisions with regard to that relationship capital uploaded to the system. The user should have control in the following stages:
1. Relationship capital gathering—where the system looks for contact info on the client computer [e.g., what applications and systems];
2. Relationship capital approval—which data is actually uploaded to the RCM system's data store; and
3. Relationship capital information data usage—how the data is used by other users of the RCM system
   i. Broadly (e.g.—hide contact information)
   ii. On a case-by-case basis (e.g.—rejecting or approving particular introduction request with individuals whose relationship capital is owned by the user).

As discussed above, the RCM client application, which may act in concert with the RCM system, collects relationship capital from system users for management. Illustrated at FIG. 18, the system may provide an interface 2002 through which the user may select automatic 2004 or advanced 2006 collection of relationship capital. The interface may also provide a control 2008, the selection of which presents the interface of FIG. 19, which illustrates an interface 2102 providing additional information regarding the automated relationship capital collection process.

Figure 20:
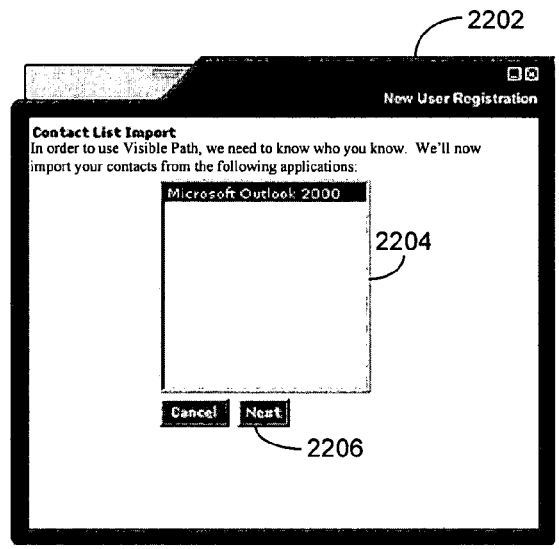
Figure 21:
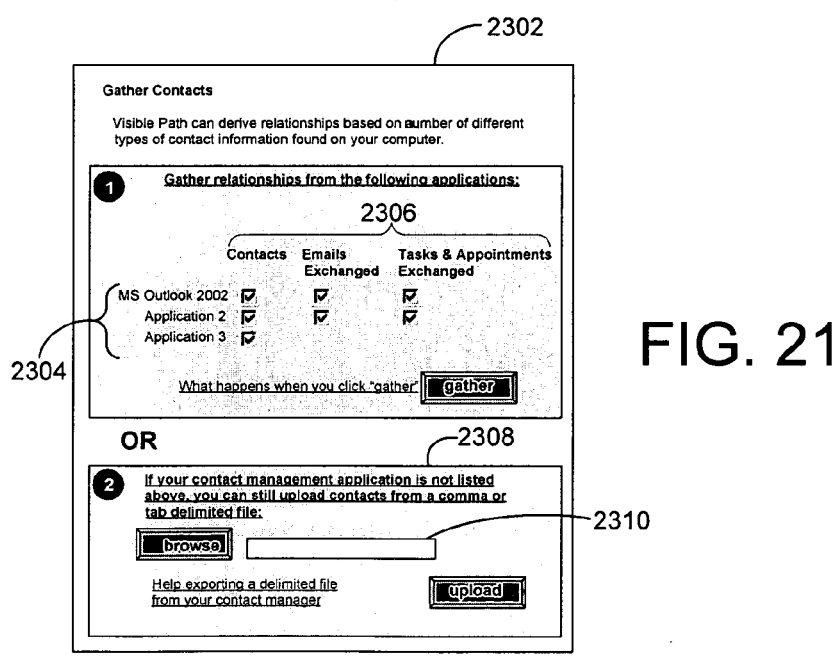
Figure 22:
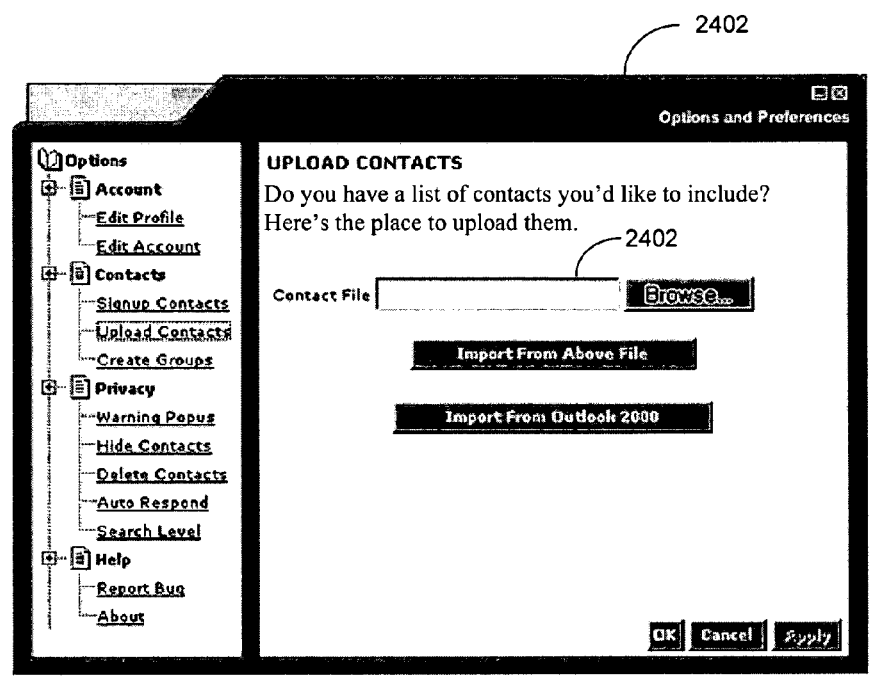
FIG. 22 is a window display illustrating an interface for uploading user contact information according to one embodiment of the present invention.

FIGS. 20 through 2 present embodiments of graphical interfaces that allow a user to identify the sources of relationship capital for management by the present system. According to FIG. 20, the interface 2202 allows the user to identify applications 2204 for retrieval of relationship capital. After the user identifies the source of relationship capital for management, the graphical interface of FIG. 21 allows the user the set the "granularity" of the relationship capital for management by the system. The interface 2302 presents a listing of sources of relationship capital 2304 that the user identifies and allows the selection of only certain types of relationship capital 2306 from those sources for the system to gather. As an alternative, the graphical interface 2302 allows the user to identify 2308 and upload a data file that contains relationship capital for management. The data file may be of any type known to those of skill in the art including, but not limited to, a tab delimited data file, a comma separated value data file, etc. Similarly, FIG. 22 presents another graphical interface 2402 that allows a user to identify a contacts file 2402 that contains relationship capital for management by the system.

The system gathers relationship capital from the sources that the user identifies, a graphical interface may be displayed, such as the embodiment illustrated at FIG. 23, which lists the gathered relationship capital and that allows the user to explicitly approve those contacts that get imported into the system's data store. Alternatively, the user may identify specific relationship capital for importing into the system's data store, which may then collected by the system. According to the embodiment illustrated at FIG. 23, the interface 2502 presents a listing of the user's relationship capital 2504, for example, contacts that the system identifies from the user's relationship capital. In this respect, the user has complete control with regard to the relationship capital that he or she uploads for sharing with other users. The graphical interface 2502 includes elements, such as a slider bar 2506, which allows a user to specify the relative strength of their relationship with a given contact. Alternatively, or in addition, the system may scan the user's relationship capital to calculate an initial strength of the relationship. The system may also rate the strength of the relationships, graphically display the relationship strength rate, and allow the user to edit the rating if they want. In this instance, the elements, such as the slider bar, are pre-populated with the relationship strength rating, which may be modified by the user.

Figure 24:
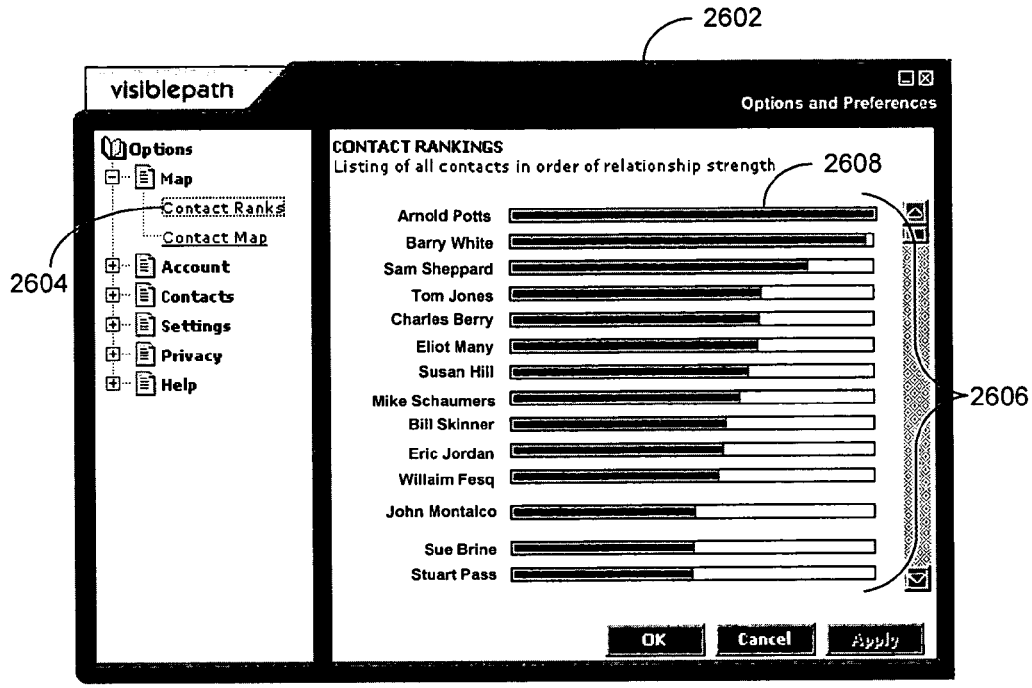
FIG. 24 is a window display illustrating an interface for displaying user contacts in order of relationship strength according to one embodiment of the present invention.

Regardless of the specific technique or techniques that are employed to calculate the weight of the user's relationships with other individuals on the basis of the user's relationship capital, the system provides interfaces for reviewing the weights. FIG. 24 presents one embodiment of an interface 2602 through which the user may view the path strength 2606 of connections with various individuals. Each of the user's contacts is associated with a graphical representation 2608 of the weight of the user's relationship with a given individual, which the RCM client application may display upon selection of a control 2604 that the RCM client application displays within the interface 2602. Selection of the control queries the RCM system to return the relevant information.

Figure 25:
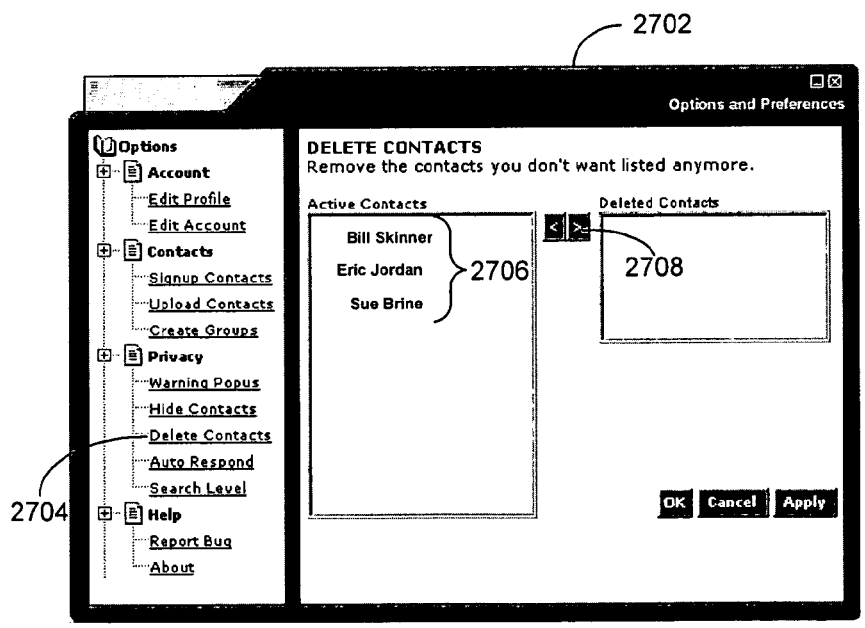
FIG. 25 is a window display illustrating an interface for managing user contact information according to one embodiment of the present invention.

Turning to FIG. 25, RCM client application may further display a graphical interface 2702 that allows the user to remove an individual from the list of individuals with which the user has a relationship. The RCM client application presents the graphical interface 2702 upon selection of a control 2704 by the user that the client displays within the graphical interface 2702. The user may select one or more individuals 2706 for removal using control 2708 to add the individual to a deletion list. Upon completion of the changes, the RCM client application transmits the changes in relationship capital to the RCM system managing the user's relationship capital for recordation in the RCM system's data store.

Figure 26:
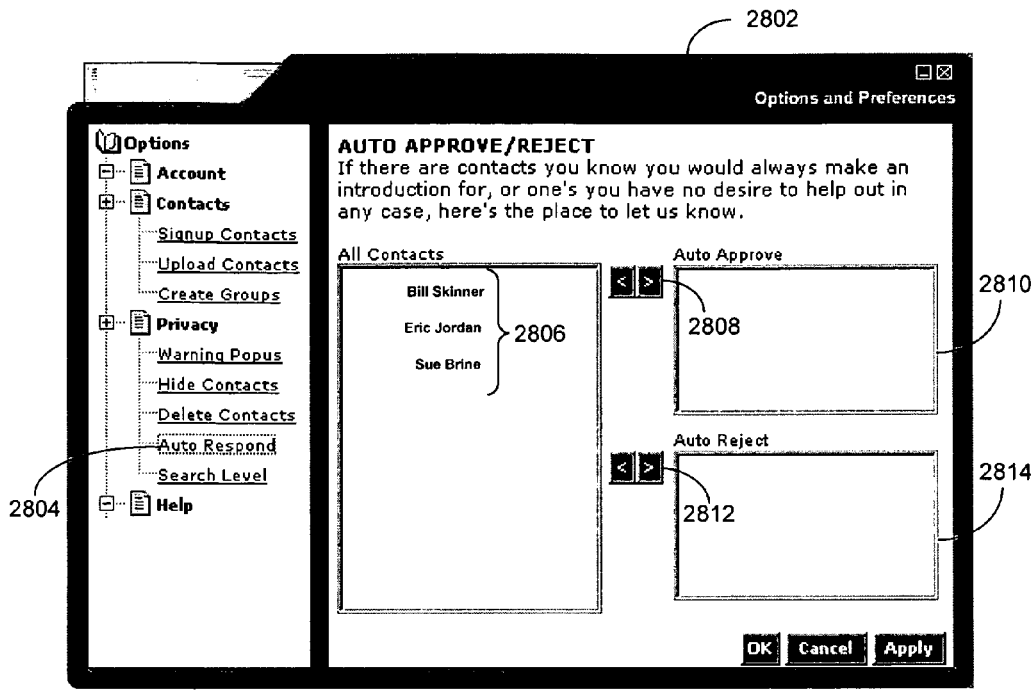
FIG. 26 is a window display illustrating an interface for setting auto-approval or auto-rejection criteria for user contacts according to one embodiment of the present invention.

FIG. 26 presents a graphical interface that the RCM client application presents through which the user may define global actions to be taken in response to incoming requests for access to the user's relationship capital. Aspects of the present invention that relate to ownership of and access to relationship capital are described in greater detail herein. The interface 2802, which the RCM client application displays upon selection of a control 2804 by the user that the client displays within the graphical interface 2802, allows the user to set relationship capital to which all other users always have access and relationship capital to which other users never have access.

The graphical interface 2802 displays the users' relationship capital as a list 2806. Selection by the user of a first control 2808 adds a selected piece of relationship capital, e.g., a contact, to an "auto approve" list 2810. Requests for access by other users for relationship capital on the user's auto approve list 2810 are approved by the RCM system in an automated fashion. Selection by the user of a second control 2812 adds a selected piece of relationship capital to an "auto refuse" list 2814. Requests for access by other users for relationship capital on the user's auto refuse list 2814 are refused by the RCM system in an automated fashion. Upon completion of the changes, the RCM client application transmits the changes in relationship capital to the RCM system managing the user's relationship capital for recordation in the RCM system's data store.

Figure 27:
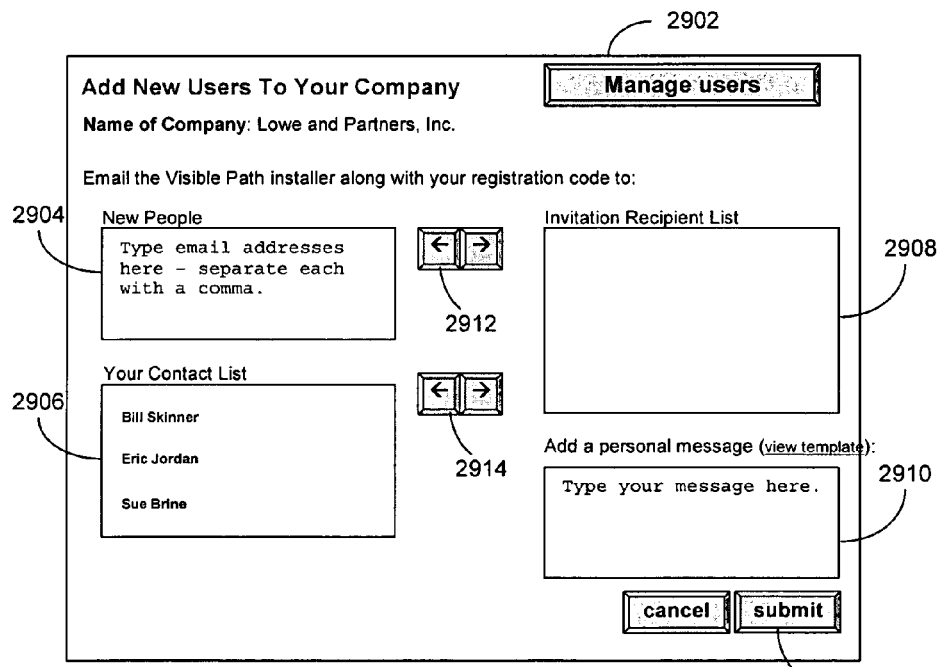
FIGS. 27 through 29 are window displays illustrating interfaces for managing relationship capital according to one embodiment of the present invention.

One embodiment of a graphical interface that the RCM client application presents to an administrator for adding users of the RCM system to a company is illustrated in FIG. 27. The client displays a text entry box 2904 and a list of relationship capital 2906 along a left side of the interface 2902. Using the text entry box, the administrator may enter email addresses for people the administrator wishes to invite to use the RCM system. Selection of a control 2912 records the addresses in an invitation recipient list 2908. Similarly, the administrator can select one or more contacts that the administrator wishes to invite to use the RCM system. Selection of a control 2914 records the selected contact in the invitation recipient list 2908. The interface 2902 also provides a text entry box to write a personal message 2910. Selection of the submit control 2916 transmits the recipient list to the RCM system, which sends the personal message the individuals on the invitation recipient list, optionally with program code that allows the individual to install and run the RCM client application.

Figure 28:
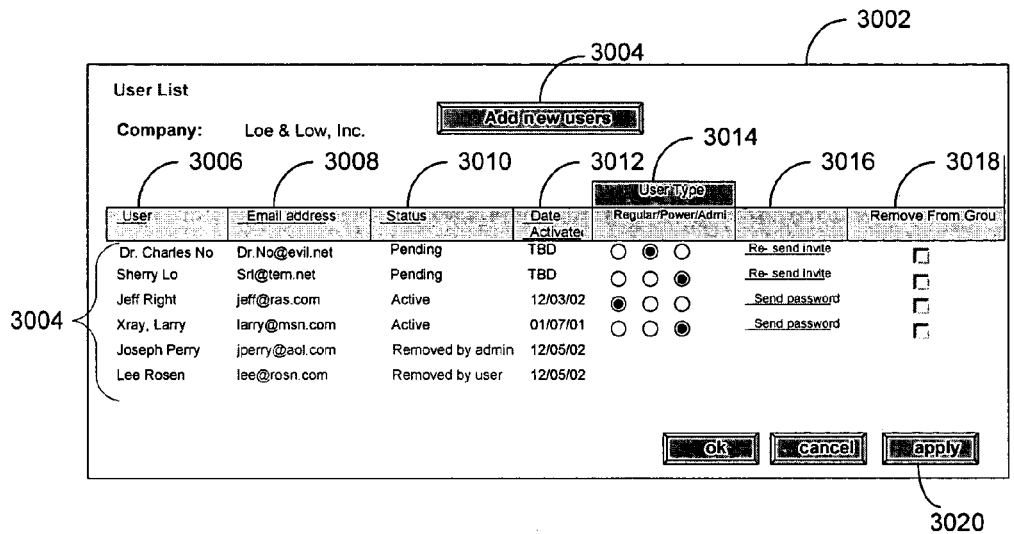

FIG. 28 illustrates an embodiment of another administrative graphical interface 3002 that the RCM client application present for detailed management of users within a company. The interface 3002 presents a listing 3004 of all users that are part of a given company, in addition to a control 3004 that allows the addition of new users to the list 3004. The graphical interface 3002 provides information regarding each user including, but not limited to, username 3006, email address 3008, user status 3010, the date of activation for the user 3012, radio controls 3014 to set user type, a control to resend an invite (for pending users who have not yet joined the RCM system) or password (for active users), and a checkbox 3018 to set the removal of a user from the given company. Where the administrator makes changes, e.g., setting the removal status of a user 3018, selection of the apply control 3020 transmits the changes in relationship capital to the RCM system managing the company's relationship capital for recordation in the RCM system's data store.

Figure 29:
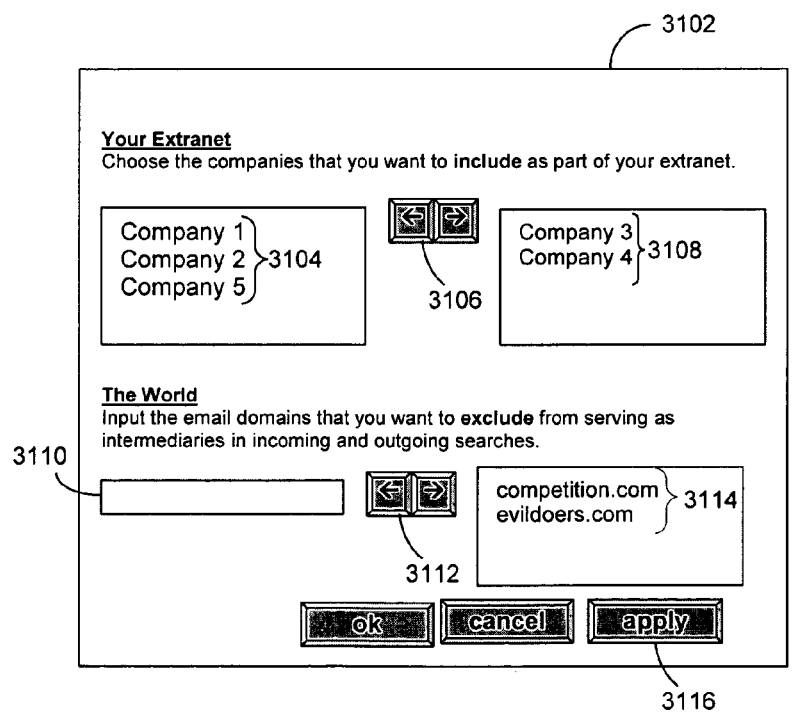

FIG. 29 illustrates an embodiment of a third administrative graphical interface that the RCM client application presents for configuring groups of companies or extranets. The interface 3102 presents a listing 3104 of companies that the administrator directs. The administrator selects companies for inclusion within the extranet 3108 and effects the selection by use of a control 3106. The interface 3102 also allows the setting of domains for exclusion from serving as intermediaries in incoming and outgoing searches. The administrator provides the domain name in a text entry box 3110 and adds the domain to the exclusion list 3114 through selection of control 3112. Where the administrator makes changes, e.g., adding a domain to the exclusion list 3114, selection of the apply control 3116 transmits the changes to the RCM system managing the company's relationship capital for recordation in the RCM system's data store.

The graphical interfaces for gathering and approval of relationship capital have been heretofore described. The processes and graphical interfaces for exploration of relationship capital managed by an RCM system are described in greater detail herein.

Figure 30:
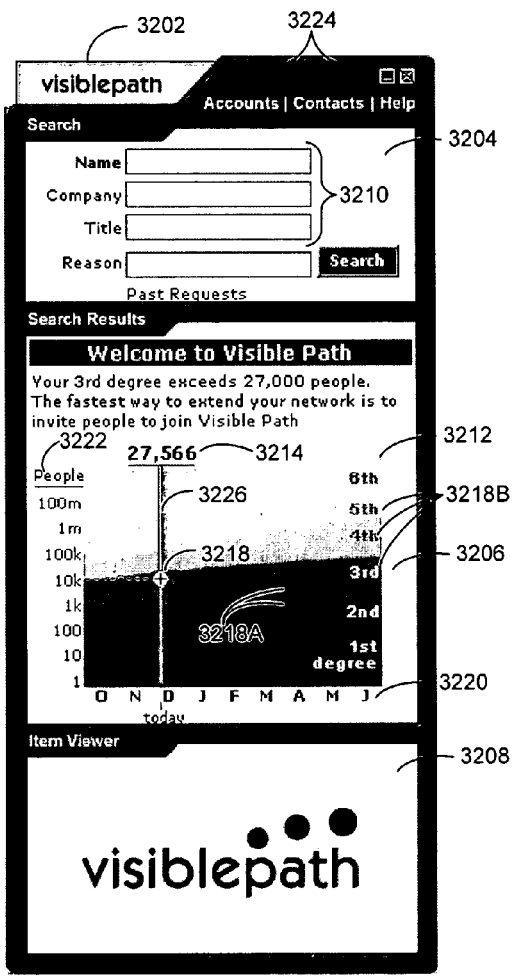
FIGS. 30 through 32 are window displays illustrating interfaces for presenting summary information regarding a given user's relationship network according to one embodiment of the present invention.

In addition to providing the user with an interface to functions for collecting and categorizing relationship capital, as well as setting options regarding his or her relationship capital, the RCM client application provide interfaces that expose functions of the RCM system, e.g., those provided by the connection engine and weighting engine, for exploration of the user's relationship capital. FIG. 30 illustrates a graphical interface according to one embodiment of the present invention that allows for searching of relationship capital that the RCM system is managing. The graphical interface 3202 is split into three general frames: a search criteria frame 3204, a search results frame 3206 and an item viewer 3208. The search criteria frame 3204 comprises a number of text entry boxes 3210 that allow the user to set criteria for the RCM system to use in searching the relationship capital that it is managing. The item viewer frame 3208 remains empty until the user runs a search and selects an item in the result set, which the search results frame 3206 displays. The interface also includes menus 3224 for accessing other RCM system functions such as those described above.

Prior to running a search, or in response to a user command, the search results frame 3206 may display a graph that analyzes or provides an overview 3212 of the user's relationship capital. According to the embodiment of FIG. 30, the analysis 3212 is a graph of the user's relationship capital wherein a first axis 3222 demarcates numbers of people and a second axis 3220 demarcates date, e.g., months of the year. Within the graph 3212 is an indication of the current date 3226, along which is a further indicator 3218 of the number of individuals who are within three degrees of the user, as is described herein in greater detail; the numeric value 3214 of the number of individuals within three degrees of the user is also indicated.

The graph 3212 also provides the historical 3218A and anticipated number of individuals 3218B that have been or are anticipated to be within various degrees of the user. Thus, the graph 3212 that the RCM client application display through its graphical interface 3202 provides the user with information regarding the number of individuals within a given degree of the user on past dates 3218A, as well as predictions regarding the anticipated number of individuals 3218B that are predicted to be within various degrees of the user. For example, using the graph 3212, the user may easily determine that there were one thousand individuals within two degrees on the first of October.

Figure 31:
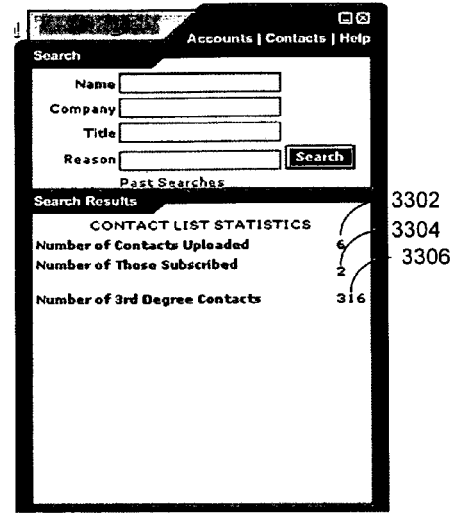

According to another embodiment of the search frame illustrated in FIG. 31, the frame displays numeric information regarding the user's relationship capital. The display includes, but is not limited to, the number of contacts that the RCM system is managing 3302, of those contacts, the number that are also users of the RCM system 3304 and the number of individuals identified by the relationship capital that the system is managing that are within three degrees of the user 3306. The RCM client application receives these data from the RCM system for display to the user.

Figure 32:
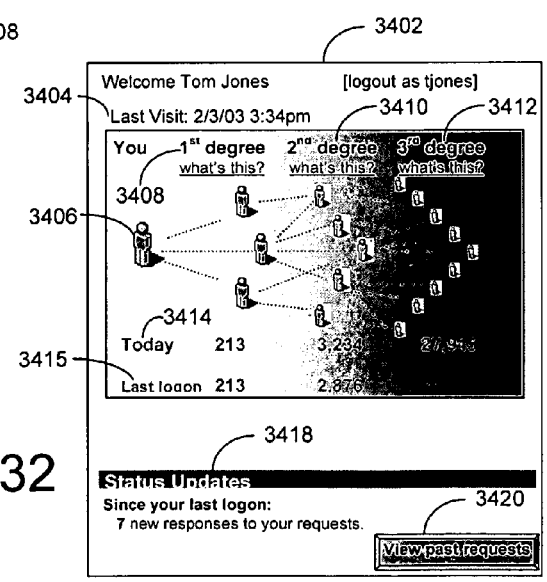

According to a third embodiment of the search frame illustrated at FIG. 32, the search frame 3402 presents a graphical representation of the relationships exposed by the relationship capital that the RCM system is managing, along with the date and time that the user was last using the RCM system 3404. The graphical representation depicts the user 3406 in conjunction with the number of individuals that are within the first 3408, second 3410 and third 3412 degrees from the user 3406. Below each of the graphical depictions of the individuals within each degree (3408, 3410 and 3412) is the numeric indication 3414 of the number of individuals within each degree. It can be seen that the user is connected directly connected to 213 individuals, connected by one intermediary to 3234 individuals and connected by two intermediaries to 27,945 individuals. Similarly, the frame 3402 displays the numeric indication 3416 of the number of individuals within each degree of the user on the date the user was last using the RCM system. The frame 3402 may display status updates 3418 to the user and provide controls to view past requests 3420.

The RCM client application creates the graphical representation 3402 using values derived by the RCM system on the basis of the relationship capital that it is managing. Alternatively, the graphical representation 3402 may be created remotely from the RCM client application, e.g., at the RCM system, and delivered to the RCM client application for display.

Figure 33:
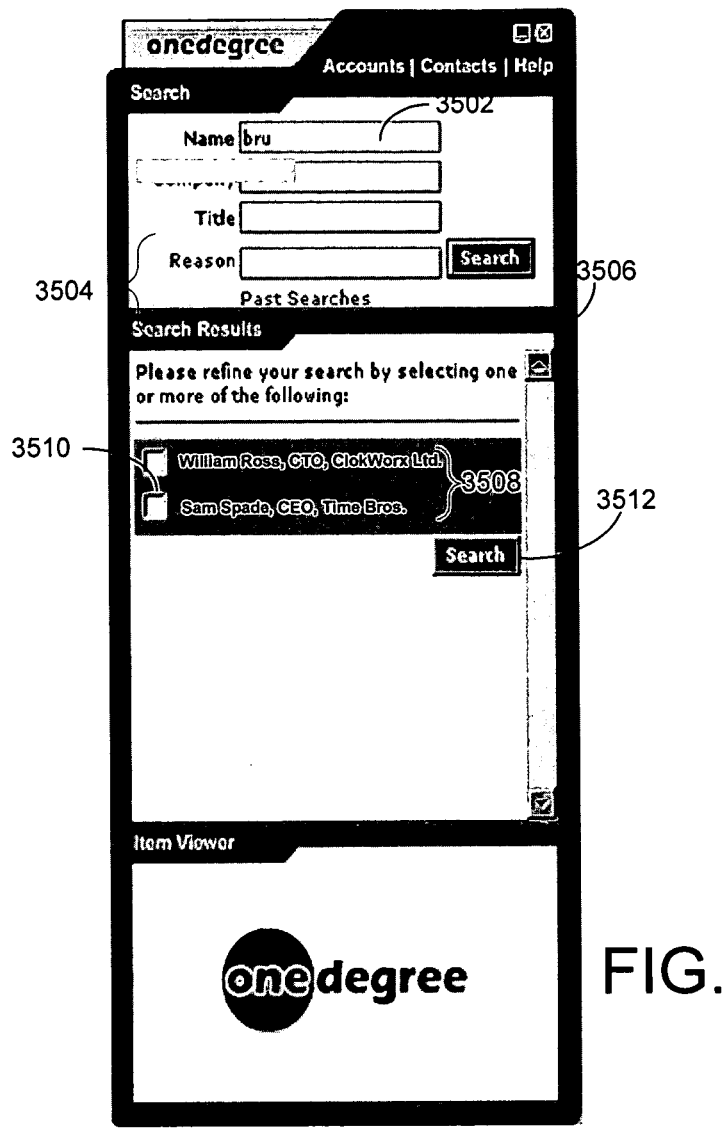
FIG. 33 is a window display illustrating an interface for narrowing a search for a target according to one embodiment of the present invention.

In some embodiments, the following guidelines may be used in categorizing the relative degrees of contacts:
1. 2nd degree contacts may include all valid contacts that could be considered a 2nd degree contact for a "safe search", e.g., contacts based on relationship capital that the user provides, as opposed to those identified from the relationship capital of other users;
2. 3rd degree contacts include all valid contacts that could be considered a 2nd degree contact for a "safe search";
3. Responses since last visit should total all requests that have changed in status since date/time of last activity of last logon; and
4. Last activity of last logon session (vs. date time of logon from last session) so it doesn't include response that occurred during that last session, such as auto-responses.

Where the user decides to run a search for other individuals, he or she may use the RCM client application's search frame, an embodiment of which is illustrated at FIG. 33. The user uses the text entry 3504 or other controls to specify search criteria for identifying relationships. Such exemplary criteria may include a target name, title, company, etc. Upon entering the search criteria through the controls 3504 that the interface 3502 provides, the user selects a control 3506 that initiates the search. The RCM client application transmits the search criteria to the RCM system, which uses functionality that the connection engine provides to explore and expose relationships that are contained in the relationship capital that the system is managing. The RCM system may return a result set comprising one or more individuals 3508 that fall within the scope of the search criteria set by the user. The RCM client application may provide a check box 3510 or other similar graphical control that allows the user to narrow the search to one particular individual in the result set upon selection of a control 3512. In some cases, the user may be able to save the search criteria for the system to run periodically and alert the user of new results.

Figure 34:
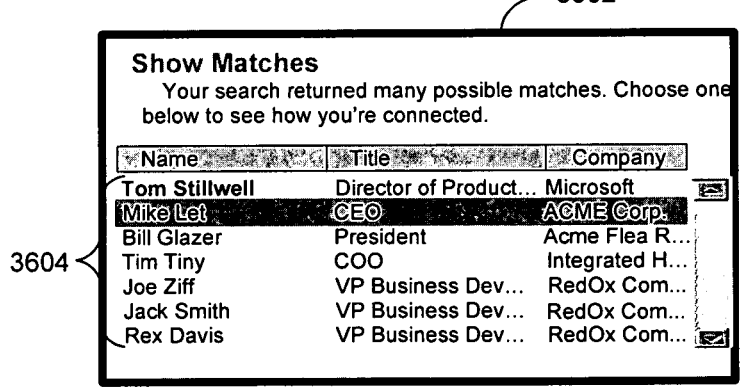
FIG. 34 is a window display illustrating an interface for selecting a target for a plurality of possible targets according to one embodiment of the present invention.

According to one embodiment, the RCM system returns a list of one or more individuals that match the search criteria 3606 that the RCM client application displays in a search results graphical interface 3602, as is illustrated in FIG. 34. The RCM system may also correlate multiple instances of a match when possible (e.g. when the email matches), displaying ancillary information available (title, company) for that match. The user, by setting options at either the RCM system or client application, may limit the list to matching individuals that are within a certain degree of relatedness to the user, such as in the third degree, fourth degree, etc. In this respect the user may not be provided with individuals to whom they are not connected through any intermediaries. Exemplary search methodologies are provided in Appendix D. A user may select one or more individuals from the list of matches to view additional information regarding the target.

Turning to the embodiment of RCM client application interface illustrated at FIG. 35, the graphical interface 3702 comprises the above described search criteria frame 3704, search results frame 3706 and item viewer 3708. According to the illustration, a user has entered several characters of an individual's name as the search criteria 3710. After selection of a search control 3712, the RCM client application transmits the query to the RCM system for generation and return of a result set, which the RCM client application displays in the search results frame 3706. The search results frame 3706 displays information regarding the individuals that fall within the scope of the results set, including, but not limited to, the status 3714 of the individual with respect to the user (as is explained in greater detail herein), the degrees of separation 3716 between the user and the individual (e.g., the number of intermediaries connecting the two) and the strength of the path 3718 connecting the individual to the user. Selection of a given individual 3720 causes the RCM client application to display extended information 3722 in the item viewer 3708 regarding the individual that the RCM system returns in response to the search query. The graphical interface 3702 also provides a control 3724 to enable a "map" view, which is described herein in greater detail.

In response to the selection of a given individual, the RCM client application may show detailed path information regarding the intermediaries between the two. FIG. 36 illustrates one embodiment of such a graphical interface 3802 for the display of detailed path information regarding the intermediaries between the user and a given individual within a result set. The RCM client application receives the path information from the RCM system and presents a listing of the paths between the user and the selected individual, which presents information such as path status 3804, degree of separation 3806 and path strength 3808. In some cases, the user may elect to save the set of paths to this individual so that the system might periodically alert the user of updates to the set, including new paths between the user and the individual, changes in the strength of the paths, or changes in the approval status of the paths.

Advantageously, the graphical interface 3802 may include an introduction status indicator for each path 3810, 3812, 3814, 3816, 3818 that indicates the introduction status of a path as indicated by the RCM system. According to the present embodiment, introduction status indicators 3804 may be a red stoplight 3816 (indicating that an introduction request has been denied by one or more relationship owners in the path), a yellow stoplight 3814 (indicating that an introduction request has been conditionally approved by one or more relationship owners in the path) or a green stoplight 3810 (indicating that an introduction request has been approved by the one or more relationship owners in the path).

The introduction status indicator 3804 may also comprise a grey stopwatch 3818 that indicates that an introduction request has been sent to one or more relationship owners in the path, or may comprise no indicator 3812 where an introduction request has not been sent to one or more relationship owners in the path. It should be noted that the current status of a path's introduction status 3810, 3812, 3814, 3816, 3818 may change over time on the basis of introduction status information that the client receives from the RCM system.

The graphical interface 3802 may also provide the strength for the paths 3808 between the user and selected individual. A particular path through one or more particular intermediaries to a particular target individual is typically a persistent entity once the RCM system begins managing relationship capital that identifies the relationships. The strength of the path however, may, change over time, which is reflected in the path strength graphic 3822 on the basis of path strength information that the RCM system returns to the RCM client application. The interface 3802 may initially sort the paths 3808 according to path strength, which the use may override by selection of the column headings 3804, 3806 and 3808.

When the user selects a given path, the RCM client application presents a map graphical interface that depicts a graphical representation of the paths to individuals for which the user is searching. The RCM client application may receive the map from the RCM system, or alternatively, the RCM client application may receive from the RCM system data sufficient to generate and render the map. FIGS. 37A through 37F illustrate embodiments of the map graphical interface.

Figure 37A:
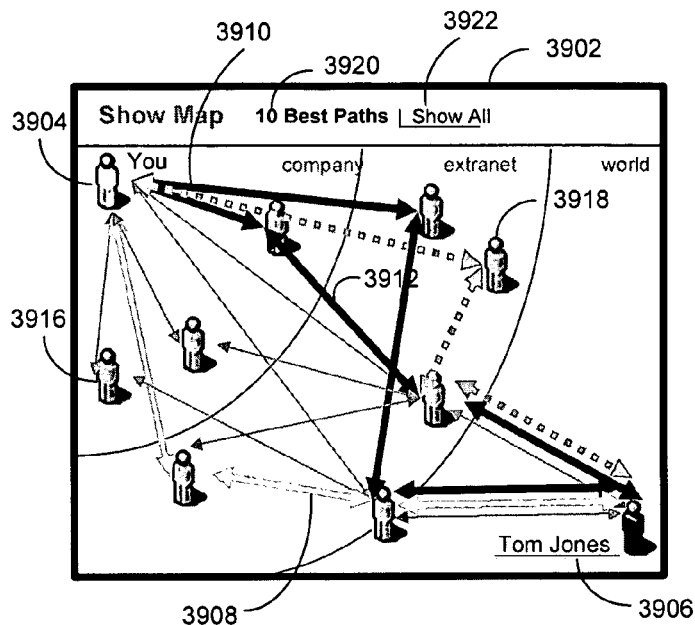
FIGS. 37A through 37F are window displays illustrating interfaces for displaying paths between a user and a target according to one embodiment of the present invention.
Figure 37B:
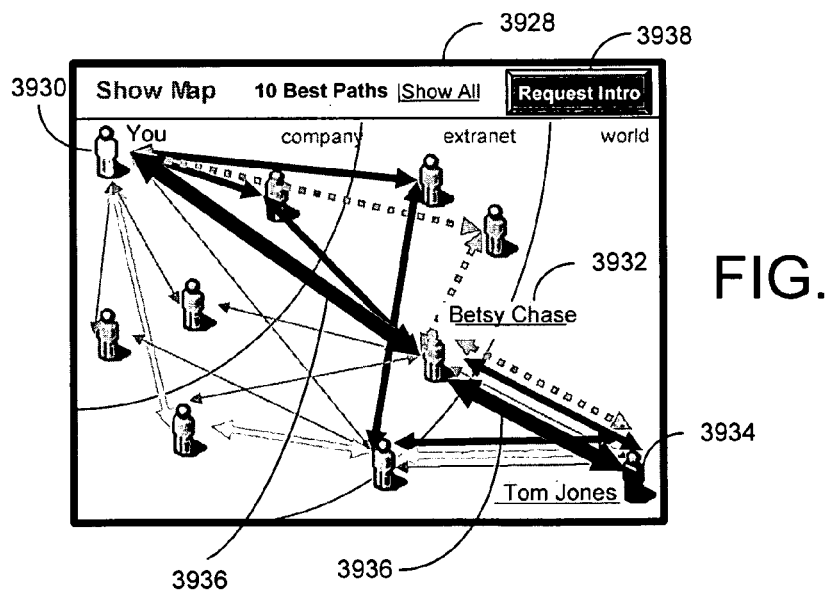

According to FIG. 37A, the map graphical interface 3902 displays only a limited number of paths between the user 3904 and the individual for whom the user is searching 3906, such as the ten best paths between the two, although the interface 3902 provides controls to toggle between a limited number of paths 3920 and all paths between the two 3922. Advantageously, the paths may be color coded or differentiated (e.g., through the use of lines of varying patters) to indicate the introduction status 3908, 3910, and 3912 of a given path. The intermediaries between the user 3904 and the individual for whom the user is searching 3906 are also plotted on the map graphical interface, e.g., 3916 and 3918.

The map graphical interface is interactive in that the user may select paths that the map displays. Continuing with FIG. 37B, the map graphical interface 3928 displays paths between the user 3930 and the individual for whom the user is searching 3934. Using the map graphical interface, the user selects an intermediary 3932, which causes the map to highlight 3936 or otherwise indicate as selected the path between the user 3930 and the individual for whom the user is searching 3934 through the intermediary 3932. As is explained in greater detail herein, the selected path may be used by the user to solicit approval to introduction requests by selection of an introduction request control 3938.

Figure 37C:
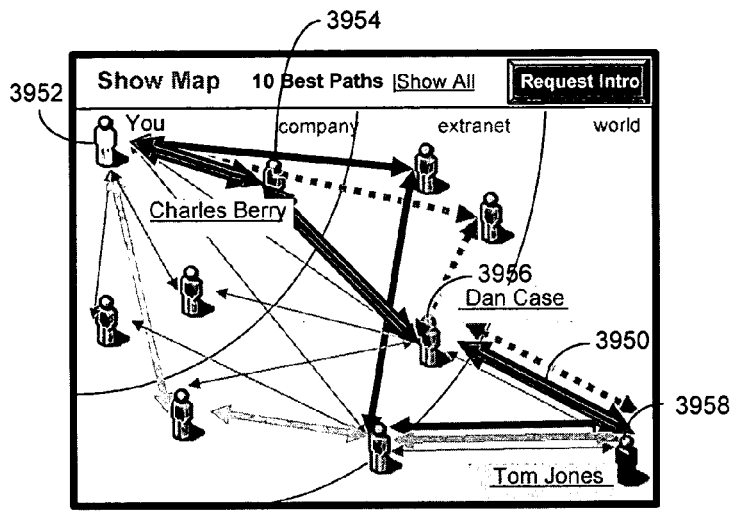
Figure 37D:
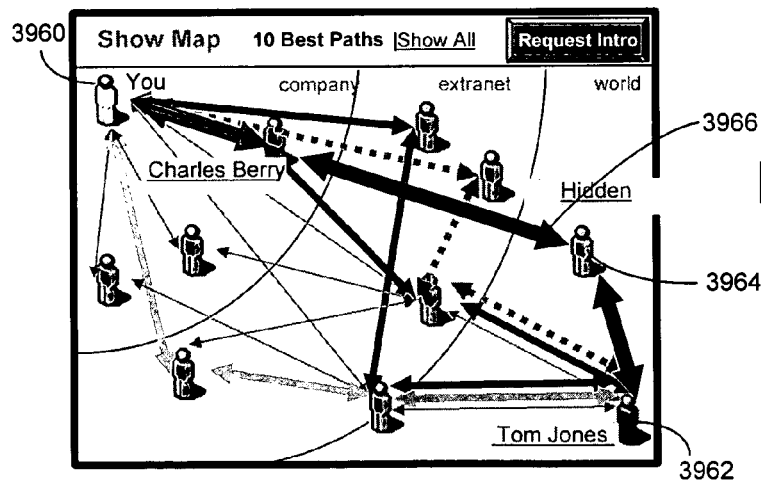
Figure 37E:
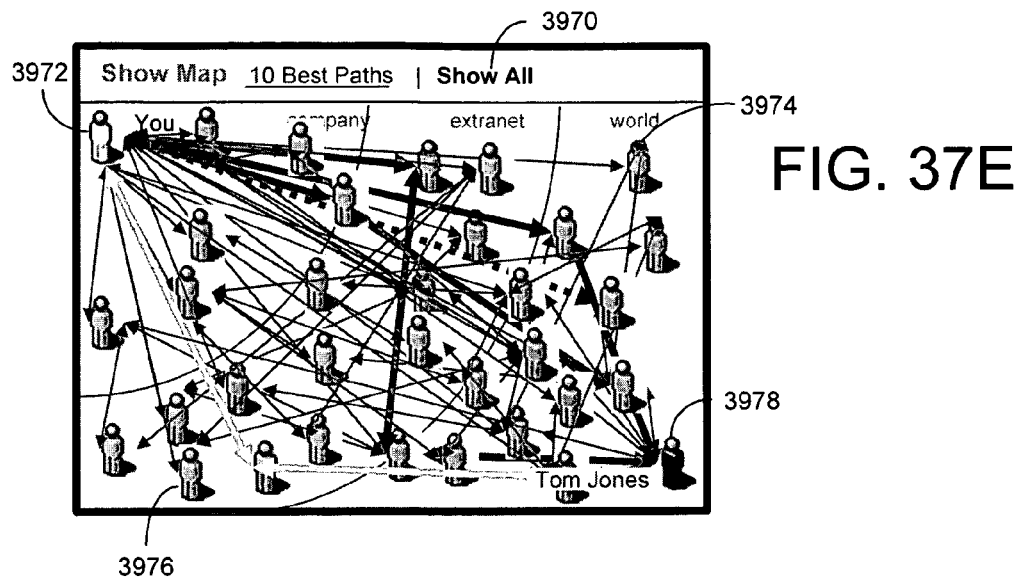
Figure 37F:
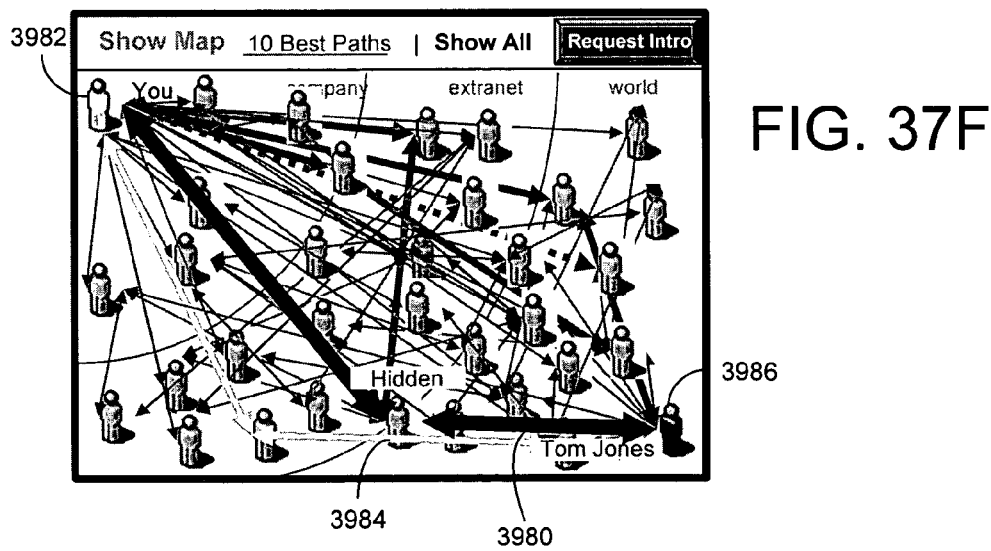

Turning to FIG. 37C, where the user 3952 selects a path 3950 in which all intermediaries 3954, 3956 approve of an introduction to the individual for whom the user is searching or attempting to contact 3958, e.g., each intermediary approves of the use of his or her relationship capital, the user 3952 may select the path to initiate a communication with the target 3958. Similarly, as shown in FIG. 37D, the user 3960 may select a path 3966 to the individual for whom the user is searching or attempting to contact 3962 that includes intermediaries who have not provided the user with access to their identity 3964. In this case, the identity of the intermediary 3964 is therefore hidden. According to 37E, selection of a "show all" control 3970 causes the display of an unlimited number of intermediaries, such as 3974 and 3976, through which paths pass between the user 3972 and the individual for whom the user is searching 3978. As illustrated at FIG. 37F, selection of an intermediary 3984 highlights the selection of the intermediary and the path 3980 between the user 3982 and target 3986 through the intermediary 3984.

As has been described herein, the systems and methods of the present invention provide privacy for the owner of relationship capital that the RCM system is managing. When a user discovers an individual for whom he or she is searching, e.g., locates a target individual using the functions and interfaces of the RCM system and RCM client application, the user may request access to the target individual's relationship capital. A request may be sent to the one or more intermediaries along the path connecting the user and target individual, each individual approving or denying access to the relationship capital for the next intermediary in the path. Thus, any individual may explicitly allow or deny access to his or her relationship capital that the RCM system is managing.

Figure 38:
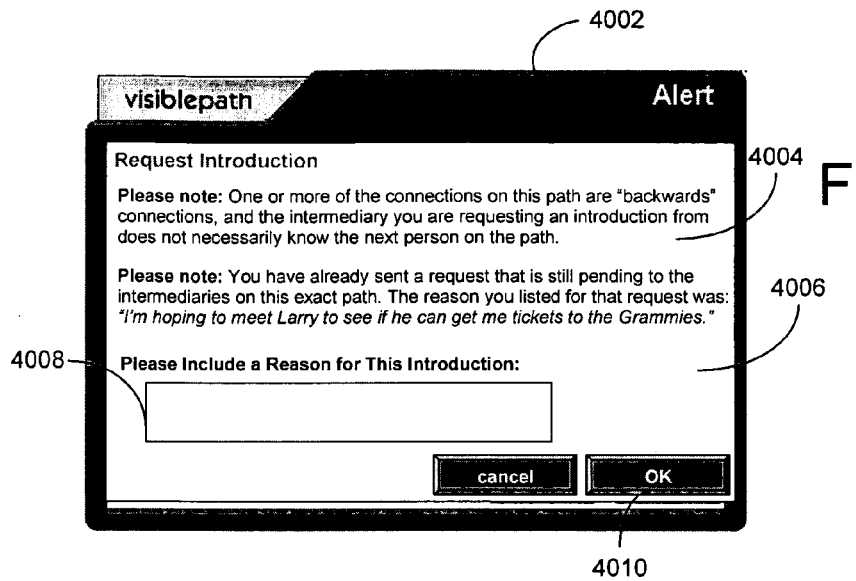
FIGS. 38 and 39 are window displays illustrating requests for access to relationship capital according to one embodiment of the present invention.

FIG. 38 presents one embodiment of a graphical interface 4002 illustrating a request for access to relationship capital. The graphical interface 4002 may provide one or more pieces of information, or alerts, 4004 and 4006, regarding the request before transmitting the request through selection of control 4010. Table 7 presents a listing of exemplary alerts:

TABLE 7

Figure 39:
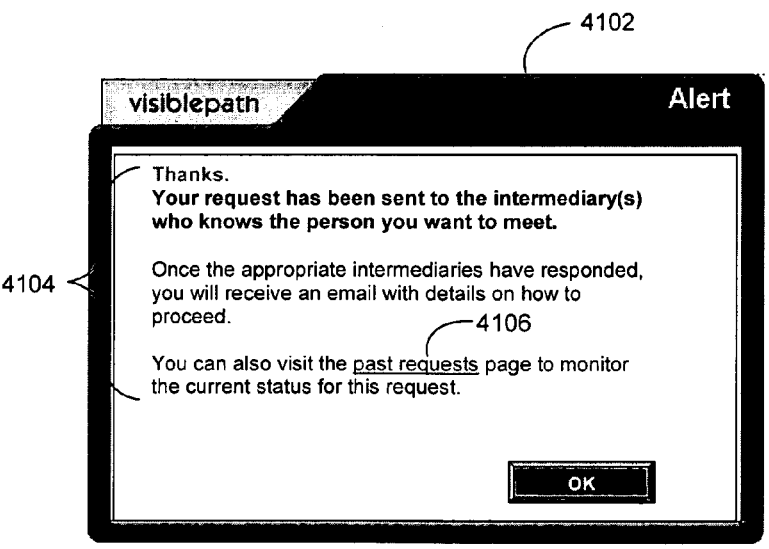

Backwards connection.
Already have intro out to one or more intermediaries
Already have intro out to these exact intermediaries that is pending
Already have intro out to these exact intermediaries that was approved
Already have intro out to these exact intermediaries that was conditionally approved.
Already have intro out to these exact intermediaries that was rejected
Must be a power user When the user chooses to transmit the relationship capital request to the one or more intermediaries by selecting the control 4010, the interface illustrated at FIG. 39 is presented to the user, confirming the transmission of the request. The graphical interface 4102 displays a confirmation, and instructs the user as to the next steps in the process of requesting access to relationship capital owned by others 4104, which is explained herein. The graphical interface may also display a control 4106 that allows the user of view past requests for relationship capital.

Figure 40:
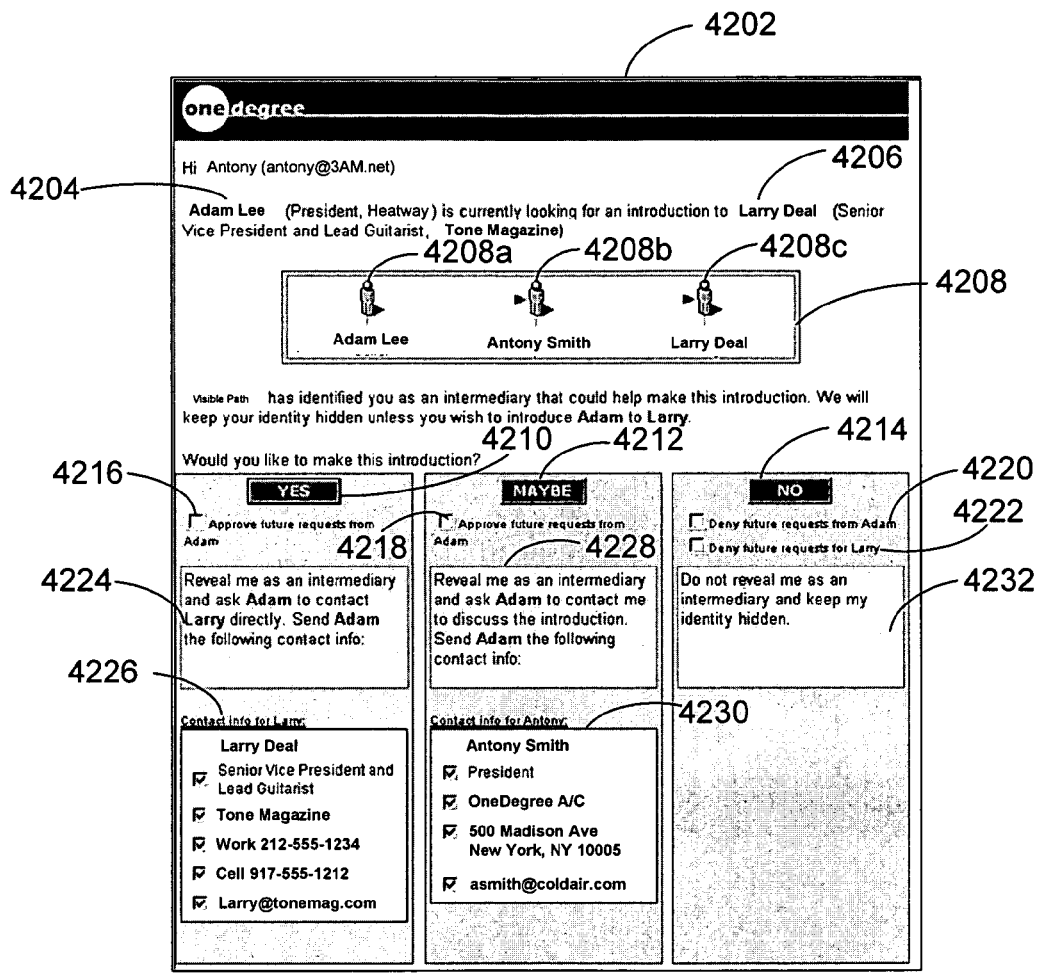
FIGS. 40 through 42 are window displays illustrating requests for relationship capital received by owners of relationship capital according to one embodiment of the present invention.
Figure 41:
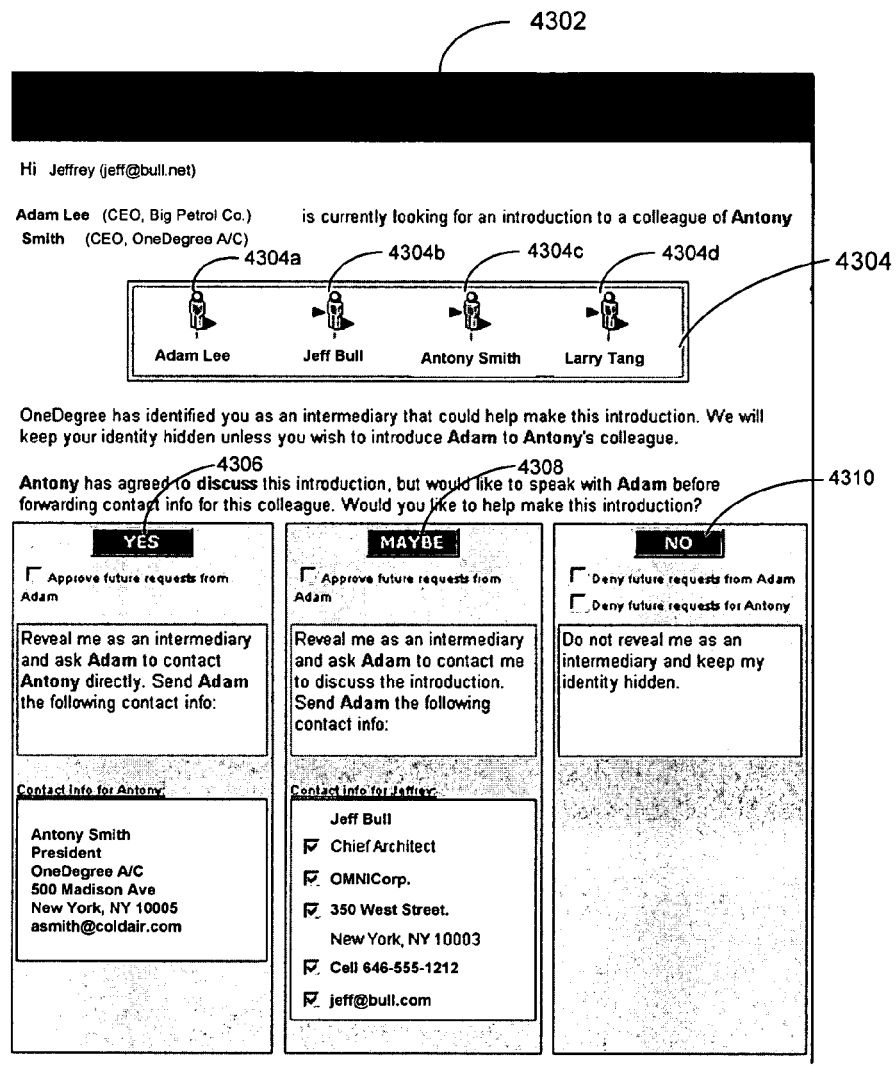
Figure 42:
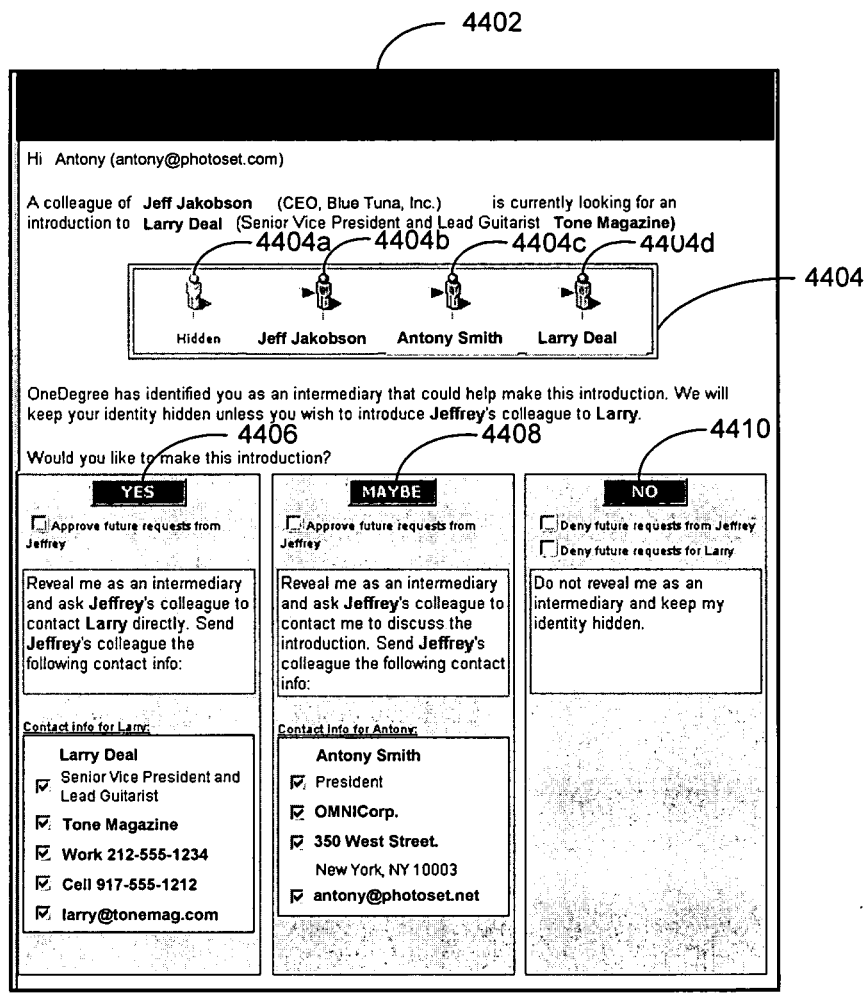

The RCM system transmits requests for relationship capital to owners of relationship capital. FIGS. 40 through 42 present three exemplary requests for relationship capital that an owner of relationship capital may receive from a user seeking access to the relationship capital. Turning to FIG. 40, the request 4202 indicates that user 4204 who is seeking access to the owner's relationship capital, as well as the specific relationship capital the user is seeking 4206, e.g., an introduction to a contact 4206, who may be the target of a search. The request may also display a graphical representation 4208 that displays the path from the user 4208a to the target 4208c, including any intermediary 4208b.

The request 4202 allows the owner of the relationship capital to allow, conditionally allow or deny access to the requested relationship capital. According to the embodiment of FIG. 40, the request 4202 comprises a three frame interface, each frame providing controls to either allow 4210, conditionally allow 4212 or deny 4214 access to the relationship capital. The allow frame provides a control that allows the owner of the relationship capital to set a flag for auto-approval 4216 of future requests from the user, which the RCM system may store in its data store. Selection of the allow control 4210 causes the RCM system to reveal the owner's identity to the user, if not currently known, as well as send the user select pieces of relationship capital that the user is requesting 4226; the request includes text to this effect or any other effects 4224.

The conditional allow frame provides a control that allows the owner of the relationship capital to set a flag for auto-approval 4218 of future requests from the user, which the RCM system may store in its data store. Selection of the conditional allow control 4212 causes the RCM system to reveal the owner's identity to the user, if not currently known, as well as send the user select pieces of the owner's relationship capital 4230 to further discuss the introduction with the user; the request includes text to this effect or any other effects 4228. The deny frame provides controls that allow the owner of the relationship capital to set flags to auto-deny future requests from the user, as well as auto-deny requests for the relationship capital that for which the user is searching, 4220 and 4222, respectively. Selection of the deny control 4214 causes the RCM system to not reveal the owner's identity to the user; the request includes text to this effect or any other effects 4232.

FIG. 41 illustrates another exemplary request 4302 for relationship capital. A graphical representation 4308 displays the path from the user 4304a to the target 4304d, including two intermediaries 4304b and 4304c. According to the request 4302, which is addressed to intermediary 4304b, the user 4304a is attempting to access the relationship capital of intermediary 4304c. Thus, the user 4304a, must first request that intermediary 4304b share his or her relationship capital for intermediary 4304c, whom the user must then request the relationship capital regarding the target 4304d. As was the case with regard to the embodiment of FIG. 41, the request 4302 comprises a three frame interface, each frame providing controls to either allow 4306, conditionally allow 4308 or deny 4310 access to the relationship capital the user is requesting.

A third exemplary request for relationship capital is illustrated at FIG. 42. A graphical representation 4404 displays the path from the user 4404a to the target 4404d, including two intermediaries 4404b and 4404c. It should be noted that in the exemplary request 4402, the user who is initiating the request for relationship capital 4404a is hidden or otherwise obscured from the recipient of the request, intermediary 4404c. Thus, the user protects his relationship capital related, e.g., his identity, by withholding the relationship capital from those to whom the user has not granted access. As was the case with regard to the embodiment of FIGS. 40 and 41, the request 4402 comprises a three frame interface, each frame providing controls to either allow 4406, conditionally allow 4408 or deny 4410 access to the relationship capital the user is requesting.

Figure 43:
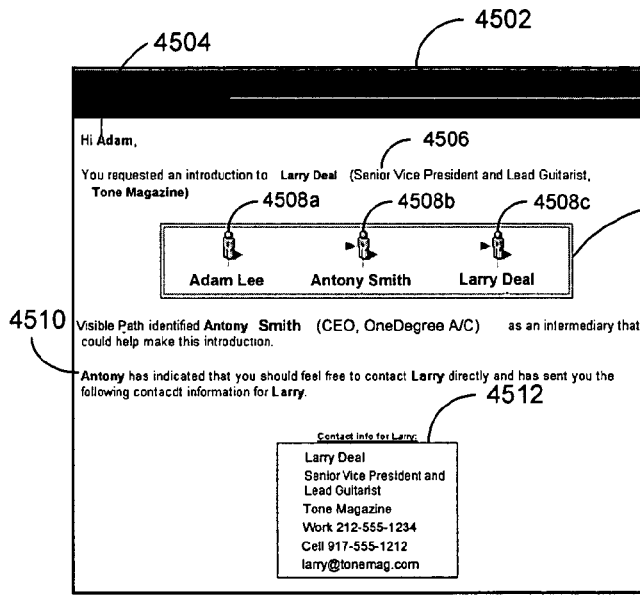
FIGS. 43 through 45 are window displays illustrating responses to requests for relationship capital according to one embodiment of the present invention.
Figure 44:
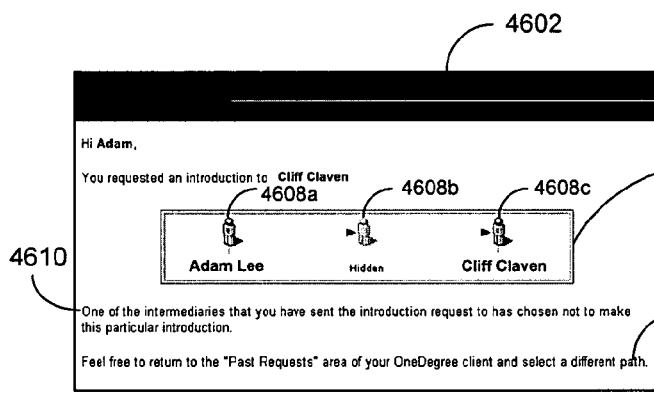
Figure 45:
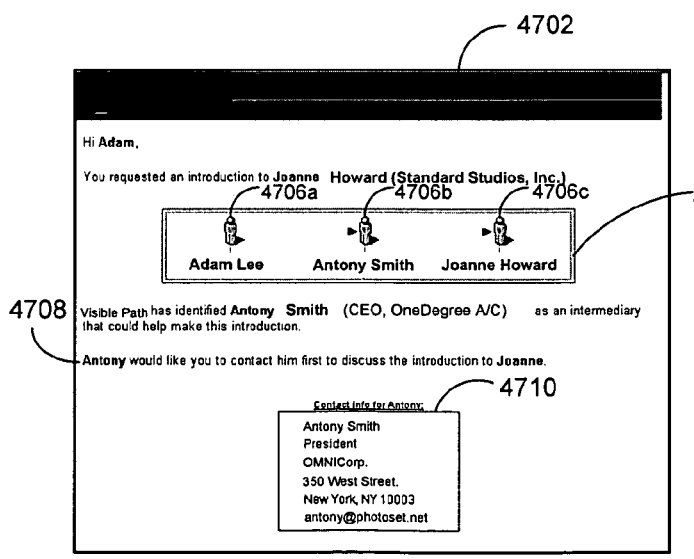

The RCM system transmits responses from owner's of relationship capital to users who are requesting access to the relationship capital. FIGS. 43 through 45 present three exemplary responses to requests for relationship capital that a user may receive from an owner of the relationship capital. Turning to FIG. 43, the response 4502 indicates that the user 4504 is attempting to contact the target 4506. The response may also display a graphical representation 4508 that displays the path from the user 4508a to the target 4508c, including the intermediary 4508b, which is the owner of the relationship capital the user is attempting to access. The response comprises text 4510 that indicates the status of the request, e.g., allowed, conditionally allowed or denied. According to the response, the owner of the relationship capital is allowing access 4510 and the response therefore contains the relationship capital the user was requesting 4512.

FIG. 44 illustrates another exemplary response to a request for relationship capital. According to the graphical portion 4608 of the response 4602, the user 4608a is attempting to access target 4608c through a hidden intermediary 4608b. As discussed above, this represents an intermediary who is not known to the user and who has not provided the user with access to their relationship capital. According to the response 4602, the owner of the relationship capital is denying access 4610 and the response therefore contains no relationship capital.

A third exemplary response to a request for relationship capital is illustrated at FIG. 45. According to the graphical portion 4706 of the response 4702, the user 4706a is attempting to access target 4706c through intermediary 4706b. According to the response 4702, the owner of the relationship capital is conditionally allowing access 4708 to the relationship capital the user is requesting; the response contains the relationship capital sufficient to identify the owner of the relationship capital to which the user is requesting access.

Figure 46:
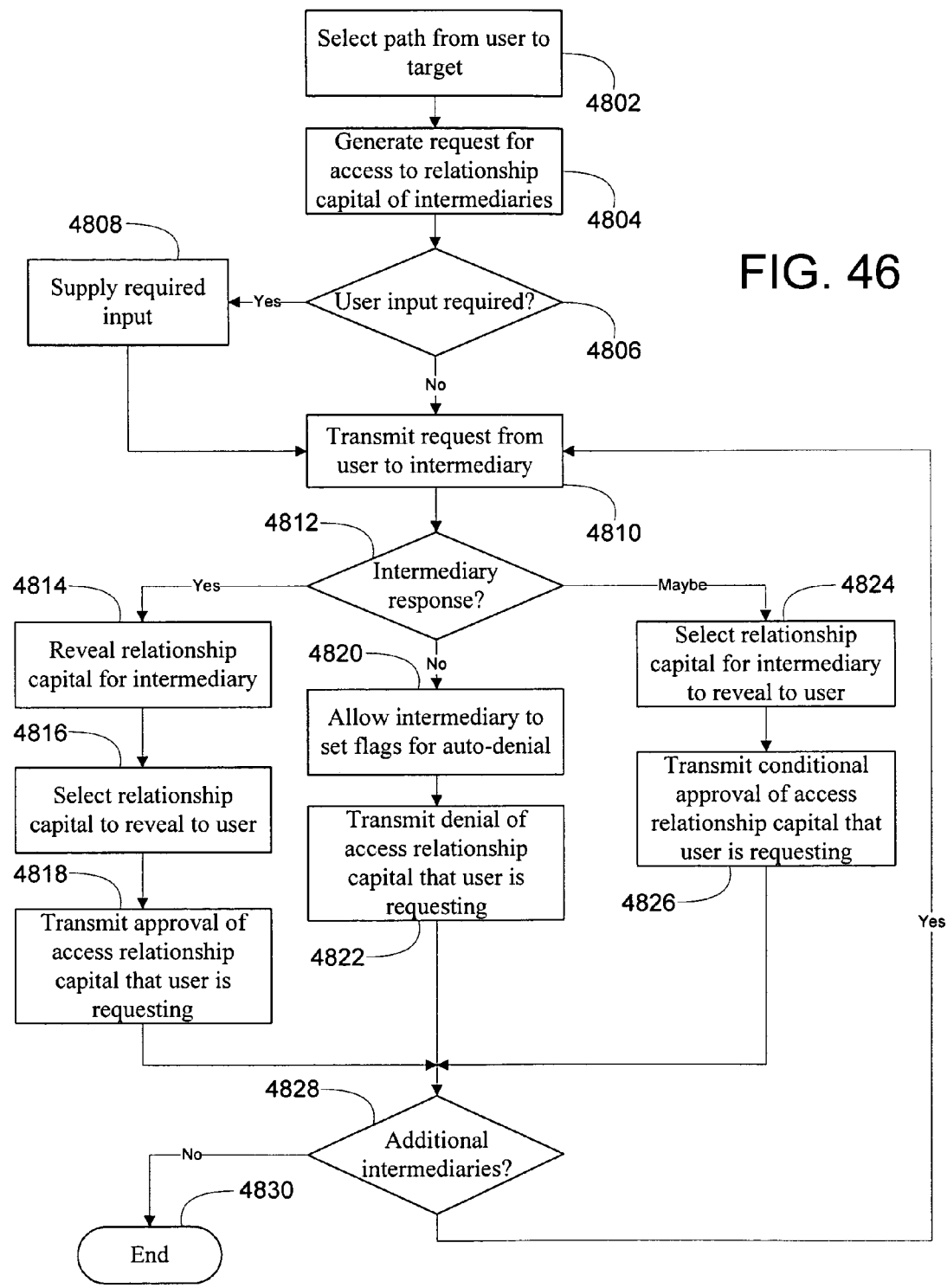
FIG. 46 is a flow diagram illustrating a process for providing access to relationship capital according to one embodiment of the present invention.

FIG. 46 illustrates one embodiment of a method for requesting access to relationship capital and providing responses regarding the same. The user selects a path to a target, step 4802. As described above, the user may select a path through the use of a graphical map interface. Alternatively, the user may select a path to a target using other graphical and command line techniques known to those of skill in the art. The RCM system generates one or more requests for access to the relationship capital of the intermediaries comprising the path from the user to the target, step 4804. As should be apparent to one of skill in the art, the routines for generating the requests and responses as is described herein may also be run at the RCM client application, or combinations thereof. According to some embodiments, the request for relationship capital may present one or more pieces of information, or alerts, regarding the request, which may also include a requirement for user input, step 4806, e.g., requiring that the user supply a reason for requesting the relationship capital. Where user input is required, step 4806, the user supplies the information, step 4808, and the request for access to relationship capital is transmitted to the intermediaries that comprise the path from the user to the target, step 4810.

The intermediaries receive one or more requests for access to relationship capital from the user, step 4810, which may be routed by the RCM system through the use of an email server that transmits the one or more requests. For example, where there are three intermediaries that comprise a path from the user to the target, the second degree intermediary would receive a request for access to the relationship capital of the third degree intermediary. Similarly, where the second intermediary approves the request, the third degree intermediary, which is the last intermediary on the path before the target (fourth degree), would receive a request to access the relationship capital of the target, e.g., the target's name, title and telephone number. The intermediary may approve, conditionally approve or deny the request, step 4812.

According to one embodiment of the present method, the first intermediary comprising the path between the user and target, e.g., the intermediary that is separated from the user by one degree, receives the response. Further according to this embodiment, where there is only one intermediary between the user and the target, the request seeks access to the relationship capital of the target. Similarly, where there is a subsequent intermediary, the request seeks access to the relationship capital of the subsequent intermediary in the path, e.g., the first degree intermediary is being asked by the user to supply the name, title and telephone number of the second degree intermediary.

Where the intermediary approves the request for access to relationship capital, step 4812, the intermediary reveals pieces of their own relationship capital, e.g., name and title. As was described above, the system provides users with the ability to control access to all their relationship capital, including their own identity. Thus, the user might not know the identity of the intermediary, which is revealed, step 4814. The intermediary selects one or more pieces of relationship capital that the user is requesting, step 4816, such as, the identity of the next intermediary in the path or the target. The intermediary transmits an approval, providing the user with access to the relationship capital that the user is requesting of the intermediary, step 4818.

The intermediary may alternatively conditionally allow or deny a user's request for access to relationship capital. Where the intermediary denies a request to access relationship capital, step 4812, the intermediary may instruct the RCM system to set flags in the data store for auto-denial of request for relationship capital, step 4820, e.g., requests from the particular user. The intermediary transmits the denial of the user's request to access a given piece of relationship capital, step 4822, preventing the user from accessing the requested relationship capital.

The intermediary may alternatively conditionally allow the user access to the requested relationship capital, step 4812, such as where the intermediary requires additional information from the user regarding the reason for the request. The intermediary selects pieces of relationship capital to provide to the user, which may be sufficient to allow the user to contact the intermediary, step 4824. The intermediary transmits the conditional allowance of the user's request to access a given piece of relationship capital, step 4826. The user, however, remains prevented from accessing the requested relationship capital, e.g., the identity of the next intermediary in the path.

The intermediary decides to transmit an approval, step 4818, a denial, step 4822, or a conditional allowance, step 4826. Regardless of the response to the request, a check is performed at step 4828 to determine whether additional intermediaries comprise the path between the user and the target, step 4828. Where additional intermediaries exist, processing returns to step 4810 where a request is sent to the next intermediary in the path. Where no additional intermediaries exist, the process terminates, step 4830.

In addition to the relationship capital management functions described herein, the RCM system may also present statistics on usage of the RCM system by users. FIG. 47 illustrates one embodiment of a graphical interface 4902 for presenting statistics regarding access to the RCM system by all users. The interface 4902 provides controls 4910 for providing summary statistics according to users, months or a summary, as well as a control 4904 for switching between chart and graph views. According to the summary, statistics regarding the RCM system are presented 4906 by month 4908. Information that the RCM system may tabulate for presentation include, but are not limited to, logins, searches, requests made, intros received, a success rate, requests received, intros made and a helpfulness rate, which is a function of requests received and intros made. Similarly, statistics by user may be presented as is shown in FIG. 48, in which an interface 5002 displays statistics regarding the RCM system 5010 by month 5012, which can be presented for various users of the RCM system by selection using a drop down menu 5008 or similar selection control. Statistics may also be presented by month as is shown in FIG. 49, in which an interface 5102 displays statistics regarding the RCM system 5108 by user 5110, which can be presented for other months by selection using a drop down menu 5106 or similar selection control.

While the invention has been described and illustrated in connection with preferred embodiments, many variations and modifications as are to be evident to those of skill in the art may be made without departing from the spirit and scope of the invention, and the invention is thus not to be limited to the precise details of methodology or construction set forth above, as such variations and modifications are intended to be included within the scope of the invention. It is to be understood by those of ordinary skill in the art that the various data processing tasks described herein may be implemented in a wide variety of ways, many of which are known and many more of which are doubtless to be hereafter developed. For example, a wide variety of computer programs and languages are now known, and are likely to be developed, which are suitable for storing, accessing, and processing data, as well as for performing, processing, and using forecasts and other analyses are disclosed herein. Except to the extent necessary or inherent in the processes themselves, no particular order to steps or stages of methods or processes described in this disclosure, including the figures, is implied.

Appendix A

APPENDIX A

| Service Category | Service Name | Service Description |
|---|---|---|
| | Session Management | |
| | sessionLogin | creates a session for a user logging in with a valid username/password |
| | sessionLogout | terminates a user session |
| | sessionIsValid | returns whether a given session identifier is valid |
| | passwordResend | resends password to e-mail account on record for a given user |
| | Registration | |
| | userAccountAdd | adds a new user to the system |
| | userAccountEdit | edits account information stored for a user |
| | userAccountGet | returns account information stored for a user |
| | userProfileEdit | edits profile information stored for a user |
| | userProfileGet | returns profile information stored for a user |

APPENDIX A-continued

| Service Category | Service Name | Service Description |
|---|---|---|
| | userPasswordEdit | allows password to be edited |
| | userAutoRespondSettingsEdit | replaces existing auto respond settings with new values passed as input |
| | userAutoRespondSettingsGet | retrieves existing auto respond settings |
| Contact Management | | |
| | contactUpload | adds a list of contacts to a users account. Replaces any previous contact list on record |
| | contactSync | synchronizes a list of contacts with existing contacts stored for user |
| | contactAdd | adds a new contact for a user |
| | contactDelete | deletes specified contact from user's list |
| | contactGet | gets details of specified contact |
| | contactGetAll | retrieves all contacts stored for a user |
| | contactWeightGet | retrieves the weight of specified contact |
| | contactInvite | sends an email to contact with information on joining VP |
| Search | | |
| | searchFindUsers | search for contacts with matching name, company, title |
| | searchFindPaths | find path to specified target |
| | searchGetPrevFindUsersQueries | retries list of all previous queries submitted by user |
| | searchGetPrevPathResults | returns all stored path results from previous FindPaths. Used when managing Requests |
| | searchGetPrevPathInfo | returns stored path info from a specific path within a previous FindPaths result. |
| | searchGetNodeDetail | retrieves all contact info for a node in a previously derived path |
| Request | | |
| | requestInitiate | initiates a request to communicate through a path to a target |
| | requestGetInfo | retrieves info/status of a specific request made by user |
| | requestGetHistory | retrieves list of all requests made by user |
| | requestResponse | processes response to a request from an intermediary in the relevant path |

Appendix B

The Relationship Capital Source (RCS) API provided by an RCM system may consist of a collection of interfaces, such as IDispatch/COM interfaces, that collectively allow any third-party application in conjunction with the RCM system to:

Discover the hierarchical structure of the underlying data source, and

Capture data from specified portions of that hierarchy.

According to one embodiment, the RCS API may expose the following methods within its RCSDataSource Interface:

Open: Opens the relationship capital source; allows the provider to perform initialization logic.

Name: Returns the displayable name of the relationship capital source. This name pertains to the root node of data source.

Capabilities: Returns an XML string describing the capabilities of the relationship capital source provider. Such capabilities include event monitoring, image lists, and properties. The intent is to provide the client with the means to determine the relationship capital source provider's level of sophistication.

Properties: Clients call this interface to configure the relationship capital source provider, which may or may not be necessary.

EnumerateNodes: Returns a list of folders (nodes) that contain data from the data source (e.g., actual outlook folders).

Capture: Captures all relationship capital items within a specific node.

Close: Closes the relationship capital source; allows the provider to release system resources and to perform termination logic.

IsOpen: Determines if the underlying relationship capital source is currently open. Returns a Boolean value to that effect.

Appendix C

To obtain and display comprehensive and accurate relationship capital regarding individuals in the RCM system, the following steps may be taken:

1. Resolve Email Domains
2. Group companies and resolved domains
3. Correlate users based on multiple attributes
4. Determine first seen, last seen, and still active dates for each email address
5. Display relevant information in a useable format 1. Resolve Email Domains The methods for resolving email domains include automated whois (www.whois.com) queries and acquisition of bulk whois data. Both methods are frowned upon by registrars since this is an activity mostly performed by mass mailing and marketing groups, e.g., purveyors of spam. Each registrar has individual policies automated lookups and ways to access bulk whois data.

|                              | Automated Query | Bulk Whois                    |
|------------------------------|-----------------|-------------------------------|
| Query Time                   | <70 s           | <1 s                          |
| Queries/Day                  | <1000           | Unlimited                     |
| Number of Domains Covered    | ~80%            | A fraction for each registrar |
| Cost                         | Free            | TBD                           |

The conclusion is that bulk whois data should be acquired where possible, but automated queries may be available for fallback resolution. Known commercial mail hosts may be ignored. A new domainLookup table within the RCM system's data store, an embodiment of which is illustrated below, caches the results of these lookups for future use.

| Column        | Description                                                        |
|---------------|--------------------------------------------------------------------|
| domain        | The domain name being resolved                                     |
| registrant    | The name of the registrant of the domain                           |
| checkedTime   | Timestamp of the last validation                                   |
| checkedStatus | The result of the last validation check (success, no connection, no data, data format invalid) |

2. Grouping Companies and Resolved Domains

Once email addresses are resolved to company names, similar companies may be grouped together where possible to tie email currency to companies and positions, thereby eliminating multiple representations of the same company with slightly different spellings.

A new masterCompany table may be created within the RCM system's data store to contain the accepted display name for each company, along with an identifier. In addition, the contactInfo table may contain a column for the masterCompanyID, thereby correlating each representation of a user to a master company. At any point, company name grouping may be regenerated from original values with no effect on the integrity of the data.

Grouping Methodology

Company name grouping uses the search engine methodology to determine the likelihood that two company names should be treated as the same. These correlations are more accurate as the search engine is modified to use first term weighting.

3. Correlate Users Based on Multiple Attributes

For any contact in a user's relationship capital, the individual may be correlated against:

a) the user's other contacts
b) all other contacts in the system

For each case, different rules apply. For example, within a user's contacts, it might be safe to determine that two contacts with the same first and last names are the same person. This assumption, however, would lead to incorrect correlations when applied to the entire universe. Exemplary rules are as follows:

| Scope             | Methods                                        |
|-------------------|------------------------------------------------|
| User's Data Feeds | email, last name                               |
|                   | exact display name                             |
|                   | last name, first name equivalency              |
| Universe          | email, last name                               |
|                   | last name, first name equivalency, company     |
|                   | last name, first name equivalency, cell phone  |
|                   | last name, first name equivalency, home phone  |
|                   | last name, first name equivalency, business phone |

Further correlation may take into account the source of the matching relationship capital. For example, where a similar contact is found in a coworkers relationship capital, it might be more relevant than one found elsewhere.

4. Determine Email Currency

For each email address, first-seen and last-seen dates will be determined. Before determining these dates, the email address may be check for validity by:

a) verifying the syntax of the address is valid;

b) checking to see that a mail server exists for the domain; and/or c) connecting to the mail server to see if the address will be accepted.

Addresses may be checked on a regular basis and the result of each validation stored in a new emailValidation table in the RCM system's data store that contains information such as the emailID, the date of the validation check, and the result of that check. From this, date ranges can now be assigned to each address:

| Date       | Methods                                                    |
|------------|------------------------------------------------------------|
| First Seen | Earlier of dates in activity table or first time verified  |
| Last Seen  | Later of dates in activity table or last time verified     |

5. Display Relevant Information in a Useable Format

The relationship capital is collected, companies and email domains are mapped to master companies, multiple representations of people are correlated, and dates associated with each email address are recorded. On the basis of this collected and processed relationship capital, search results information may be determined:

| Display Field | Determination                              |
|---------------|--------------------------------------------|
| Name          | Best match of search terms                 |
|               | Most common representations                |
| Company Name  | Best match of search terms                 |
|               | Most recent as determined by email currency|
| Title         | Best match of search terms                 |
|               | Most common from company determined above  |

To display detailed information about each search result, code is used, e.g., javascript, to pass the user's information into the item viewer panel where may be formatted and shown. The information in this panel may include:

Each Master Company the user is associated with

The most common title they had at each company

The date ranges gathered from email currency.

Appendix D

APPENDIX D

Search Methodology Analysis

| Search Method | Description | Search Term | Results |
|---|---|---|---|
| First Name | | | |
| Substring Match | Searches for first names beginning with the search term | Rich<br>Richard | Richard<br>Rich<br>Richard |
| Name Equivalency | Searches for names that are considered to be equivalent to the search term | Rich<br>Rich | Richard<br>Rich<br>Dick<br>Richard<br>Rich<br>Dick |
| Phonetic | Searches for first names that begin with the same sound as the search term | Rich<br>Richard | Rich<br>Richard<br>Rachel<br>Ruchit<br>Richard |
| Last Name | | | |
| Substring Match | Searches for last names beginning with the search term | Smith<br>Smithers | Smith<br>Smithers<br>Smithers |
| Phonetic | Searches for last names that begin with the same sound as the search term | Smith<br>Smithers | Smith<br>Smithers<br>Smythe<br>Smyth<br>Smithers<br>Smothers |
| Company | | | |
| Substring Match | Searches for company names containing words beginning with the full search term | Morgan<br>J. P. Morgan Inc | J. P. Morgan<br>J. P. Morgan Inc<br>JP Morgan Inc<br>Morgan Stanley<br>J. P. Morgan Inc<br>JP Morgan Inc |
| Phonetic | Searches for company names containing words that begin with the same sound as the full search term | Morgan<br>J. P. Morgan Inc | J. P. Morgan<br>J. P. Morgan Inc<br>JP Morgan Inc<br>Morgan Stanley<br>Marken Capital<br>J. P. Morgan Inc<br>JP Morgan Inc |
| Element Match | Searches for company names that contain words beginning with each of the search terms | Morgan<br>J. P. Morgan Inc | J. P. Morgan<br>J. P. Morgan Inc<br>JP Morgan Inc<br>Morgan Stanley<br>J. P. Morgan<br>J. P. Morgan Inc<br>JP Morgan Inc<br>Morgan Stanley<br>CompanyA Inc<br>CompanyB Inc<br>CompanyC Inc |
| Weighted Element Match | Searches for company names that contain words beginning with the most highly weighted search terms | Morgan<br>J. P. Morgan Inc | J. P. Morgan<br>J. P. Morgan Inc<br>JP Morgan Inc<br>Morgan Stanley<br>J. P. Morgan<br>J. P. Morgan Inc<br>JP Morgan Inc<br>Morgan Stanley |
| Title | | | |
| Substring Match | Searches for titles containing words beginning with the full search term | CEO<br>Chief Executive Officer | CEO<br>CEO, President<br>Chief Executive Officer |
| Element Match | Searches for titles that contain words beginning with each of the search terms | CEO<br>Chief Executive Officer | CEO<br>CEO, President<br>Chief Executive Officer<br>Chief Financial Officer<br>Fire Chief<br>Loan Officer<br>Executive Assistant |
| Title Equivalency | Searches for titles that are equivalent to the search term | CEO<br>Chief Executive Officer | CEO<br>CEO, President<br>Chief Executive Officer<br>CEO<br>CEO, President<br>Chief Executive Officer |
| Weighted Element/ Equivalency | Searches for titles that contain words that are equivalent to parts of the search term. For instance, CTO would look for all titles that contained CxO or Chief xxxx Officer. 'VP of Sales' might find all combinations of "VP", "Vice President", "Sales", and "Marketing" | CEO<br>Chief Executive Officer | CEO<br>CEO, President<br>Chief Executive Officer<br>CTO<br>Chief Technology Officer<br>COO<br>CEO<br>CEO, President<br>Chief Executive Officer<br>CTO<br>Chief Technology Officer<br>COO |

We claim:

1. A method for maintaining ownership rights to relationships in a social network, the method comprising:
   storing relationship capital data that identifies a plurality of relationships between entities, a given one of said relationships being between a first entity and a second entity and being owned by said first entity;
   receiving a communication that indicates that a third entity wishes to contact said second entity;
   searching said relationship capital data, wherein said searching yields a path from said third entity to said second entity via said first entity, and wherein said path includes a direct link from said third entity to said first entity;
   preventing said third entity from accessing said given one of said relationships;
   sending a request to said first entity to facilitate an introduction between said third entity and said second entity;
   receiving a response from said first entity; and
   sending a communication to said third entity that identifies said first entity, only if said response indicates an approval of said request.

2. The method of claim 1, wherein said entities are selected from a group comprising an individual and an organization.

3. The method of claim 1, wherein said response is one of an approval response, a conditional approval response or a denial response.

4. A method comprising:
   receiving, from a user, an identification of a target;

searching a social network, wherein said searching yields a path from said user to said target via an intermediary, and wherein said path includes a direct link from said user to said intermediary;

hiding an identity of said intermediary from said user;

sending a request to said intermediary to facilitate an introduction between said user and said target;

receiving a response from said intermediary; and sending a communication to said user that identifies said intermediary, only if said response indicates an approval of said request.

5. The method of claim 4, further comprising displaying a graphical representation of said intermediary while still hiding said identity of said intermediary from said user.

6. The method of claim 4 further comprising limiting use, by said user, of relationship capital associated with said intermediary, based on rules of an extranet.

7. The method of claim 4, further comprising correlating relationship capital regarding said user and said intermediary, based on user selected controls.

8. The method of claim 7, wherein said correlating yields correlated relationship capital that includes relationship capital associated with different e-mail addresses of said user.

9. The method of claim 4, further comprising limiting access, by said user, of relationship capital associated with said intermediary, based on rules of a workgroup.

10. The method of claim 4, further comprising limiting access, by said user, of relationship capital associated with said intermediary, based on privacy settings of a workgroup.

11. The method of claim 4, wherein said searching includes:

determining a first number of members of said social network known to said user;

determining a second number of members of said social network known to said target; and if said first number is less than said second number, then searching for said path from said user to said target, else searching for said path from said target to said user.

12. The method of claim 4, wherein said request prompts said intermediary to do one of: deny said request, allow said request, and request further information from said user.

13. The method of claim 4 further including:

automatically approving said introduction if said user is on an auto-approve list managed by said intermediary.

14. The method of claim 4 further including:

automatically denying said introduction if said user is on an auto-deny list managed by said intermediary.

* * * * *